(12) United States Patent
Takai et al.

(10) Patent No.: US 6,924,008 B2
(45) Date of Patent: Aug. 2, 2005

(54) CURABLE RESIN COMPOSITION, A METHOD FOR THE PREPARATION THEREOF, AND A COATED ARTICLE THEREOF

(75) Inventors: Hideyuki Takai, Ohtake (JP); Hiroto Miyake, Ohtake (JP); Katsuya Maruo, Ohtake (JP)

(73) Assignee: Daicel Chemical Industries, Ltd., Osaka (JP)

( * ) Notice: Subject to any disclaimer, the term of this patent is extended or adjusted under 35 U.S.C. 154(b) by 166 days.

(21) Appl. No.: 09/913,405

(22) PCT Filed: Dec. 15, 2000

(86) PCT No.: PCT/JP00/08906

§ 371 (c)(1),
(2), (4) Date: Oct. 18, 2001

(87) PCT Pub. No.: WO01/44344

PCT Pub. Date: Jun. 21, 2001

(65) Prior Publication Data

US 2003/0032729 A1 Feb. 13, 2003

(30) Foreign Application Priority Data

| Dec. 17, 1999 | (JP) | 11-359235 |
| Dec. 17, 1999 | (JP) | 11-359307 |
| Dec. 17, 1999 | (JP) | 11-359343 |
| Dec. 17, 1999 | (JP) | 11-359369 |
| Dec. 17, 1999 | (JP) | 11-359391 |

(51) Int. Cl.$^7$ .................... B32B 27/38; C08L 63/00; C08L 33/00
(52) U.S. Cl. .................... 428/1.1; 428/413; 428/523; 525/107; 525/370; 525/524; 525/529
(58) Field of Search .................... 428/413, 414, 428/415, 416, 417, 418, 500, 523, 1.1; 523/400; 525/107, 370, 407, 524

(56) References Cited

U.S. PATENT DOCUMENTS 5,650,233 A  7/1997  Miyake et al.
6,015,848 A  1/2000  Ikushima et al.
6,437,090 B1 *  8/2002  Murai et al. ................. 528/416

FOREIGN PATENT DOCUMENTS

| EP | 0 726 279 A2 | 8/1996 |
| EP | 0 726 279 A3 | 8/1996 |
| EP | 0 846 739 A2 | 6/1998 |
| EP | 0 896 968 A1 | 2/1999 |
| EP | 1 026 211 A1 | 8/2000 |
| JP | B77000770 | 1/1977 |
| JP | A62192427 | 8/1987 |
| JP | A04202418 | 7/1992 |
| JP | A06073163 | 3/1994 |
| JP | A11035660 | 2/1999 |

OTHER PUBLICATIONS

Supplementary European Search Report dated Feb. 14, 2003.

* cited by examiner

Primary Examiner—Michael J. Feely
(74) Attorney, Agent, or Firm—Morgan & Finnegan, LLP

(57) ABSTRACT

There are provided a curable resin composition composed of an epoxy compound having an ionic polymerizability and viscosity of not more than 1,000 cP at 25° C., an acrylic resin having an ionic polymerizable functional group, and a thermally-activating ionic polymerization catalyst which can be dissolved by heating and crystallized by cooling, a method for the preparation thereof, and a coated article using the curable resin composition.

The curable resin composition is excellent in storage stability, and a cured coating layer therefrom is excellent in heat resistance, staining resistance, removability of staining substances, or scratch resistance, and an electrical insulating property, and in which dependence of volume resistivity upon temperatures is small, and from which an excellent coated article is obtained, and it is widely utilized in industry.

12 Claims, No Drawings

CURABLE RESIN COMPOSITION, A METHOD FOR THE PREPARATION THEREOF, AND A COATED ARTICLE THEREOF

TECHNICAL FIELD

The present invention (i) relates to a curable resin composition composed of a specified epoxy compound, a specified acrylic resin, and a thermally-activating ionic polymerization catalyst which is capable of dissolving by heating and crystallizing by cooling, a method for the preparation thereof, and a coated article in which the composition is coated and cured.

The present invention (ii) relates to a solvent-based coating composition composed of an epoxy compound having a cycloaliphatic epoxy group, an acrylic resin containing epoxy group, and a thermally-activating ionic polymerization catalyst, and which is employed for coating cars.

The present invention (iii) relates to a resin composition for a laminated printed circuit board composed of a monomer having a specified ionic polymerizability, and a polymer compound having a specific ionic polymerizability, a thermally-activating ionic polymerization catalyst, and a laminated printed circuit board having an insulation resin layer between layers which is prepared by curing the composition.

The present invention (iv) relates to a curable resin composition composed of a specified epoxy compound and a thermally-activating polymerization ionic catalyst, a protecting film for a color filter using thereof, a color filter, and a liquid crystal displaying device.

The present invention (v) relates to a curable resin composition composed of a specified epoxy compound, a specified oxetane compound, and a thermally-activating polymerization ionic catalyst or, a curable resin composition further containing a specified acrylic resin, and a coated article in which the composition is coated and cured.

BACKGROUND ART

Hitherto, as a method for crosslinking and curing an epoxy compound by an ultraviolet ray or heating in a short time of period, there has been known a composition having an ionic polymerizability. In order to improve physical properties of a coating layer from the composition, there has been investigated a method employing a variety of compounds.

Such an ionic curing system, particularly, a cationic curing system can be employed for coating a metal and plastics and, in recent years, it has been investigated as uses for coating metal cans, and drawn metal cans coated with plastic films.

However, in the composition containing ionic catalysts, since storage stability is not good so much, a variety of methods have been investigated. For example, JP-A-06073163 Official Gazette proposes a method in which an organic phosphine is molded into a microcapsule by wrapping in a particle-state using a polymer.

Further, there is a method in which one-liquid storage stability is attained by allowing to adsorb it in a compound such as a zeolite having pores. However, a latent property described hereinafter is insufficient in such catalyst systems, and uses are limited because of a heterogeneous system and being incapable of employing for a method such as impregnation.

Further, it has a drawback that a cured resin is apt to become not uniform.

On the other hand, there is widely investigated a method using a thermally latent catalyst in which an activity in the acidic catalyst is temporarily suppressed, and there is shown again the activity by cleavage thereof during heating and curing. As such the latent catalyst, for example, there are known a catalyst blocking an active proton by utilizing a neutralization reaction of an acid-base and a catalyst blocking an active proton by utilizing an esterification reaction of an acid with alcohols in JP-B-77000770 Official Gazette. Further, there are known benzyl sulphonium salt type and benzyl piridinium salt type catalysts which are a thermal latent catalyst which produces an active benzyl cation by thermal decomposition of an onium salt in JP-A-62192427 Official Gazette.

Still further, as commercially supplied thermal latent acidic catalysts, there are enumerated a monoethylamine complex of boron trifluoride and piridinium complex of boron trifluoride which are a Lewis acid.

However, in the catalyst utilizing a neutralization reaction of an acid-base and the catalyst utilizing an esterification reaction of an acid with alcohols, it is difficult to obtain a thermal latent acidic catalyst in which there are consistent an appropriate dissociation temperature and thermal stability of the catalyst itself. Furthermore, in the benzyl sulphonium salt type and benzyl piridinium salt type catalysts, although a storage stability is relatively excellent, it is not sufficient and, particularly, in the case that it is employed together with cycloaliphatic epoxide having high reactivity, a storage stability is worse.

As described hereinabove, in the case that conventional catalysts for curing are employed together with epoxy resins, a reaction gradually progresses even at room temperatures from immediately after the catalyst is mixed with the epoxy resins which are resin components for curing. For that reason, storage time of period is limited in an epoxy resin composition, and it must be ended to employ within the period.

On the other hand, as a cationic polymerization catalyst for a cationic polymerizable vinyl compound, although there have been conventionally known Lewis acids such as $BF_3$, a storage stability is exceedingly worse because a reaction is caused even at a temperature such as room temperatures. Further, a polymerization reaction cannot be readily controlled, and polymerization degree is low in a resin obtained. In order to allow to polymerize a vinyl compound, polymerization is conducted by feeding a catalyst after cooling monomer containing an appropriate solvent to an exceedingly low fixed temperature. However, operations are troublesome for conducting a polymerization reaction at the exceedingly low temperature, and it requires costs.

Further, in the case of employing conventional catalysts, since curing is caused by an ionic reaction in an epoxy compound and an acrylic resin to be employed in the present inventions (i) to (v), ionic catalysts are remained in a cured resin after reaction, and there is caused a problem that an electric insulation property lowers in the resin.

Still further, in coating for vehicles such as cars, a cationic electro-deposition coating and an intermediate coating are coated on an outside plate such as a metal and plastics, and then, there is coated a finishing coating such as an opaque coloring coating, a transparent coloring coating, and a clear coating. In the case that the vehicles are placed outside in summer season, temperature elevates to 50–70° C. or so, and coatings are softened and apt to become deteriorated.

Accordingly, there are required heat resistance, staining resistance, and abrasion resistance, etc. in a coating layer from the finishing coating.

As the finishing coating, particularly, a clear coating, there is employed a solvent-based coating composed of an acrylic resin having hydroxyl groups and a melamine resin. However, although a coating layer thereof is excellent in weatherability and finishing outer appearance, acid rain resistance is not sufficient.

As a coating in which acid rain resistance is improved, although there is employed a solvent-based coating (an acid-epoxy type coating) composed of a resin having carboxylic groups and a resin having epoxy groups, it is poor in staining resistance and, further, it is apt to be stained by adherence and soaking of dusts and sands, exhausted components, staining substances caused by animals and vegetables, and iron powder, etc.

On the other hand, as a method for crosslinking and curing an epoxy compound within a short time of period by an ultraviolet ray and heat, an ionic polymerizable composition has been known.

However, in the composition containing an ionic catalyst, since storage stability is not good so much, as illustrated hereinabove in detail, although a variety of methods are investigated, a sufficiently satisfied method is not still found out.

Further, in recent years, a shift to a high integration or high arithmetic speed is advanced in electronics equipments such as a large-scale computer with a progress in an electronics-information technology. As a result, for an object of the high integration even in a printed circuit board, a laminated printed circuit board is becoming highlighted in which laminated circuits are formed. The laminated printed circuit board is shifting to a direction of further high integration with a progress of a shift of the electronics equipments to small-sizing and multi functions.

That is, a circuit is shifting to micro wiring, and a via-hole is shifting to small diameter, thinning, and highly multi-laminating.

Hitherto, the laminated printed circuit board is prepared through a step in which there is laminated a prepreg sheet semi-cured by impregnation of an epoxy resin into a glass cloth substrate onto an internal layer circuit board having a circuit, and a copper foil is further laminated, followed by an integral molding through thermally compressing using a heated press.

However, in the step, since curing is conducted under a fixed pressure by reflow of an impregnated resin, it requires 1–1.5 hour for uniformly curing and molding and a long preparation step and, moreover, it requires a high cost because of costs of a multi-layered lamination press and glass-made cloth prepreg. In addition, it was difficult to exceedingly thin a thickness between layers because of a method impregnating a resin into the glass-made cloth.

In recent years, in order to solve such problems, there is watched a technology of a laminated printed circuit board by a buildup method without conducting thermal compression molding by a heat press and without using a glass-made cloth as an insulating material between layers.

In usual, as a method for a film-formation and film-rolling from an adhesive which is an insulating layer between layers, although there are formulated components such as a rubber-based compound, a polyvinyl butylal, a phenoxy resin, and a polyester resin, the components remarkably lower thermal properties in the laminated printed circuit board.

In a laminated printed circuit board prepared by the buildup method, in the case of employing a copper-laminated insulation sheet having an insulating resin layer formed on a roughened surface of a copper foil and in the case of employing a film-like insulating resin layer between layers in place of a tack dry prepreg sheet prepared by impregnating an epoxy resin into a glass-made cloth base material, workability is remarkably improved compared to a method in which an insulating resin layer between layers is formed by a prepreg.

However, there has been a problem in the cases that since there cannot be completely removed air bubbles remained at a boundary stair portion between an insulation base plate and a circuit in an internal circuit board, the air bubbles cause a deterioration of insulation and a deterioration of heat resistance in soldering and, further, peeling between layers is occasionally caused.

In order to prevent the air bubbles, lamination must be conducted under a condition of reduced pressure, and it requires a special equipment. Further, there have been problems that since a laminated insulation layer follows the boundary stair portion between an insulation base plate and a circuit in the internal circuit board, surface smoothness cannot be obtained, and inferiority in soldering is caused during mounting of parts or, a resist is peeled in a formation step of an etching resist, or a stable resist cannot be formed because of a cause of decline of pattern developability.

Still further, there become required surface via holes which carry conducting between layers and, when the surface via holes are formed by a mechanical drill, diameter of approximately 300 $\mu$m is a limit in hole processing and, under the limit, there are caused problems of precision in hole position and a drill life, etc.

In a conventional method in which a prepreg is prepared by impregnating an epoxy resin into a glass-made cloth and cured by heating and compressing using a press, and the surface via holes are formed by a mechanical drill, there are problems that it requires a high cost because of the use of the glass-made cloth, and ultra thin processing cannot be conducted, and fine processing cannot be conducted because of formation of surface via holes by a mechanical drill.

In order to solve the problems, there becomes required a photo-buildup method that there is formed a photosensitive insulating resin layer not having a glass-made cloth between layers on both surfaces or one surface of a material for an internal layer having patterning, micro surface via holes are formed by photo-imaging, and then, circuit is formed by etching through panel plating. For that reason, the photosensitive insulating resin layer between layers must be excellent in developability by a photographic method and, moreover, it must have a function as an additive adhesive.

In usual, in an additive method for the preparation of a board for circuit, thermosetting type additive adhesive has been employed, and methods in which an adhesive layer is roughened by an oxidant are enumerated in JP-B-88010752, JP-A-63297571, JP-A-64047095, JP-A-03018096 Official Gazettes. In the methods, the adhesive layer contains a rubber component such as an acrylonitrile-butadiene rubber, and surface of the adhesive layer is roughened by extracting the rubber component using a chromic sulfuric acid aqueous solution.

Further, there are proposed a method in which an adhesive layer is formed by dispersing an inorganic powder such as silica and calcium carbonate in a resin matrix such as an epoxy resin, a phenol resin, and a melamine resin which are excellent in heat resistance, and the adhesive layer is roughened by selective elution of the inorganic powder using a specified chemical substance, and a method in which there is dispersed a cured epoxy resin fine powder having different solubility to an oxidant into an epoxy resin matrix, and the cured epoxy resin fine powder is removed by selective elution using an oxidant, as disclosed in JP-A-01029479.

However, in the case of employing such the thermosetting type additive adhesive, it was not able to form the surface via holes by photo-imaging. In contrary, there are proposed a method in which an epoxy resin is employed as a matrix and a cationic photo-initiator is employed as a curing agent, and a method in which surface via holes are formed by photo-imaging through a method using an acrylate-modified product of a phenol novolak type epoxy resin or a cresol novolak type epoxy resin. However, since there are required adaptability to ultra high integration and high arithmetic speed, and high reliability, although there are required higher sensitivity and higher resolution, and there is required a material having low dielectric constant, high heat resistance, and low coefficient of linear expansion, a sufficient material is not still found.

In recent years, there has been investigated a laser-via method in which a hole having approximately 50 μm can be drilled by an eximer laser or carbon dioxide laser. As a composition for the method, a variety of compositions are investigated and, for example, a cationic polymerizable composition is known. In order to improve physical properties of a coating layer obtained from the composition, there has been investigated a method in which a variety of compounds are simultaneously employed.

However, in the composition containing an ionic catalyst, since storage stability is not excellent so much, as illustrated hereinabove in detail, although a various methods are investigated, sufficiently satisfied methods cannot be still found.

In more recently, a color liquid crystal displaying device is widely employed in an information equipment such as a computer displaying device, a telephone, and GPS, and home electric appliances, etc.

The color liquid crystal displaying device is prepared by, for example, a method in which a color filter for color separation is set up on a transparent base plate such as a glass plate, a transparent electro-conductive thin layer which is a transparent electrode such as indium tin oxide is prepared thereon by vapor deposition, and a transparent electrode is formed by patterning through a photolithography method, followed by setting up a thin layer for orientating a liquid crystal and further setting up the liquid crystal thereon.

Construction of the color filter is comprised, for example, forming picture elements on a transparent base plate, setting up a transparent electrode thereon, forming a protecting layer (also called an overcoating layer) on the picture elements in order to flatten surface of the picture elements and to prevent elution of impurities from the picture elements, and vapor-depositing a transparent electro-conductive thin layer thereon, whereby, the transparent electrode can be prepared by a photolithography method.

Accordingly, since the method requires thermal and chemical durability, the protecting layer must be set up on the color filter before vapor-depositing the transparent electro-conductive thin layer.

As properties to be required in the protecting layer for a color filter, there are enumerated transparency, thermal and chemical durability, adhesion to a transparent base plate and a color filter, thinness, coatability, smoothness, and hardness, etc. In the case of forming by vapor-depositing the transparent electrode onto the protecting layer and by a post treatment, since surface of the protecting layer is heated at 300° C. or so at maximum, heat resistance and discoloration resistance are required.

As such coating materials, JP-A-04202418 Official Gazette discloses a polyglycidyl(meth)acrylate-based resin and, JP-A-63131103 Official Gazette discloses a melamine resin, an epoxy resin, and a polyimide resin, etc., and JP-A-11035660 Official Gazette discloses a composition composed of a polymer containing not less than 50% of a specified cycloaliphatic epoxy acrylic ester, a curing agent, and a functional silane coupling agent.

However, the coating materials are not satisfied in various properties to be required including storage stability.

On the other hand, as a method for crosslinking and curing an epoxy compound within a short time of period by an ultraviolet ray and heat, an ionic polymerizable polymer composition is known. In order to improve physical properties of a coating layer from the composition, there have been investigated methods in which a variety of compounds are simultaneously employed.

Such an ionic curing system, particularly, a cationic curing system can be employed as a coating for metals and plastics and, in recent years, it is investigated in the use as the protecting layer for a color filter, etc.

However, since the composition containing an ionic catalyst is not good so much in storage stability, as illustrated hereinabove in detail, although various methods are investigated, sufficiently satisfied methods cannot be still found.

Furthermore, as a method for crosslinking and curing an epoxy compound within a short time of period by an active energy radiation such as an ultraviolet ray and heating, radical polymerization technologies and cationic polymerization technologies, etc. have been conventionally put into practice.

In the cationic polymerization technologies by the active energy radiation, since polymerization is not disturbed by oxygen in air, those do not have a limitation that polymerization must be conducted under an inert gas atmosphere, and those have an advantage that polymerization can be completely and quickly conducted in air. Nowadays, the cationic polymerization technologies are limited in polymerization of two kinds of monomers of an epoxy resin and a vinylether. Particularly, a photocurable type epoxy resin is excellent in an adhesive property, and a cured layer therefrom is fine in heat resistance and chemical resistance.

However, in conventional epoxy resins, polymerization speed is slower compared to a resin such as an acrylic acid derivative being capable of curing by radical polymerization, and it was problematic in a preparation efficiency of a product in which the resin is employed. On the other hand, the vinylether was problematic in that it is volatile and has a strong odor, and shrinkage is observed during curing compared to the epoxy resin, and adhesion is low, and it is not sufficient in water resistance and hydrolysis resistance.

In the cationic polymerization technologies by heating, a cationic polymerization catalyst is employed and, as the cationic polymerization catalyst, there has been widely investigated a method in which there is employed a thermally-latent catalyst in which activity of an acidic catalyst is temporarily suppressed and the activity is shown again by cleavage during thermally curing.

Further, in order to improve physical properties of a coating layer from the composition, there have been investigated methods in which a variety of compounds are simultaneously employed.

Such the ion curing, particularly, the cationic curing system can be utilized as a coating for metals and plastics and, in recent years, it is investigated in the use of coating for metallic cans and plastic film-coated metallic drawn cans.

As such the thermally-latent catalyst, as illustrated hereinabove in detail, although various methods are investigated, sufficiently satisfied methods cannot be still found.

On the other hand, as described in J.M.S.-PURE APPL. CHEM., A32(10), PP. 1699–1707 (1995), etc., although oxetane itself has slow cationic polymerizability, initial reactivity can be largely improved by employing together with a cycloaliphatic epoxy compound, etc. It is more excellent than in cationic polymerizability of the epoxy compound alone, and it is exceedingly useful to employ the oxetane together with the epoxy compound from a viewpoint of curing rate.

The present inventions (i) and (ii) provide a curable resin composition for a coating which is excellent in storage stability, in which curing quickly proceeds at a higher fixed temperature than a room temperature and curing does not proceed so much at the room temperature, and provide a method for the preparation thereof and a coated article which is excellent in heat resistance, staining resistance, a removal property of staining substances, and a abrasion resistance, etc.

The present invention (iii) provides an insulating resin composition for a laminated printed circuit board by a buildup method which is most appropriate for a laser-via, in which it is quickly cured at a temperature higher than a fixed temperature, and it is excellent in storage stability at a room temperature level, and temperature dependence of volume resistivity after curing is small, and provides a laminated printed circuit board.

The present invention (iv) provides a curable resin composition which can be cured at a temperature higher than a fixed temperature, and it is excellent in storage stability at a room temperature level and, in which an electric insulation property of a resin does not fall so much after curing, and provides a protecting layer for a color filter which is excellent in transparency, thermal and chemical durability, adhesion to a transparent base plate and a color filter, thinness, coatability, smoothness, and hardness, and provides a color filter in which the protecting layer for a color filter is set up and a liquid crystal displaying equipment having the color filter.

The present invention (v) provides a curable resin composition for a coating, which can be quickly cured at a temperature higher than a fixed temperature, and which is excellent in storage stability at a room temperature level and, in which initial reactivity is improved, and provides a method for the preparation thereof and a coated article using the curable resin composition.

DISCLOSURE OF THE INVENTION

The present inventors have found out that the above-described problems can be solved by the use of a curable resin composition containing a specified epoxy compound, an acrylic resin having functional groups, and a thermally-activating ionic polymerization catalyst which can be dissolved by heating and crystallized by cooling, and the present invention has been completed.

That is, the present invention No. 1 provides a curable resin composition which comprises (i-1) an epoxy compound having an ionic polymerizability and viscosity of not more than 1000 cP at 25° C., (i-2) an acrylic resin having an ionic polymerizable functional group, and (3) a thermally-activating ionic polymerization catalyst which can be dissolved by heating and crystallized by cooling.

The present invention No. 2 provides a curable resin composition as described in the present invention No. 1 in which the epoxy compound (i-1) has 1–2 pieces of epoxy groups in the molecule, at least one piece of said epoxy groups is a cycloaliphatic epoxy group.

The present invention No. 3 provides a curable resin composition as described in the present invention No. 1 or 2, in which the acrylic resin (i-2) has hydroxyl group and, glycidyl group and/or a cycloaliphatic epoxy group.

The present invention No. 4 provides a curable resin composition as described in any one of the present invention Nos. 1–3, in which the thermally-activating ionic polymerization catalyst (3) contains at least one kind selected from the group consisting of a cationic polymerization catalyst (3') and a metal compound (3").

The present invention No. 5 provides a curable resin composition as described in the present invention No. 4, in which the cationic polymerization catalyst (3') is a compound having a substituted or nonsubstituted hydrocarbon group of a carbon number of at least 10 or at least one cyclic organic structure containing a substituted or nonsubstituted hydrocarbon group of a carbon number of at least 10 in the molecule.

The present invention No. 6 provides a curable resin composition as described in any one of the present invention Nos. 4–5, in which the cationic polymerization catalyst (3') is at least one

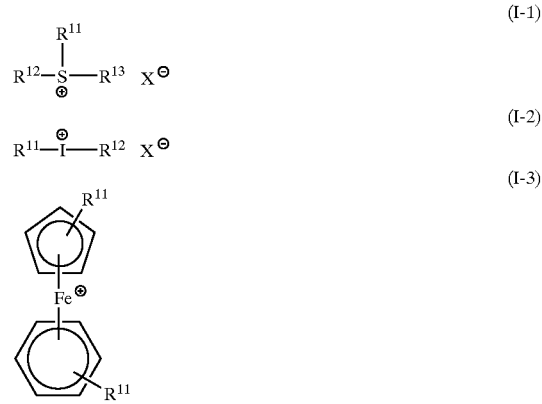

kind selected from the group consisting of a sulphonium salt represented by general formula (I-1), an iodonium salt represented by general formula (I-2), an aromatic iron compound represented by general formula (I-3), an organosilicon compound represented by general formula (I-4), and a compound represented by general formula (I-5).

(in the formulae, $R^{11}$, $R^{12}$, and $R^{13}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. X is $SbF_6$, $AsF_6$, $PF_6$, $BF_4$, an anionic derivative therefrom in which at least one piece of fluorine atom is substituted with hydroxyl group, or an anion selected from the group consisting of $CF_3SO_3$, $ClO_4$, a halogen atom, $R^1$—COO, $R^2$—$SO_3$. Herein, $R^1$ and $R^2$ are an alkyl group or phenyl group which may be even substituted with an alkyl group, a halogen atom, nitro group, cyano group, and alkoxy group, etc.)

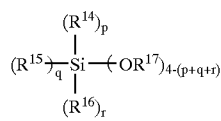
(I-4)

(in the formula, $R^{14}$, $R^{15}$, $R^{16}$ and $R^{17}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. "p, q, and r" are an integer of 0–3, and "p+q+r" is not more than 3.)

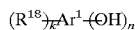
(I-5)

(in the formula, $Ar^1$ is a substituted or nonsubstituted aromatic group or heteroaromatic group, $R^{18}$ may be identical or different, and which is a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. "k" and "n" are an integer of 1–7, respectively.)

The present invention No. 7 provides a curable resin composition as described in any one of the present invention Nos. 4–6, in which the metal compound (3") is at least one kind selected from the group consisting of a compound represented by general formula (II-1), a compound represented by general formula (II-2), and a compound represented by general formula (II-3).

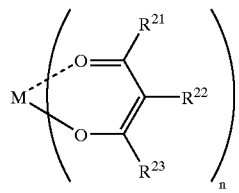
(II-1)

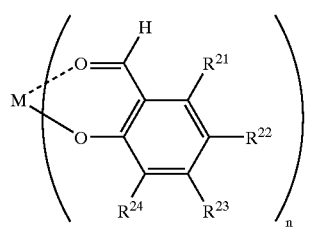
(II-2)

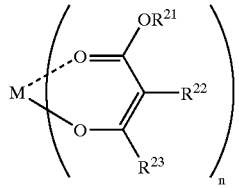
(II-3)

(in the general formula, $R^{21}$, $R^{22}$, $R^{23}$, and $R^{24}$ may be identical to or different from each other, and which are a hydrogen atom, a substituted or nonsubstituted hydrocarbon group of a carbon number of 1–30, respectively, provided that there are contained at least one of $R^{21}$, $R^{22}$, $R^{23}$, and $R^{24}$ having a carbon number of not less than 10 in one ligand. M is selected from the group consisting of Al, Ti, Cr, Mn, Fe, Co, Ni, Cu, Zr, Zn, Ba, Ca, Ce, Pb, Mg, Sn, and V. "n" is a integer of 2–4.)

The present invention No. 8 provides a curable resin composition as described in any one of the present invention Nos. 1–7, in which the thermally-activating ionic polymerization catalyst (3) contains the metal compound (3") and at least one kind selected from the group consisting of an organosilane having hydroxyl group directly connected to silicon atom, an organosiloxane having hydroxyl group directly connected to silicon atom, a phenol compound, an organosilicon compound having hydrolyzable group directly connected to silicon atom, and a silicon compound which can produce silanol group by photoirradiation.

The present invention No. 9 provides a curable resin composition as described in any one of the present invention Nos. 1–3, in which the thermally-activating ionic polymerization catalyst (3) contains at least one kind of compounds selected from the group consisting of a compound represented by general formulae (III-1') and (III-2),

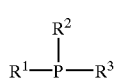
(III-1')

(in the formula (III-1'), $R^1$, $R^2$, and $R^3$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or an aromatic group or heteroaromatic group having a substituted or nonsubstituted hydrocarbon group of a carbon number of at least 10.),

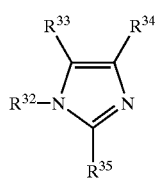
(III-2)

(in the formula (III-2), $R^{32}$, $R^{33}$, $R^{34}$, and $R^{35}$ may be identical to or different from each other, and which are a hydrogen atom, a substituted or nonsubstituted hydrocarbon group of a carbon number of 1–30, respectively, provided that at least two of $R^{32}$, $R^{33}$, $R^{34}$, and $R^{35}$ are hydrocarbon groups having a carbon number of not less than 10.)

The present invention No. 10 provides a curable resin composition as described in any one of the present invention Nos. 1–3, in which the thermally-activating ionic polymerization catalyst (3) is at least one kind selected from the group consisting of a compound represented by general formulae (III-1) and (III-2),

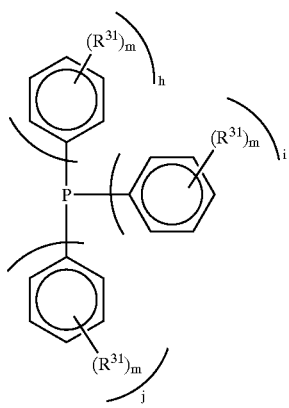

(III-1)

(in the formula (III-1), $R^{31}$ may be identical to or different from each other, and which are a hydrogen atom, a substituted or nonsubstituted hydrocarbon group of a carbon number of 1–30, respectively, provided that at least one $R^{31}$ in one molecule has a carbon number of not less than 10. "h, i, and j" are an integer of satisfying "h+i+j=3", and "m" is an integer of 1–5.)

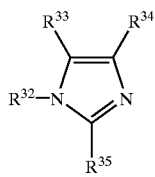

(III-2)

(in the formula (III-2), $R^{32}$, $R^{33}$, $R^{34}$, and $R^{35}$ may be identical to or different from each other, and which are a hydrogen atom, a substituted or nonsubstituted hydrocarbon group of a carbon number of 1–30, respectively, provided that at least two of $R^{32}$, $R^{33}$, $R^{34}$, and $R^{35}$ are hydrocarbon groups having a carbon number of not less than 10.)

The present invention No. 11 provides a curable resin composition as described in the present invention No. 10, in which the compound represented by general formula (III-1) is at least one kind selected from the group shown below.

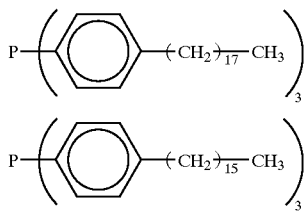

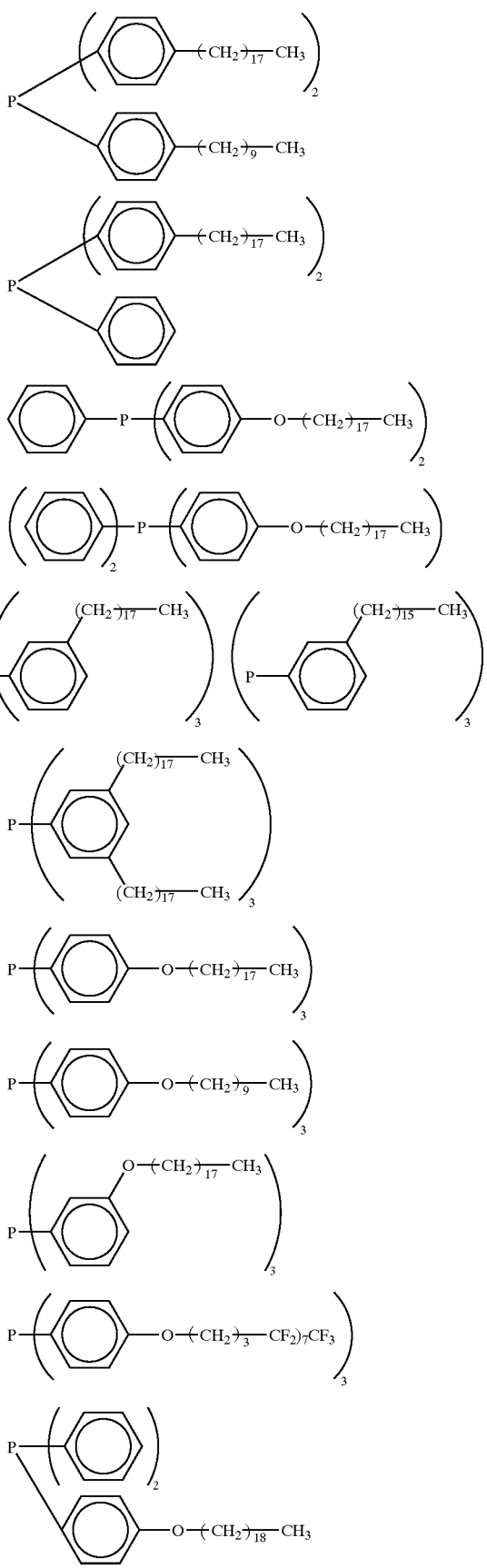

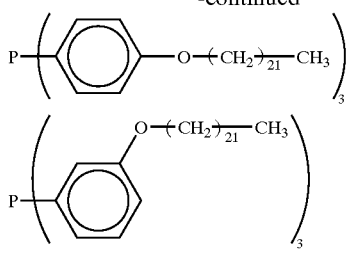

The present invention No. 12 provides a curable resin composition as described in the present invention No. 9 or 10, in which the compound represented by the general formula (III-2) is at least one kind selected from the group shown below.

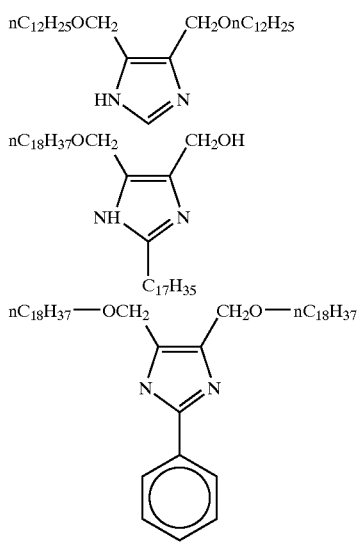

The present invention No. 13 provides a curable resin composition as described in any one of the present invention Nos. 1–12, and which is employed for coating cans.

The present invention No. 14 provides a method for the preparation of a curable resin composition characterized in that there is prepared an acrylic resin (i-2) having functional groups which are capable of reacting with ionic species in a curable resin composition as described in any one of the present invention Nos. 1–12 by polymerizing monomers which construct an acrylic resin (i-2) in an epoxy compound (i-1) under a condition of the absence of a volatile solvent.

The present invention No. 15 provides a coated article which comprises coating a curable resin composition as described in any one of the present invention Nos. 1–12 on a base plate, and curing.

The present invention No. 16 provides a solvent-based coating composition which comprises (ii-1) an epoxy compound having at least two cycloaliphatic epoxy groups in the molecule and a number average molecular weight of not more than 2,000, (ii-2) an acrylic resin containing an epoxy group and having a number average molecular weight of 2,000–50,000, a hydroxyl group value of 10–250 mgKOH/g, and an epoxy equivalent of not more than 300, and (3) a thermally-activating ionic polymerization catalyst which can dissolve by heating and crystallize by cooling.

The present invention No. 17 provides a solvent-based coating composition as described in the present invention No. 16, in which the epoxy group in the acrylic resin (ii-2) is a cycloaliphatic epoxy group or epoxy group derived from glycidylmethacrylate.

The present invention No. 18 provides a solvent-based coating composition as described in the present invention No. 16 or 17, in which the epoxy compound (ii-1) further contains at least one kind selected from a bisphenol-type epoxy resin, a novolak-type epoxy resin, and a brominated-type epoxy resin therefrom.

The present invention No. 19 provides a solvent-based coating composition as described in any one of the present invention Nos. 16–18, in which oxirane oxygen concentration is 11–15% by weight in a resin composition composed of the epoxy compound (ii-1) and the acrylic resin (ii-2) containing an epoxy group.

The present invention No. 20 provides a solvent-based coating composition as described in any one of the present invention Nos. 16–19, in which the thermally-activating ionic polymerization catalyst (3) is a catalyst as described in the present invention Nos. 4–12.

The present invention No. 21 provides a solvent-based coating composition as described in any one of the present invention Nos. 16–20, and which is employed for coating cars.

The present invention No. 22 provides a coated article which comprises coating a solvent-based coating composition as described in any one of the present invention Nos. 16–20 on a base plate, and curing.

The present invention No. 23 provides a resin composition for insulating a laminated printed circuit board which comprises (iii-1) a monomer having at least one functional group having ionic polymerizability, (iii-2) a polymeric compound having at least one functional group having ionic polymerizability, and (3) a thermally-activating ionic polymerization catalyst which can dissolve by heating and crystallize by cooling.

The present invention No. 24 provides a resin composition for insulating a laminated printed circuit board as described in the present invention No. 23, in which the monomer (iii-1) has a viscosity of not more than 1,000 cP/25° C. and 1–2 pieces of epoxy groups in the molecule, and at least one of said epoxy groups is a cycloaliphatic epoxy group.

The present invention No. 25 provides a resin composition for insulating a laminated printed circuit board as described in the present invention No. 23 or 24, in which the polymeric compound (iii-2) has a cycloaliphatic epoxy group.

The present invention No. 26 provides a resin composition for insulating a laminated printed circuit board as described in any one of the present invention Nos. 23–25, in which the polymeric compound (iii-2) is an acrylic resin polymerized in the monomer (iii-1) containing 3,4-epoxycyclohexylmethyl(meth)acrylate.

The present invention No. 27 provides a resin composition for insulating a laminated printed circuit board as described in any one of the present invention Nos. 23–26, in which the thermally-activating ionic polymerization catalyst (3) is a catalyst described in the present invention Nos. 4–12.

The present invention No. 28 provides a laminated printed circuit board which comprises coating a resin composition for insulating a laminated printed circuit board as described in any one of the present invention Nos. 23–27 on a base plate, and curing, and which has resin layers insulating between layers.

The present invention No. 29 provides a curable resin composition which comprises (iv-1) an epoxy resin having ionic polymerizability and (3) a thermally-activating ionic polymerization catalyst which can dissolve by heating and crystalize by cooling.

The present invention No. 30 provides a curable resin composition as described in the present invention No. 29, in which the epoxy resin (iv-1) is a polyfunctional epoxy resin and at least one of epoxy groups is a cycloaliphatic epoxy group.

The present invention No. 31 provides a curable resin composition as described in the present invention No. 29 or 30, in which the thermally-activating ionic polymerization catalyst (3) is a catalyst as described in the present invention Nos. 4–12.

The present invention No. 32 provides a protecting layer for a color filter which comprises coating a curable resin composition as described in any one of the present invention Nos. 29–31 onto a base plate, and curing.

The present invention No. 33 provides a color filter using a protecting layer for a color filter as described in the present invention No. 32.

The present invention No. 34 provides a liquid crystal display device using a color filter as described in the present invention No. 33.

The present invention No. 35 provides a curable resin composition which comprises (v-1) an epoxy compound having ionic polymerizability and a viscosity of not more than 1,000 cP/25° C., (v-4) an oxetane compound having 1–6 pieces of oxetane rings in one molecule, and (3) a thermally-activating ionic polymerization catalyst which can dissolve by heating and crystallize by cooling.

The present invention No. 36 provides a curable resin composition which comprises (v-1) an epoxy compound having ionic polymerizability and a viscosity of not more than 1,000 cP/25° C., (v-2) an acrylic resin having a functional group having ionic polymerizability, (v-4) an oxetane compound having 1–6 pieces of oxetane rings in one molecule, and (3) a thermally-activating ionic polymerization catalyst which can dissolve by heating and crystallize by cooling.

The present invention No. 37 provides a curable resin composition as described in the present invention No. 35 or 36, in which the epoxy compound (v-1) has one 1–4 pieces of epoxy groups in the molecule, and at least one piece of the epoxy groups is a cycloaliphatic epoxy group.

The present invention No. 38 provides a curable resin composition as described in any one of the present invention Nos. 35–37, in which the epoxy compound (v-1) further contains at least one kind selected from a bisphenol-type epoxy resin, a novolak-type epoxy resin, and a brominated-type epoxy resin therefrom.

The present invention No. 39 provides a curable resin composition as described in any one of the present invention Nos. 36–38, in which the acrylic resin (v-2) has hydroxyl group and, glycidyl group and/or a cycloaliphatic epoxy group.

The present invention No. 40 provides a curable resin composition as described in any one of the present invention Nos. 35–39, in which the thermally-activating ionic polymerization catalyst (3) is a catalyst as described in the present invention Nos. 4–12.

The present invention No. 41 provides a curable resin composition as described in any one of the present invention Nos. 35–40, and which is employed for coating cans.

The present invention No. 42 provides a coated article which comprises coating a curable resin composition as described in any one of the present invention Nos. 35–40 onto a base plate, and curing.

BEST MODE FOR CARRYING OUT THE INVENTION

Hereinafter, the present inventions are illustrated in detail.

[i]. Embodiment for Carrying Out the Invention (i)

The curable resin composition of the present invention (i) comprises (i-1) an epoxy compound having an ionic polymerizability and viscosity of not more than 1,000 cP at 25° C., (i-2) an acrylic resin having a functional group which can react with ionic species, and (3) a thermally-activating ionic polymerization catalyst which can be dissolved by heating and crystallized by cooling.

The acrylic resin (i-2) having a functional group which can react with ionic species has hydroxyl group, and glycidyl group and/or a cycloaliphatic epoxy group.

Hereinafter, the thermally-activating ionic polymerization catalyst (3) which can be dissolved by heating and crystallized by cooling is also occasionally called a curing catalyst (3).

The curing catalyst (3) includes two kinds of a first curing catalyst and a second curing catalyst.

The first curing catalyst (3) contains at least one kind of components selected from the group consisting of a cationic polymerization catalyst (3') and a metal compound (3"), and at least one of the components in the curing catalyst (3) can be dissolved by heating and crystallized by cooling.

The cationic polymerization catalysts (3') is selected from the group consisting of a sulphonium salt represented by general formula (I-1) described below, an iodonium salt represented by general formula (I-2), an aromatic iron compound represented by general formula (I-3), an organo-silicon compound represented by general formula (I-4), and a compound represented by general formula (I-5). Further, the metal compound (3") is selected from the group consisting of compounds represented by general formulae (II-1) to (II-3) described blow.

 (I-1)

 (I-2)

 (I-3)

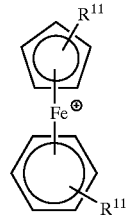

(in the general formulae, $R^{11}$, $R^{12}$, and $R^{13}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10

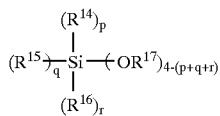 (I-4)

in the molecule. X is $SbF_6$, $AsF_6$, $PF_6$, and $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO, $R^2$—$SO_3$. Herein, $R^1$ and $R^2$ are an alkyl group or phenyl group which may be even substituted with an alkyl group, a halogen atom, nitro group, cyano group, and alkoxy group, etc.)

(in the general formula, $R^{14}$, $R^{15}$, $R^{16}$ and $R^{17}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. "p, q, and r" are an integer of 0–3, and "p+q+r" is not more than 3.)

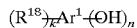 (I-5)

(in the general formula, $Ar^1$ is a substituted or nonsubstituted aromatic group or heteroaromatic group, $R^{18}$ may be identical or different, and which is a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. "k" is an integer of 1–7, "n" is an integer of 1–7, respectively.)

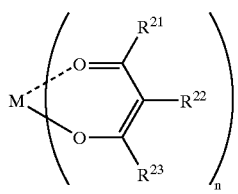 (II-1)

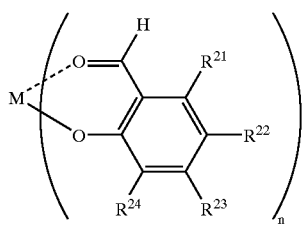 (II-2)

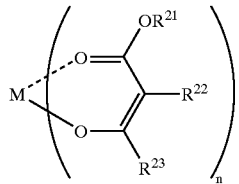 (II-3)

(in the general formula, $R^{21}$, $R^{22}$, $R^{23}$, and $R^{24}$ may be identical to or different from each other, and which are a hydrogen atom, a substituted or nonsubstituted hydrocarbon group of a carbon number of at least 1–30, respectively, provided that $R^{21}$, $R^{22}$, $R^{23}$, and $R^{24}$ contain at least one groups having a carbon number of not less than 10 in one ligand. M is selected from the group consisting of Al, Ti, Cr, Mn, Fe, Co, Ni, Cu, Zr, Zn, Ba, Ca, Ce, Pb, Mg, Sn, and V, and "n" is a integer of 2–4.)

The second curing catalyst (3) contains at least one kind compound selected from the group consisting of a compound represented by general formulae (III-1'), (III-1) and (III-2), and at least one kind of components in the second curing catalyst (3) can be dissolved by heating and crystallized by cooling.

1. Epoxy Compound (i-1)

The epoxy compound (i-1) to be employed in the present invention (i) has an ionic polymerizability, and it is an epoxy compound having viscosity at 25° C. of not more than 1,000 cP.

The epoxy compound (i-1) is a compound having at least one piece, preferably, 2–3 pieces of a cycloaliphatic epoxy group in the molecule and a number average molecular weight of not more than 2,000, preferably approximately 100–1500, and an epoxy equivalent of 30–1000, preferably 80–400 in consideration of the ionic polymerizability and viscosity.

As the epoxy compound (i-1), there are enumerated a compound having a terminal epoxy group such as glycidylether and glycidylester, a compound having an internal epoxy group, and a compound having a cycloaliphatic epoxy group.

As the epoxy compound (i-1), there are specifically enumerated CEL-2021P (3,4-epoxycyclohexylmethyl-3',4'-epoxycyclohexane carboxylate having an epoxy equivalent of 128–140 and a viscosity of 200–350 cP/25° C.), CEL-2021A (3,4-epoxycyclohexylmethyl-3',4'-epoxycyclohexane carboxylate having an epoxy equivalent of 130–145 and a viscosity of 200–450 cP/25° C.), CEL-2000 (1-vinyl-3,4-epoxycyclohexane having a viscosity of 1.5 cP/25° C.), CEL-3000 (1,2,8,9-diepoxylimonene having an epoxy equivalent of not more than 93.5 and a viscosity of 5–20 cP/25° C.), Epolead GT-300 and Epolead GT-400 series (an epoxidized compound of a monoester of tetrahydrophthalic acid with tetrahydrobenzyl alcohol and an ε-caprolactone-modified epoxidized compound of monoester of tetrahydrophthalic acid with tetrahydrobenzyl alcohol) (which are manufactured by Daicel Chemical Industries, Ltd.).

Further, there are enumerated Denakol EX-421, 201 (resorcin glycidylether), 211 (neopentylglycol diglycidylether), 911 (propyleneglycol diglycidylether), and 701 (diglycidylester of adipic acid) (which are manufactured by Nagase Kasei Kogyo, Ltd.).

Still further, there are enumerated dicyclopentadiene dioxide, bis(2,3-epoxycyclopentyl)ether, ethyleneglycol diester of epoycyclohexene carboxylic acid, bis(3,4- epoxycyclohexyl methyl)adipate, bis(4,5-epoxy-2-methylcyclohexylmethyl)adipate, ethyleneglycolbis(3,4-epoxycyclohexanecarboxylate), 1,2,5,6-diepoxy-4,7-methanoperhydroindene, 2-(3,4-epoxycyclohexyl-3',4'-epoxy-1,3-dioxane-5-spyrocyclohexane, 1,2-ethylenedioxy-bis(3,4-epoxycyclohexylmethane), and di-2,3-epoxycyclopentylether, etc.

Furthermore, the epoxy compound (i-1) can be employed together with a vinyl ether which is a compound having an ionic polymerizability, and oxetane, etc. In the case that the vinyl ether and oxetane are formulated, those are preferably employed in not more than 30% with respect to total 100% by weight of the epoxy compound (i-1), the acrylic resin (i-2), and the vinyl ether and oxetane.

Proportion of the compound having epoxy group in the composition composed of the epoxy compound (i-1) and the acrylic resin (i-2) is 20–90% by weight, and preferably 40–80% by weight.

Besides, as the epoxy compound (i-1), there can be also employed a resin having an epoxy group and a reactive silicone group in the molecule, and a mixed of a resin having an epoxy group and a resin having a reactive silicone group. The reactive silicone group means a silanol group in which hydroxyl group is directly connected to silicon atom, or a group (a group which produces silanol group by hydrolysis) in which a hydrolyzable group is directly connected to silicon atom. As the hydrolyzable group directly connected to silicon atom, for example, there are enumerated an alkoxyl group, acyloxy group, and ketoxime group, etc. which have a carbon number of 1–5, preferably a carbon number of 1–3. As a preferred specific examples of the hydrolyzable group, for example, there are enumerated an alkoxyl group such as methoxy group, ethoxy group, and propoxy group; an acyloxy group such as acetoxy group and propionyloxy group, and a ketoxime group such as acetoxime group and propionyloxime group, etc. Of the hydrolyzable groups, the alkoxyl group having a carbon number of 1–3 is particularly preferred which has an excellent effect in storage stability and low temperature curability.

Further, as the epoxy compound (i-1), there can be mixed a bisphenol type epoxy compound, a novolak type epoxy compound, and a brominated type epoxy compound thereof and, specifically, there can be employed a bisphenol A type epoxy resin, a bisphenol F type epoxy resin, a phenol-novolak type epoxy resin, an orthocresol-novolak type epoxy resin, a DPP novolak type epoxy resin, a tris-hydroxyphenylmethane type epoxy resin, other multifunctional type epoxy resin, and a tetrabromobisphenol A type epoxy resin, etc. depending upon purposes thereof.

The epoxy resins can be added in a range of 0–70% by weight based on 100% by weight of the epoxy compound (i-1).

2. Acrylic Resin (i-2)

The acrylic resin (i-2) to be employed in the present invention (i) is an acrylic resin having a functional group which is capable of reacting with ionic species and, particularly, an acrylic resin having epoxy group and hydroxyl group is preferred.

The acrylic resin (i-2) having epoxy group and hydroxyl group is an acrylic resin having epoxy group in which a number average molecular weight is 2,000–50,000, a hydroxyl group value is 10–250 mgKOH/g, and an epoxy equivalent is not more than 300.

The acrylic resin (i-2) is constructed by monomer components including a monomer having an epoxy group, a monomer having hydroxyl group, and/or a monomer having epoxy group and hydroxyl group, and other copolymerizable monomers.

As monomers which are constructing components for the acrylic resin (i-2), there can be employed a (meth)acrylate having glycidylether group or a similar terminal epoxy group and a (meth)acrylate having a cycloaliphatic epoxy group, etc.

As the monomers, for example, in addition to glycidyl methacrylate which is widely employed as an acrylate having an epoxy group, there can be enumerated 2-methylglycidyl methacrylate, allylglycidyl ether, epoxidized iso-prenyl methacrylate, CYM M-100 (an epoxy equivalent of 196–213) (3,4-epoxycyclohexylmethylmethacrylate), CYM A-200 (an epoxy equivalent of 182–195) (3,4-epoxycyclohexylmethylacrylate), CYM M-101 (an epoxy equivalent of 326–355) (a product containing a group in which ε-caprolactone is polymerized by ring-opening between 3,4-epoxycyclohexylmethyl group and a (meth)acrylate group (which are manufactured by Daicel Chemical Industries), 2-(1,2-epoxy-4,7-methanoperhydroindene-5(6)-yl)oxyethyl(meth)acrylate, 5,6-epoxy-4,7-methanoperhydroindene-2-yl)-(meth)acrylate, and 1,2-epoxy-4,7-methanoperhydroindene-5-yl)-(meth)acrylate, etc.

In the monomers which are constructing components for the acrylic resin (i-2), as a copolymerizable monomer containing hydroxyl group, there can be enumerated hydroxyethylmethacrylate, hydroxyethylacrylate, PCL-FM1, PCL-FM3, PCL-FM10, PCL-FA1, and PCL-FA3, etc. in which an acrylate containing hydroxyl group is modified by caprolactone (manufactured by Daicel Chemical Industries), and a monoesterified product of a (meth)acrylic acid with a glycol having a carbon number of 3–10, a mono esterified product of a polyetherpolyol such as a polyethylene glycol, a polypropylene glycol, and a polybutylene glycol, with (meth)acrylic acid, etc.

Amount of hydroxyl group in components composed of the epoxy compound (i-1) and the acrylic resin (i-2) is 1–300 mgKOH/g, and preferably 1.5–250 mgKOH/g as a hydroxyl group value.

As the constructing components for the acrylic resin (i-2), further, there can be employed a usual alkylacrylate monomer, etc. as a copolymerizable component.

As the alkylacrylate monomer, there can be enumerated methyl(meth)acrylate, n-butyl(meth)acrylate, and an alkylacrylate monomer having a carbon number of 2–10 pieces at an alkyl portion, preferably 1–5 pieces.

As other monomer components to be employed for the acrylic resin (i-2), further, there can be enumerated styrene, α-methylstyrene, vinyltoluene, and vinylchloride, etc., and there can be also employed a polymerizable monomer having carboxylic group such as acrylic acid, methacrylic acid, crotonic acid, itaconic acid, maleic acid, and fumaric acid; an amide-based polymerizable monomer such as N-methylol (meth)acrylic amide, N-methoxymethyl (meth)acrylic amide, and N-butoxymethyl (meth)acrylic amide; vinylethers such as ethylvinylether, propylvinylether, butylvinylether, hexylvinylether, cyclopentylvinylether, cyclohexylvinylether, phenylvinylether, benzylvinylether, and allylglycidyl ether; vinyl acetate, vinyl propionate, ethylene, propylene, N,N-dimethylaminoethyl(meth)acrylate, N,N-diethylaminoethyl(meth)acrylate, (meth)acrylic amide, (meth)acrylonitrile, and vinylpyrrolidone, etc.

Further, there can be also employed ethylenic unsaturated monomers such as an ethylenic unsaturated monomer having a reactive silicone group and an ethylenic unsaturated monomer having a perfluoroalkyl group or perfluoroalkenyl group. As the ethylenic unsaturated monomer having a reactive silicone group, for example, there can be enumerated vinyltrimethoxy silane, vinyltriethoxy silane, vinyltris (2-methoxyethoxy)silane, γ-(meth)acryloyloxypropyl trimethoxy silane, γ-(meth)acryloyloxypropyl triethoxy silane, γ-(meth)acryloyloxypropyl methyldimethoxy silane, β-(meth)acryloyloxyethylpropyl trimethoxy silane, a cocondensate of those with an alkoxysilane (for example, tetraalkoxy silane and trialkoxy alkylsilane, etc.), a reaction product of a low molecular weight condensate of an ethylenic unsaturated monomer having hydroxyl group (for example, hydroxypropyl(meth)acrylate and hydroxybutyl (meth)acrylate, etc.) with tetraalkoxy silane, etc., and at least one kind thereof is employed. As the low molecular weight condensate of the tetraalkoxy silane, there is preferred a polymer having approximately 2–100 units, and preferably approximately 2–10 units obtained by a condensation reaction of a tetraalkoxy silane it self in which the alkoxy group is hydrogen atom, methyl group, ethyl group, and propyl group. As the low molecular weight condensate, for example, there can be enumerated "Kolcoat ES40" (a trade name, hereinafter the same, 1–10 units condensate of tetraethylsilicate manufactured by Kolcoat, Ltd., 5 units condensate on an average) and "Kolcoat MS51" (a trade name, hereinafter the same, 1–10 units condensate of tetramethylsilicate, and 4 units condensate on an average), etc.

As copolymerizable acrylic components for the acrylic resin (i-2), there can be also employed an acrylic-based oligomer. Specifically, there can be also employed an epoxidized oil acrylate-based compound, a urethane acrylate-based compound, a polyester urethane acrylate-based compound, a polyether urethane acrylate-based compound, an unsaturated polyester-based compound, a polyester acrylate-based compound, a polyether acrylate-based compound, a vinyl/acrylate-based compound, a polyene/thiol-based compound, a silicone acrylate-based compound, a polybutadiene acrylate-based compound, a polystyrethylmethacrylate-based compound, and a polycarbonate diacrylate-based compound, etc.

In the case of polymerizing the constructing components for the acrylic resin (i-2), an initiator can be employed. As the initiator, there can be employed potassium persulphate, benzoyl peroxide, ammonium persulphate, hydrogen peroxide, d-t-butylperoxide, diemylperoxide, 2,4-dichlorobenzoyl peroxide, decanoyl peroxide, lauryl peroxide, cumenhydroperoxide, t-butylhydroperoxide, acetylperoxide, methylethylketoneperoxide, succinic peroxide, dicetylperoxydicarbonate, t-butylperoxyacetate, AIBN (2,2'-azobisisobutyronitrile), ABN-E (2,2'-azobis(2-methylbutyronitrile), ABN-V (2,2'-azobis(2,4-dimethylvaleronitrile)), and Perbutyl O (t-butylperoxy-2-ethylhexanoate), etc.

Use amount of the initiator is 1–10 parts by weight, and preferably 3–6 parts by weight based on 100 parts by weight of the constructing components for the acrylic resin (i-2).

The initiator may be even in advance fed partially, and may be added dropwise after mixing with monomers, or it may be separately fed without mixing. Further, the initiator may be even additionally fed after having fed the monomers.

Polymerization temperature in synthesis of the acrylic resin (i-2) is 90–130° C., preferably 100–120° C. In the case that the polymerization temperature is more than 130° C., compounds having high molecular weight are produced because of an unstable polymerization and, in the case that it is less than 90° C., it is not preferred because of a long time of reaction period.

As solvents in polymerization of the acrylic resin (i-2), there are employed the epoxy compound (i-1) or usual solvents not having an ionic polymerizability described below.

Further, after having synthesized the acrylic resin using the usual solvents not having an ionic polymerizability and having removed the solvents, it may be diluted by the epoxy compound (i-1) to prepare a resin composition.

As the solvents not having an ionic polymerizability, there are enumerated aromatic-based solvents such as toluene and xylene, methylethylketone, or methylisobutylketone, and methoxypropylene glycol acetate, etc., and those can be employed solely or in combination.

Content of the (meth)acrylate containing an epoxy group, for example, glycidylmethacrylate is 1–80% by weight, and preferably 15–60% by weight in the acrylic resin (i-2).

Oxirane oxygen concentration is 5–10% by weight, and preferably 7–10% by weight in a resin composition composed of the epoxy compound (i-1) and the acrylic resin (i-2).

3. Thermally-Activating Ionic Polymerization Catalyst (3)

The thermally-activating ionic polymerization catalyst (3) employed in the present inventions (i)–(v), that is, the curing catalyst (3) is a first curing catalyst and/or second curing catalyst described hereinafter.

Formulation amount of the first curing catalyst and/or second curing catalyst described hereinafter is based on total amount of the epoxy compound (i-1) and the acrylic resin (i-2) (that is, compounds having an epoxy group). Hereinafter, it is the same as in the invention (ii)–(v).

3.1. First Curing Catalyst

The first curing catalyst contains at least one kind of components selected from the group consisting of the cationic polymerization catalyst (3') and the metal compound (3"). The at least one kind of components preferably have a characteristic that those can be reversibly dissolved and crystallized by heating and cooling.

The heating means heating at a higher temperature than room temperatures, specifically, at from not less than 40° C. to curing temperature and, the cooling means cooling at a temperature range of not more than curing temperature, specifically, at not more than 80° C., preferably not more than 60° C. Further, crystallization means that the catalyst forms a colloid or micelle, and a crystal in the epoxy compound (i-1) and the acrylic resin (i-2), and a position activity in the catalyst may be a state existing apart (isolated) from the epoxy compound (i-1) and/or the acrylic resin (i-2). Hereinafter, it is the same as in the invention (ii)–(v).

Still further, if thermal activation (also called a latent property or a thermally latent property) of the catalyst can be confirmed by a storage stability test, etc., size thereof is not limited, and there is preferred capability of identifying an average particle diameter of the catalyst of not less than 0.1 µm.

In the present invention, dissolving means that the curing catalyst (3) having the above-described shape dissolves even partially in the epoxy compound (i-1) and/or the acrylic resin (i-2) and, for example, if there can be identified a change of the catalyst becoming from cloudy to transparent by observing with a microscope while heating after sampling the curing catalyst crystallized in the epoxy compound (i-1) and/or the acrylic resin (i-2) together with resins on a glass plate, it means dissolving.

Further, it is more preferred to identify an endothermic peak derived from dissolving of the curing catalyst in the epoxy compound (i-1) and the acrylic resin (i-2) with DSC (differential scanning calorimeter).

3.1.1. Cationic Polymerization Catalyst (3')

As the cationic polymerization catalyst (3') to be formulated in the first curing catalyst, for example, there is enumerated a compound having a substituted or nonsubstituted hydrocarbon group of a carbon number of at least 10, or having at least one cyclic organic structure which has a substituted or nonsubstituted hydrocarbon group of a carbon number of at least 10 in the molecule. The carbon number is more preferably at least 16, The hydrocarbon group and the cyclic organic structure may be even exist as a substituted group, and may be even exist as a portion for constructing a ligand.

Further, as the cyclic organic structure, there are enumerated an aromatic, heteroaromatic, condensed aromatic, and condensed heteroaromatic structure, etc.

As an element which becomes cation in components for the cationic polymerization catalyst, for example, there can be enumerated S, I, Fe, N, O, P, Mg, Mn, and Si, etc.

It is specifically illustrated. As the components for the cationic polymerization catalyst, for example, there are enumerated a sulphonium salt represented by general formula (I-1), an iodonium salt represented by general formula (I-2), an aromatic iron compound represented by general formula (I-3), an organosilicon compound represented by general formula (I-4), and a compound represented by general formula (I-5).

3.1.1.1. Onium Salt-Based Catalyst

As the onium salt-based catalyst, in addition to the sulphonium salt (I-1), the iodonium salt (I-2), the aromatic iron compound (I-3), there may be even employed an ammonium salt, a diazonium salt, a pyrolium salt, a pyrilium salt, quinolium salt, anilinium salt, a piridinium salt, a benzyl ammonium salt, benzothiazolium compound salt, a benzyl piridinium salt, a benzyl sulphonium salt, and a benzyl phosphonium salt, etc.

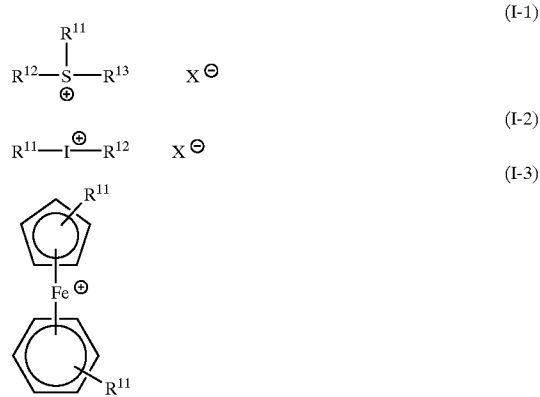

In the formulae, $R^{11}$, $R^{12}$, and $R^{13}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. X is $SbF_6$, $AsF_6$, $PF_6$, or $BF_4$, an anionic derivative therefrom in which at least one piece of fluorine atom is substituted with hydroxyl group, an anion selected from the group consisting of $CF_3SO_3$, $ClO_4$, a halogen atom, $R^1$—COO, and $R^2$—$SO_3$. Herein, $R^1$ and $R^2$ are an alkyl group or phenyl group which may be even substituted with an alkyl group, a halogen atom, nitro group, cyano group, and alkoxy group, etc.

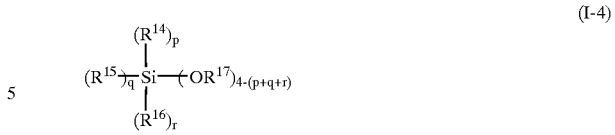

In the formula, $R^{14}$, $R^{15}$, $R^{16}$ and $R^{17}$ may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. "p, q, and r" are an integer of 0–3, and "p+q+r" is not more than 3.

In the formula, $Ar^1$ is a substituted or nonsubstituted aromatic group or heteroaromatic group, $R^{18}$ may be identical or different, and which is a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. k and n are an integer of 1–7, respectively.

In the above-mentioned general formulae, as hydrocarbons to be introduced as $R^{11}$–$R^{18}$, for example, there are employed branched chain groups or linear chain groups such as methane, ethane, propane, butane, pentane, hexane, heptane, octane, nonane, decane, undecane, dodecane, tridecane, tetradecane pentadecane, hexadecane, heptadecane, octadecane, nonadecane, icosane, henicosane, docosane, tricosane tetracosane, pentacosane, hexacosane, heptacosane, octacosane, nonacosane, and triacosane, and a compound having a steroid structure such as cholesterol Further, the above-mentioned hydrocarbons may contain a hetero atom such as F, Si, O, and N.

Still further, in the above-mentioned general formulae, as substituted or nonsubstituted aromatic or heteroaromatic groups to be introduced as $R^{11}$–$R_{18}$, for example, there are enumerated phenyl group, benzyl group, methylbenzyl group, dimethylbenzyl group, trimethylbenzyl group, chlorobenzyl group, dichlorobenzyl group, trichlorobenzyl group, nitrobenzyl group, dinitrobenzyl group, trinitrobenzyl group, and naphtylmethyl group; a condensed aromatic ring group such as naphthyl, anthrathenyl, and phenantlenyl groups in which 2 or 3 pieces of benzene rings are condensed; a single ring type heteroaromatic ring group such as phranyl, thiophenyl, pyrolyl, pylonylyl, pyrodinyl, oxazolyl, isooxazolyl, thiazolyl, isothiazolyl, imidazolyl, imidazolynyl, imidazolydinyl, pirazolyl, pirazolydinyl, triazolyl, phrazanyl. tetrazolyl, pyranyl, thynyl, pyridinyl, piperidinyl, oxadynyl, morpholynyl, thiazynyl, piridadinyl, pyrimidinyl, pyradinyl, piperadinyl, and triazynyl groups; a condensed heteroaromatic ring group such as benzophranyl, isobenzophranyl, benzothiophenyl, indolyl, indolynyl, isoindolyl, benzoxazolyl, benzothiazolyl, indazolyl, imidazolyl, chlomenyl, chlomanyl, isochlomanyl, quinolyl, isoquinolyl, sinolynyl, phtharadinyl, quinazolinyl, quinoxalinyl, dibenzophranyl, carbazolyl, xanthenyl, acrydinyl, phenantridinyl, phenantrolinyl, phenadinyl, phenoxadinyl, thianthrenyl, indolidinyl, quinolidinyl, quinuclydinyl, naphtylidinyl, prinyl, and phtelidinyl; and a group thereof in which hydrogen atom is substituted by at least one substituted groups.

As a substituted group in the substituted or nonsubstituted aromatic or heteroaromatic groups, there can be enumerated organic groups having a carbon number of at least 1 and, in the case of a plurality of groups, those may be even identical to or different from each other.

As the sulphonium salt represented by the above-mentioned general formula (I-1), for example, there are enumerated tris(p-octadecyloxyphenyl)sulphonium hexafluoroantimonate, bis(p-octadecyloxyphenyl)phenylsulphonium hexafluoroantimonate, (p-octadecyloxyphenyl)diphenylsulphonium hexafluoroantimonate, tris(p hexadecyloxyphenyl)sulphonium hexafluoroantimonate, bis(p-hexadecyloxyphenyl)phenylsulphonium hexafluoroantimonate, (p-hexadecyloxyphenyl)diphenylsulphonium hexafluoroantimonate, benzyl-4-octadecyloxyphenylmethylsulphonium hexafluoroantimonate, benzyl-4-octadecyloxyphenylethylsulphonium hexafluoroantimonate, benzyl-4-octadecyloxyphenylsulphonium hexafluoroantimonate, tris(p-octadecyloxyphenyl)sulphonium hexafluorophosphate, bis(p-octadecyloxyphenyl)phenylsulphonium hexafluorophosphate, (p-octadecyloxyphenyl)diphenylsulphonium hexafluorophosphate, tris(p-hexadecyloxyphenyl)sulphonium hexafluorophosphate, bis(p-hexadecyloxyphenyl)phenylsulphonium hexafluorophosphate, (p-hexadecyloxyphenyl)diphenylsulphonium hexafluorophosphate, benzyl-4-octadecyloxyphenylmethylsulphonium hexafluorophosphate, benzyl-4-octadecyloxyphenylethylsulphonium hexafluorophosphate, benzyl-4-octadecyloxyphenylsulphonium hexafluorophosphate, tris(p-octadecyloxyphenyl)sulphonium hexafluoroarsenate, bis(p-octadecyloxyphenyl)phenylsulphonium hexafluoroarsenate, (p-octadecyloxyphenyl)diphenylsulphonium hexafluoroarsenate, tris(p-hexadecyloxyphenyl)sulphonium hexafluoroarsenate, bis(p-hexadecyloxyphenyl)phenylsulphonium hexafluoroarsenate, (p-hexadecyloxyphenyl)diphenylsulphonium hexafluoroarsenate, benzyl-4-octadecyloxyphenylmethylsulphonium hexafluoroarsenate, benzyl-4-octadecyloxyphenylethylsulphonium hexafluoroarsenate, benzyl-4-octadecyloxyphenylsulphonium hexafluoroarsenate, tris(p-octadecyloxyphenyl)sulphonium tetrafluoroborate, bis(p-octadecyloxyphenyl)phenylsulphonium tetrafluoroborate, (p-octadecyloxyphenyl)diphenylsulphonium tetrafluoroborate, tris(p-hexadecyloxyphenyl)sulphonium tetrafluoroborate, bis(p-hexadecyloxyphenyl)phenylsulphonium tetrafluoroborate, (p-hexadecyloxyphenyl)diphenylsulphonium tetrafluoroborate, benzyl-4-octadecyloxyphenylmethylsulphonium tetrafluoroborate, benzyl-4-octadecyloxyphenylethylsulphonium tetrafluoroborate, benzyl-4-octadecyloxyphenylsulphonium tetrafluoroborate, tris(p-octadecyloxyphenyl)sulphonium trifluoromethanesulphonate, bis(p-octadecyloxyphenyl)phenylsulphonium trifluoromethanesulphonate, (p-octadecyloxyphenyl) diphenylsulphonium trifluoromethane sulphonate, tris(p-hexadecyloxyphenyl)sulphonium trifluoromethanesulphonate, bis(p-hexadecyloxyphenyl)phenylsulphonium trifluoromethanesulphonate, (p-hexadecyloxyphenyl)diphenylsuphonium trifluoromethane sulphonate, benzyl-4-octadecyloxyphenylmethylsulphonium trifluoromethane sulphonate, benzyl-4-octadecyloxyphenylethyl sulphonium trifluoromethanesulphonate, benzyl-4-octadecyloxyphenylsulphonium trifluoromethanesulphonate, p-octadecyloxybenzyltetramethylenesulphonium hexafluoroantimonate, (4-octadecyloxyphenyl)sinnamylmethylsulphonium hexafluoroantimonate, (4-octadecyloxyphenyl) (3-methyl-2-butenyl)methylsulphonium hexafluoroantimonate, 4-octadecyloxyphenyl-($\alpha$-naphtylmethyl)methylsulphonium hexafluoroantimonate, 4-octadecyloxyphenyl-9-fluorenylmethylsulphonium hexafluoroantimonate, tris(4-octadecyloxyphenylmethyl)sulphonium hexafluoroantimonate, o-nitrobenzyl-4-octadecyloxyphenyl- methylsulphonium hexafluoroantimonate, $\alpha$-phenylbenzyl-4-octadecyloxyphenylmethylsulphonium hexafluoroantimonate, $\alpha$-methylbenzyl-4-octadecyloxyphenylmethylsulphonium hexafluoroantimonate, dibenzyl-4-octadeyloxyphenylsulphonium hexafluoroantimonate, and 4-octadecyloxyphenylmethylsulphonium hexafluoroantimonate, etc.

There can be also employed a compound in which hexafluoroantimonate, hexafluorophosphnate, hexafluoroarsenate, tetrafluoroborate, and an anion thereof in which at least one fluorine atom is substituted with hydroxyl group which are an anionic portion of the above-mentioned sulphonium salt, and a compound in which those are converted into an anion selected from the group consisting of trifluoromethane sulphonate, a perchlorate, a halogen, $R^1$—COO, and $R^2$—$SO_3$, as a component for the curing catalyst in the present invention (i). $R^1$ and $R^2$ represent an alkyl group or a phenyl group which may be substituted by a halogen atom, nitro group, cyano group, and an alkoxy group, etc.

Further, there can be also employed benzyl-4-octadecyloxyphenylmethyl hexafluoroantimonate, benzyl-4-octadecyloxyphenylmethyl hexafluoroarsenate, benzyl-4-octadecyloxyphenylmethyl hexafluorophosphate, benzyl-4-octadecyloxyphenylmethyl tetrafluoroborate, and benzyl-4-octadecyloxyphenylmethyl trifluoromethanesulphonate, etc.

As the iodonium salt represented by the above-mentioned general formula (I-2), for example, there are enumerated bis(p-octadecyloxyphenyl)iodonium hexafluoroantimonate, (p-octadecyloxyphenyl)phenyliodonium hexafluoroantimonate, bis(p-hexadecyloxyphenyl)iodonium hexafluoroantimonate, (p-hexadecyloxyphenyl) phenyliodonium hexafluoroantimonate, benzyl-4-octadecyloxyphenyl methyliodonium hexafluoroantimonate, benzyl-4-octadecyloxyphenyl ethyliodonium hexafluoroantimonate, benzyl-4-octadecyloxyphenyl iodonium hexafluoroantimonate, bis(p-octadecyloxyphenyl) iodonium hexafluorophosphate, (p-octadecyloxyphenyl) phenyliodonium hexafluorophosphate, bis(p-hexadecyloxyphenyl)iodonium hexafluorophosphate, (p-hexadecyloxyphenyl)phenyliodonium hexafluorophosphate, benzyl-4-octadecyloxyphenyl methyliodonium hexafluorophosphate, benzyl-4-octadecyloxyphenyl ethyliodonium hexafluorophosphate, benzyl-4-octadecyloxyphenyl iodonium hexafluorophosphate, bis(p-octadecyloxyphenyl)iodonium hexafluoroarsenate, (p-octadecyloxyphenyl)phenyliodonium hexafluoroarsenate, bis(p-hexadecyloxyphenyl)iodonium hexafluoroarsenate, (p-hexadecyloxyphenyl) phenyliodonium hexafluoroarsenate, benzyl-4-octadecyloxyphenyl methyliodonium hexafluoroarsenate, benzyl-4-octadecyloxyphenyl ethyliodonium hexafluoroarsenate, benzyl-4-octadecyloxyphenyl iodonium hexafluoroarsenate, bis(p-octadecyloxyphenyl)iodonium tetrafluoroborate, (p-octadecyloxyphenyl)phenyliodonium tetrafluoroborate, bis(p-hexadecyloxyphenyl)iodonium tetrafluoroborate, (p-hexadecyloxyphenyl)phenyliodonium tetrafluoroborate, benzyl-4-octadecyloxyphenyl methyliodonium tetrafluoroborate, benzyl-4-octadecyloxyphenyl ethyliodonium tetrafluoroborate, benzyl-4-octadecyloxyphenyl iodonium tetrafluoroborate, bis(p-octadecyloxyphenyl)iodonium trifluoromethylsulphonate, (p-octadecyloxyphenyl)phenyliodonium trifluoromethylsulphonate, bis(p-hexadecyloxyphenyl)iodonium trifluoromethylsulphonate, (p-hexadecyloxyphenyl) phenyliodonium trifluoromethylsulphonate, benzyl-4-octadecyloxyphenyl methyliodonium trifluoromethylsulphonate, benzyl-4-octadecyloxyphenyl ethyliodonium trifluoromethylsulphonate, benzyl-4-octadecyloxyphenyl-iodonium trifluoromethylsulphonate, and p-octadecyloxybenzyltetramethyleneiodonium hexafluoroantimonate, (4-octadecyloxyphenyl) cinnamylmethyliodonium hexafluoroantimonate, (4-octadecyloxyphenyl) (3-methyl-2-butenyl)iodonium hexafluoroantimonate, 4-octadecyloxyphenyl-(α-naphtylmethyl)iodonium hexafluoroantimonate, 4-octadecyloxyphenyl-9-fluorenyliodonium hexafluoroantimonate, bis-(4-octadecyloxyphenylmethyl) iodonium hexafluoroantimonate, o-nitrobenzyl-4-octadecyloxyphenyliodonium hexafluoroantimonate, α-phenylbenzyl-4-octadecyloxyphenyliodonium hexafluoroantimonate, α-methylbenzyl-4-octadecyloxyphenyliodonium hexafluoroantimonate, benzyl-4-octadecyloxyphenyliodonium hexafluoroantimonate, and 4-octadecyloxyphenylmethyliodonium hexafluoroantimonate, etc.

There can be also employed a compound in which hexafluoroantimonate, hexafluorophosphnate, hexafluoroarsenate, tetrafluoroborate, and an anion thereof in which at least one fluorine atom is substituted with hydroxyl group which are an anionic portion of the above-mentioned iodonium salt, and a compound in which those are converted into an anion selected from the group consisting of trifluoromethane sulphonate, a perchlorate, a halogen, $R^1$—COO, and $R^2$—$SO_3$, as a component for the curing catalyst in the present invention (i). $R^1$ and $R^2$ represent an alkyl group or a phenyl group which may be substituted by a halogen atom, nitro group, cyano group, and an alkoxy group, etc.

Further, there can be employed an onium salt represented by general formula described below.

As a pyrilium salt, there is employed a compound represented by general formula described below.

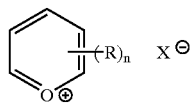

In the general formula, R may be identical to or different from each other, and which are a hydrogen atom, a substituted or nonsubstituted hydrocarbon group of a carbon number of 1–30, and a substituted or nonsubstituted aromatic group or heteroaromatic group, respectively, provided that there is contained at least one substituted or nonsubstituted hydrocarbon group of a carbon number of at least 10 or at least one cyclic organic structure containing a substituted or nonsubstituted hydrocarbon group of a carbon number of at least 10 in the molecule. R is a halogen atom, nitro group, and cyano group. And, n is an integer of 1–5.

X is $SbF_6$, $AsF_6$, $PF_6$, or $BF_4$, an anionic derivative therefrom in which at least one piece of fluorine atom is substituted with hydroxyl group, an anion selected from the group consisting of $CF_3SO_3$, $ClO_4$, a halogen atom, $R^1$—COO, and $R^2$—$SO_3$. Herein, R is an alkyl group, a halogen atom, nitro group, cyano group, and alkoxy group, etc., and an alkyl group or a phenyl group which may be even substituted with an alkyl group.

As the pyrilium salt represented by the above-described general formula, there can be enumerated 2,6-dimethyl-4-octadecyloxyphenylpyrilium hexafluoroantimonate and 2,6-dimethyl-3-(4-octadecyloxyphenyl)propylpyrilium hexafluoroantimonate, etc.

Formulation amount is usually 0.01%–20% by weight, and preferably 0.1%–5% by weight based on the compound (i-1) and the resin (i-2). In the case that the formulation amount is less than 0.01% by weight, it is afraid that curing becomes insufficient.

Further, although it is possible to employ exceeding 20% by weight, it is not preferred because of problems of high costs and decomposed products of the catalyst components.

As the benzyl sulphonium salt, there are enumerated compounds represented by general formula described below.

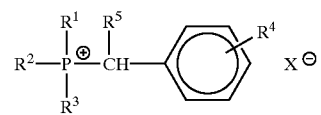

In the general formula, $R^1$, $R^2$, $R^3$, $R^4$, and $R^5$ may be identical to or different from each other, and which are a hydrogen atom, a substituted or nonsubstituted hydrocarbon group of a carbon number of 1–30, or a substituted or nonsubstituted aromatic group or heteroaromatic group, respectively, provided that those are substituted or nonsubstituted hydrocarbon groups having a carbon number of not less than 10, or a substituted or nonsubstituted aromatic group or heteroaromatic group having substituted or non-substituted hydrocarbon groups having a carbon number of not less than 10, respectively. $R^4$ also includes a halogen atom, nitro group, and cyano group. "n" is an integer of 1–5.

X is $SbF_6$, $AsF_6$, $PF_6$, or $BF_4$, an anionic derivative therefrom in which at least one piece of fluorine atom is substituted with hydroxyl group, an anion selected from the group consisting of $CF_3SO_3$, $ClO_4$, a halogen atom, $R^1$—COO, and $R^2$—$SO_3$. Herein, R is an alkyl group or phenyl group which may be even substituted with an alkyl group, a halogen atom, nitro group, cyano group, and alkoxy group, etc.

As the benzyl phosphonium salt represented by the above-described general formula, there can be enumerated benzyltris(4-octadecyloxyphenyl)phosphonium hexafluoroantimonate and α-phenylbenzyltris(4-octadecyloxyphenyl)phosphonium hexafluoroantimonate, etc.

As a component of the catalyst for curing in the present invention (i), there can be also employed a compound in which hexafluoroantimonate and an anion portion in the benzyl phosphonium salt are converted to hexafluorophosphate, hexafluoroarsenate, tetrafluoroborate, an anion (at least one fluorine atom thereof is replaced with hydroxyl group), and an anion selected from the group consisting of trifluoromethane sulphonate, perchlorate, a halogen, $R^1$—COO, and $R^2$—$SO_3$. $R^1$ and $R^2$ are an alkyl group or a phenyl group which may be even substituted with an alkyl group, a halogen atom, nitro group, cyano group, and alkoxy group, etc.

Formulation amount is usually 0.01%–20% by weight, and preferably 0.1%–5% by weight based on total of the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

As the benzyl ammonium salt, there are enumerated compounds represented by general formula described below.

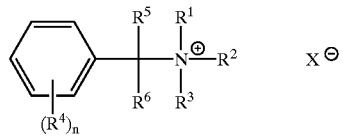

In the general formula, $R^1$, $R^2$, $R^3$, $R^4$, $R^5$, and $R^6$ may be identical to or different from each other, and which are a hydrogen atom, a substituted or nonsubstituted hydrocarbon group of a carbon number of not less than 1–30, a substituted or nonsubstituted aromatic group or heteroaromatic group, respectively, provided that those have at least one of substituted or nonsubstituted hydrocarbon groups having a carbon number of not less than 10 or a substituted or nonsubstituted aromatic group or heteroaromatic group which has a substituted or nonsubstituted hydrocarbon group having a carbon number of not less than 10. Further, both of $R^5$ and $R^6$ are a hydrogen atom, or one is a hydrogen atom and another is an alkyl group or a halogen atom and, or both are an alkyl group or a halogen atom. In the case that both of $R^5$ and $R^6$ are a hydrogen atom, at least one of $R^1$, $R^2$, and $R^3$ are preferably an aromatic group or a heteroaromatic group, provided that $R^4$ includes a halogen atom, nitro group, and cyano group. "n" is an integer of 1–5.

X is $SbF_6$, $AsF_6$, $PF_6$, or $BF_4$, an anionic derivative therefrom in which at least one piece of fluorine atom is substituted with hydroxyl group, an anion selected from the group consisting of $CF_3SO_3$, $ClO_4$, a halogen atom, $R^1$—COO, and $R^2$—$SO_3$. Herein, R is an alkyl group or phenyl group which may be even substituted with an alkyl group, a halogen atom, nitro group, cyano group, and alkoxy group, etc.

As the benzyl ammonium salt represented by the above-described general formula, there are enumerated N-(p-octadecyloxybenzyl)-N,N-dimethylanilinium hexafluoroantimonate, N-(p-octadecyloxybenzyl)-N,N-dimethylanilinium hexafluorophosphate, N-(p-octadecyloxybenzyl)-N,N-dimethylanilinium tetrafluoroborate, N-(α-methyl-p-octadecyloxybenzyl)-N,N-dimethylanilinium hexafluoroantimonate, N-(2-hydroxyethyl)-N-(α-methyl-p-p-octadecyloxybenzyl)-N,N-dimethylammonium hexafluoroantimonate, etc.

Formulation amount is 0.01%–20% by weight, and preferably 0.1%–5% by weight based on total of the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

Of the benzyl ammonium salt, there is also effective a compound in which an anilinium salt in which one of $R^1$, $R^2$, and $R^3$ is represented by a substituted or nonsubstituted phenyl group has an alkyl group in which at least one in another two pieces of $R^1$, $R^2$, and $R^3$ has a substituted group at a carbon in β-position of nitrogen atom.

As the benzyl piridinium salt, there are enumerated compounds represented by general formulae described below.

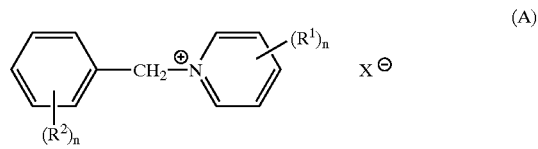

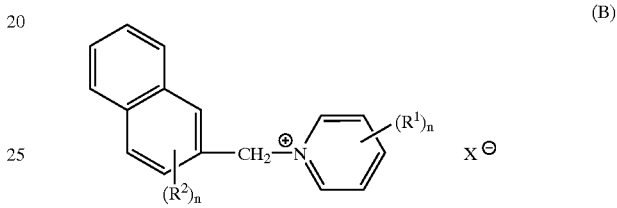

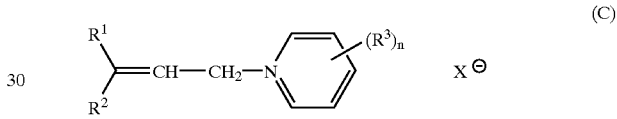

In the general formulae, $R^1$, $R^2$, and $R^3$ may be identical to or different from each other, and which are a hydrogen atom, a substituted or nonsubstituted hydrocarbon group of a carbon number of at least 1–30 or a substituted or nonsubstituted aromatic group or heteroaromatic group, respectively, provided that those have at least one of substituted or nonsubstituted hydrocarbon groups having a carbon number of not less than 10, or a substituted or nonsubstituted aromatic group or heteroaromatic group which has a substituted or nonsubstituted hydrocarbon group having a carbon number of not less than 10. $R^1$ also includes cyano group, $R^2$ also includes a halogen atom, nitro group, and cyano group. "n" is an integer of 1–5, and "m" is an integer of 1–7.

X is $SbF_6$, $AsF_6$, $PF_6$, or $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO, and $R^2$—$SO_3$. Herein, R an alkyl group or phenyl group which may be even substituted with an alkyl group, a halogen atom, nitro group, cyano group, and alkoxy group, etc.

As the benzyl piridinium salt (A) represented by the above-described general formula, there are enumerated 1-(p-octadecyloxybenzyl)-4-cyanopiridinium hexafluoroantimonate, 1-(p-octadecyloxybenzyl)-4-cyanopiridinium hexafluorophosphate, and 1-(p-octadecyloxybenzyl)-4-cyanopiridinium hexafluoroborate, etc.

As the benzyl piridinium salt (B) represented by the above-described general formula, there are enumerated α-naphthyl methyl-(4-octadecyloxy)piridinium hexafluoroantimonate, α-naphthylmethyl-(4-octadecyloxy) piridinium hexafluorophosphate, and α-naphthylmethyl-(4-octadecyloxy)piridinium tetrafluoroborate, etc.

As the benzyl piridinium salt (C) represented by the above-described general formula, there are enumerated cynnamyl-(4-octadecyloxy)piridinium hexafluoroantimonate, 2-butenyl-(4-octadecyloxy)piridinium hexafluoroantimonate, cynnamyl-(4-octadecyloxy) piridinium hexafluorophosphate, and cynnamyl-(4-octadecyloxy)piridinium tetrafluoroborate, etc.

Formulation amount is usually 0.01%–20% by weight, and preferably 0.1%–5% by weight based on the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

As the benzothiazorium salt, there are enumerated compounds represented by general formula described below.

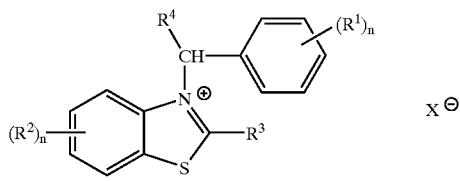

In the general formula, $R^1$, $R^2$, and $R^3$ may be identical to or different from each other, and which are a hydrogen atom, a substituted or nonsubstituted hydrocarbon group of a carbon number of at least 1–30 or a substituted or nonsubstituted aromatic group or heteroaromatic group, respectively, provided that those have at least one of substituted or nonsubstituted hydrocarbon groups having a carbon number of not less than 10, or a substituted or nonsubstituted aromatic group or heteroaromatic group which has a substituted or nonsubstituted hydrocarbon group having a carbon number of not less than 10. $R^1$ and $R^2$ include nitro group. $R^4$ is a hydrogen atom or, an aromatic group or heteroaromatic group. "n" is an integer of 1–5, and "m" is an integer of 1–4. S atom in the thiazorium ring may be even substituted by O atom.

X is $SbF_6$, $AsF_6$, $PF_6$, or $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO and $R^2$—$SO_3$. Herein, R is an alkyl group or phenyl group which may be even substituted with an alkyl group, a halogen atom, nitro group, cyano group, and alkoxy group, etc.

Further, compounds represented by general formula described below may be even employed.

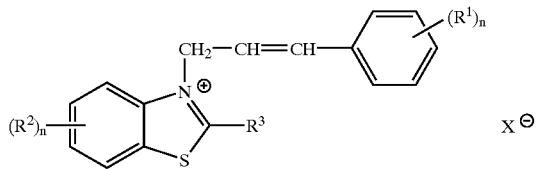

In the general formula, $R^1$, $R^2$, and $R^3$ may be identical to or different from each other, and which are a hydrogen atom, a halogen atom, a substituted or nonsubstituted hydrocarbon group of a carbon number of at least 1–30, or a substituted or nonsubstituted aromatic group or heteroaromatic group, respectively, provided that those have at least one of substituted or nonsubstituted hydrocarbon groups having a carbon number of not less than 10, or a substituted or nonsubstituted aromatic group or heteroaromatic group which has a substituted or nonsubstituted hydrocarbon group having a carbon number of not less than 10. $R^1$ and $R^2$ include nitro group. "n" is an integer of 1–5, and "m" is an integer of 1–4. S atom in the thiazorium ring may be even substituted by O atom.

X is $SbF_6$, $AsF_6$, $PF_6$, and $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO and $R^2$—$SO_3$. Herein, R is an alkyl group or phenyl group which may be even substituted with an alkyl group, a halogen atom, nitro group, cyano group, and alkoxy group, etc.

As the benzothiazolium salt represented by the above-described general formula, there are enumerated 3-(p-octadecyloxybenzyl)benzothiazolium hexafluoroantimonate, 3-(p-octadecyloxybenzyl)-2-methylthiobenzothiazolium hexafluoroantimonate, 3-(p-octadecyloxybenzyl) benzothiazolium hexafluorophosphate, and 3-(p-octadecyloxybenzyl)benzothiazolium hexafluoroborate, etc.

Formulation amount is 0.01%–20% by weight, and preferably 0.1%–5% by weight based on total of the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

As the quinolinium salt, there are enumerated compounds represented by general formula described below.

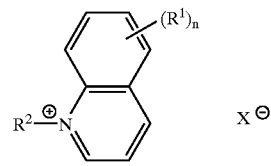

In the general formula, $R^1$ and $R^2$ may be identical to or different from each other, and which is a hydrogen atom, a halogen atom, nitro group, a substituted or nonsubstituted hydrocarbon group of a carbon number of at least 1–30, or a substituted or nonsubstituted aromatic group or heteroaromatic group, respectively, provided that those have at least one of a substituted or nonsubstituted hydrocarbon group of a carbon number of not less than 10, or an aromatic group or heteroaromatic group having the substituted or nonsubstituted hydrocarbon group of a carbon number of not less than 10. $R^2$ is a group selected from the group consisting of an alkyl group substituted by an aromatic group or a heteroaromatic group, and an alkyl group substituted by an unsaturated bond such as ethylene and acetylene. "n" is an integer of 1–7.

X is $SbF_6$, $AsF_6$, $PF_6$, or $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO and $R^2$—$SO_3$. Herein, R is an alkyl group or phenyl group which may be even substituted with an alkyl group, a halogen atom, nitro group, cyano group, and alkoxy group, etc.

As the quinolinium salt represented by the above-described general formula, there are enumerated N-benzyl-(5-octadecyloxy)quinolinium hexafluoroantimonate, N-(1-naphtylmethyl)-5-octadecyloxy quinolinium hexafluoroantimonate, and N-cynnamyl-5-octadecyloxy quinolinium hexafluoroantimonate, etc.

Formulation amount is 0.01%–20% by weight, and preferably 0.1%–5% by weight based on total of the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

As the pyrolinium salt, there are enumerated compounds represented by general formula described below.

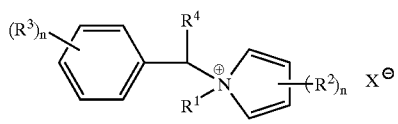

In the general formula, $R^1$, $R^2$, and $R^3$ may be identical to or different from each other, and which is a hydrogen atom, a halogen atom, nitro group, a substituted or nonsubstituted hydrocarbon group of a carbon number of 1–30, or a substituted or nonsubstituted aromatic group or heteroaromatic group, respectively, provided that those have at least one of a substituted or nonsubstituted hydrocarbon group of a carbon number of not less than 10 and an aromatic group or heteroaromatic group having the substituted or nonsubstituted hydrocarbon group of a carbon number of not less than 10. $R^4$ is a hydrogen atom or an alkyl group. "n" is an integer of 1–7.

X is $SbF_6$, $AsF_6$, $PF_6$, or $BF_4$, an anionic derivative therefrom in which at least one piece of fluorine atom is substituted with hydroxyl group, and an anion selected from the group consisting of $CF_3SO_3$, $ClO_4$, a halogen atom, $R^1$—COO, $R^2$—$SO_3$. Herein, R is an alkyl group or phenyl group which may be even substituted with an alkyl group, a halogen atom, nitro group, cyano group, and alkoxy group, etc.

As the pyrolinium salt represented by the above-described general formula, there are enumerated N-(4-octadecyloxybenzyl)-N-methylpyrolinium hexafluoroantimonate, N-benzyl-N-4-octadecyloxyphenyl- pyrolinium hexafluoroantimonate, and N-(4-octadecyloxybenzyl-N-methylpyrolinium)hexafluorophosphate, etc.

Formulation amount is 0.01%–20% by weight, and preferably 0.1%–5% by weight based on total of the epoxy compound (i-1) and the acrylic resin (i-2) in the composition. In the case that the formulation amount is less than 0.01% by weight, it is afraid that curing becomes insufficient. Further, although it is possible to employ exceeding 20% by weight, it is not preferred because of problems of high costs and decomposed products of the catalyst components.

3.1.1.2. Organosilicone Compound-Based Catalyst

As the organosilicon compound-based catalyst represented by the above-described general formula (1-4), for example, there are enumerated tris(p-hexadecyloxyphenyl)silanol, tris(p-octadecyloxyphenyl)silanol, tris(p-dococyloxyphenyl)silanol, tris(m-hexadecyloxyphenyl)silanol, tris(m-octadecyloxyphenyl)silanol, tris(m-dococyloxyphenyl)silanol, bis(p-hexadecyloxyphenyl) silane diol, bis(p-octadecyloxyphenyl)silane diol, bis(p-dococyloxyphenyl)silane diol, bis(m-hexadecyloxyphenyl) silane diol, bis(m-octadecyloxyphenyl)silane diol, bis(m-dococyloxyphenyl)silane diol, bis(p-hexadecyloxyphenyl) methyl silanol, bis(p-hexadecyloxyphenyl)ethyl silanol, bis(p-hexadecyloxyphenyl)propyl silanol, bis(m-hexadecyloxyphenyl)methyl silanol, bis(m-hexadecyloxyphenyl)ethyl silanol, bis(m-hexadecyloxyphenyl)propyl silanol, tris(6 hexadecyloxynaphtyl)silanol, tris(6-octadecyloxynaphtyl) silanol, tris(6-dococyloxynaphtyl)silanol, bis(6-hexadecyloxynaphtyl)silane diol, bis(6-octadecyloxynaphtyl)silane diol, and bis(6-dococyloxynaphtyl)silane diol, etc.

Further, in the organosilicon compound represented by the above-described general formula (1-4), hydroxyl group may be even substituted by a hydrolyzable group. Otherwise, in the organosilicon compound represented by the above-described general formula (1-4), there may be even introduced a substituent group which can produce a silanol by photo-irradiation. Even in all cases, those can be employed as one component in the catalyst for curing of the present invention No. 1.

Herein, the "hydrolyzable group" is a residual group which directly connects to silicon, and it is a residual group which produces a silanolic hydroxyl group represented by a chemical formula described below, which is produced by hydrolysis under the presence of water at more than a certain temperature.

As such the group, for example, there are enumerated an alkoxyl group having a carbon number of 1–5; an aryloxy group such as phenoxy group, tolyloxy group, paramethoxyphenoxy group, paranitrophenoxy group, benzyloxy group, and parachlorophenoxy group; an acyloxy group such as acetoxy group, propionyloxy group, butanoyloxy group, benzoyloxy group, phenylacetoxy group, and formyloxy group; an alkenyloxy group having a carbon number of 2–12 such as vinyloxy group and allyloxy group; an aralkyloxy group such as benzyloxy group and phenetyloxy group; and a group described by the following formula.

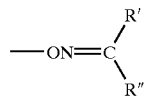

(in the formula, R' and R" may be identical to or different from each other, and those represent an alkyl group having a carbon number of 1–5)

On the other hand, as the organosilicon compound having a substituted group which produces a silanol by photo-irradiation, there is preferred a organosilicon compound having any one of peroxy silano group, o-nitrobenzyloxy group, and α-ketosilyl group.

The organosilicon compound having peroxy silano group can be represented by the following general formula (SI-PO).

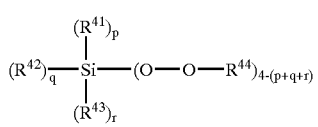
(SI-PO)

(in the above general formula, $R^{41}$, $R^{42}$, and $R^{43}$ may be identical to or different from each other, and which is a hydrogen atom, a substituted or nonsubstituted hydrocarbon group of a carbon number of 1–30, or a substituted or nonsubstituted aromatic group or heteroaromatic group, provided that those have at least one of a substituted or nonsubstituted hydrocarbon group of a carbon number of not less than 10 and an aromatic group or heteroaromatic group having the substituted or nonsubstituted hydrocarbon group of a carbon number of not less than 10. $R^{44}$ is a hydrogen atom, a halogen atom, an alkyl group having a carbon number of 1–5, an alkoxy group having a carbon number of 1–5, an aryl group, and aralkyl group. "p, q, and r" are an integer of 0–3, respectively, and those satisfy $1 \leq p+q+r \leq 3$.)

In the above general formula, as the substituted or nonsubstituted hydrocarbon group, or the substituted or nonsubstituted aromatic group or heteroaromatic group to be introduced as $R^{41}$, $R^{42}$, and $R^{43}$, there are enumerated groups enumerated as groups to be introduced as $R^{11}$–$R^{18}$ in the above-described general formulae (I-1)–(I-2).

Further, as groups to be introduced into $R^{44}$ in the above-described general formulae, the halogen atom includes, for example, chlorine and bromine atoms, the alkyl group having a carbon number of 1–5 includes, for example, methyl, ethyl, n-propyl, isopropyl, n-butyl, isobutyl, sec-butyl, tert-butyl, n-pentyl, isopentyl, and neopentyl, the alkoxy group having a carbon number of 1–5 includes, for example, methoxy group, ethoxy group, n-propoxy group, n-butoxy group, sec-butoxy group, tert-butoxy group, and neopentyloxy group, the aryl group includes, for example, phenyl group, naphthyl group, and anthranyl group, and the aralkyl group includes, for example, benzyl group and phenetyl group, respectively. It is to be noted that the groups may even have a substituted group such as a halogen atom, nitro group, cyano group, and methoxy group.

As a specific example of the silicon organosilicon compound having peroxysilano group, there can be enumerated compounds represented by the following formulae.

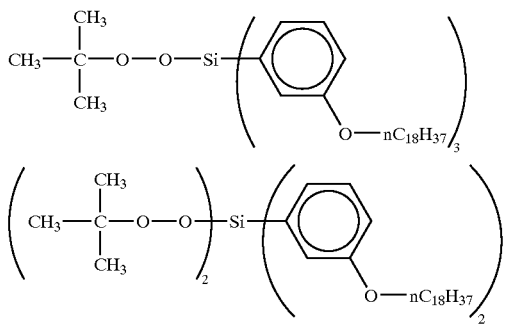

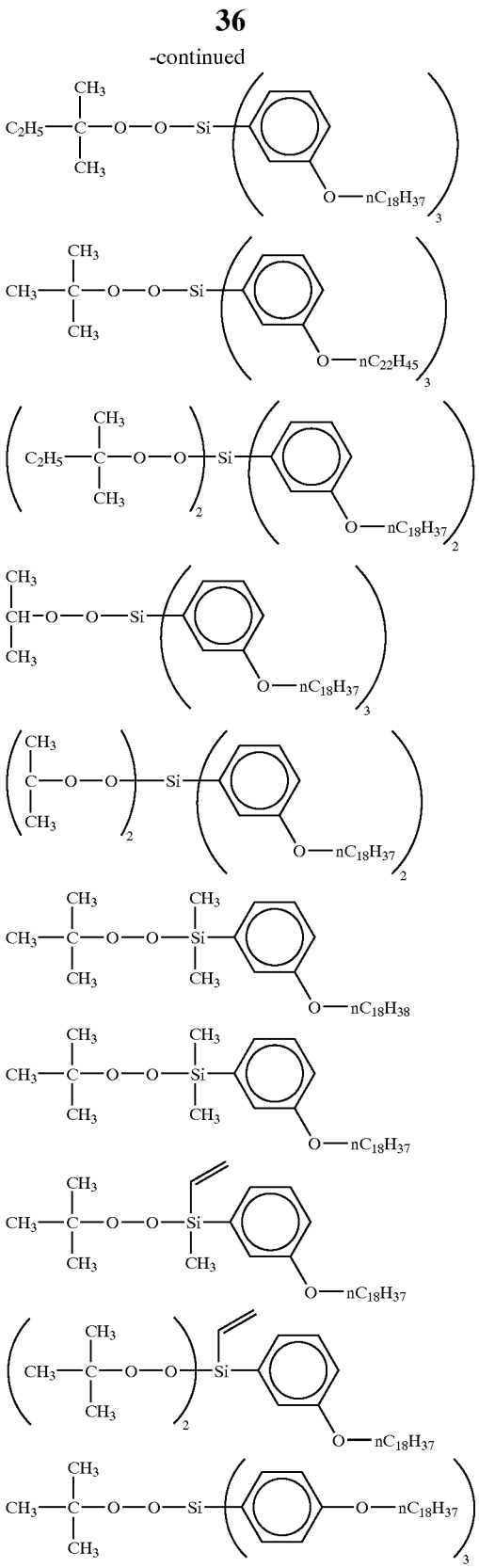

The above-described organosilicon compound having o-nitrobenzyloxy group is represented by general formula (SI-NB).

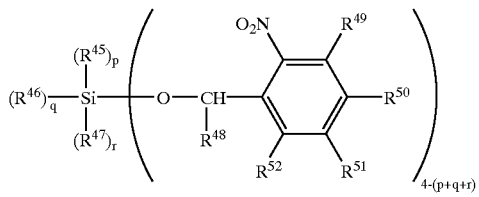

(SI-NB)

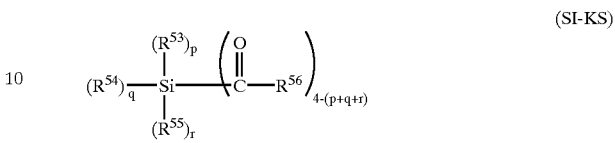

(in the general formula, $R^{45}$, $R^{46}$, and $R^{47}$ may be identical to or different from each other, and which is a hydrogen atom, a substituted or nonsubstituted hydrocarbon group having a carbon number of 1–30, or a substituted or nonsubstituted aromatic group or heteroaromatic group, provided that those have at least one of a substituted or nonsubstituted hydrocarbon group having a carbon number of not less than 10 and an aromatic group or heteroaromatic group having the substituted or nonsubstituted hydrocarbon group of a carbon number of not less than 10. $R^{48}$ is a hydrogen atom, a substituted or nonsubstituted alkyl group, a phenyl group, a substituted phenyl group having a carbon number of 1–10, $R^{49}$, $R^{50}$, $R^{51}$, and $R^{52}$ may be identical to or different from each other, and those represent a hydrogen atom, nitro group, cyano group, hydroxyl group, mercapto group, halogen atom, acetyl group, allyl group, an alkyl group having a carbon number of 1–5, an alkoxyl group having a carbon number of 1–5, a substituted or nonsubstituted aryl group or aryloxy group, "p, q, and r" are an integer of 0–3, respectively, and those satisfy $0 \leq p+q+r \leq 3$.)

In the above-described general formulae, as the substituted or nonsubstituted hydrocarbon group, or the substituted or nonsubstituted aromatic group or heteroaromatic group to be introduced as $R^{45}$, $R^{46}$, and $R^{47}$, there are enumerated groups enumerated as groups to be introduced as $R^{11}$–$R^{18}$ in the above-described general formulae (I-1)–(I-5).

In the above-described general formulae, the substituted or nonsubstituted alkyl group having a carbon number of 1–10 (or a carbon number of 1–5) includes, for example, methyl group, ethyl group, n-propyl group, n-butyl group, tert-butyl group, n-pentyl group, chloromethyl group, chloroethyl group, fluoromethyl group, and cyanomethyl group, the alkoxy group having a carbon number of 1–10 (or a carbon number of 1–5) includes, for example, methoxy group, ethoxy group, n-propoxy group, and n-butoxy group. The substituted or nonsubstituted aryl group includes, for example, phenyl group, p-methoxyphenyl group, p-chlorophenyl group, and p-trifluoromethylphenyl group, and the aryloxy includes, for example, phenoxy group.

As a specific example of the above-described organosilicon compound having o-nitrobenzyloxy group, there can be enumerated tris(p-hexadecyloxyphenyl)(o-nitrobenzyloxy)silane, bis(p-hexadecyloxyphenyl)(o-nitrobenzyloxy)methylsilane, vinylmethyl(p-hexadecyloxyphenyl)(o-nitrobenzyloxy)silane, t-butylmethyl(p-hexadecyloxyphenyl)(o-nitrobenzyloxy)silane, bis(p-hexadecyloxyphenyl)bis(o-nitrobenzyloxy)silane, bis(p-hexadecyloxyphenyl)bis(o-nitrobenzyloxy)silane, methyl (p-hexadecyloxyphenyl)bis(o-nitrobenzyloxy)silane, t-butyl (p-hexadecyloxyphenyl)bis(o-nitrobenzyloxy)silane, tris(p-hexadecyloxyphenyl)(3,4,5-trimethoxy-2-nitrobenzyloxy)silane, tris(p-hexadecyloxyphenyl)(4,5,6-trimethoxy-2-nitrobenzyloxy)silane, tris(p-hexadecyloxyphenyl)(5-methyl-4-methoxy-2-nitrobenzyloxy)silane, tris(p-hexadecyloxyphenyl)(4,5-dimethyl-2-nitrobenzyloxy) silane, and tris(p-hexadecyloxyphenyl)(2,6-dinitrobenzyloxy)silane, etc.

The organosilicon compound having the α-ketosilyl group can be represented by the following general formula (SI-KS).

(SI-KS)

$$(R^{54})_q\text{—}\underset{(R^{55})_r}{\overset{(R^{53})_p}{\text{Si}}}\text{—}\left(\overset{O}{\underset{}{\overset{\|}{C}}}\text{—}R^{56}\right)_{4-(p+q+r)}$$

(in the above general formula, $R^{53}$, $R^{54}$, and $R^{55}$ may be identical to or different from each other, and which are a hydrogen atom, a substituted or nonsubstituted hydrocarbon group of a carbon number of 1–30, or a substituted or nonsubstituted aromatic group or heteroaromatic group, provided that those have at least one of a substituted or nonsubstituted hydrocarbon group of a carbon number of not less than 10 and an aromatic group or heteroaromatic group having the substituted or nonsubstituted hydrocarbon group of a carbon number of not less than 10. $R^{56}$ is a hydrogen atom, a vinyl group, an allyl group, an alkyl group having a carbon number of 1–10, an alkoxy group having a carbon number of 1–10, an aryl group, and aryloxy group. "p, q, and r" are an integer of 0–3, respectively, and those satisfy $1 \leq p+q+r \leq 3$.)

In the above-described general formula, as the substituted or nonsubstituted hydrocarbon group, or the substituted or nonsubstituted aromatic group or heteroaromatic group to be introduced as $R^{53}$, $R^{54}$, and $R^{55}$, there are enumerated groups enumerated as groups to be introduced as $R^{11}$–$R^{18}$ in the above-described general formulae (I-1)–(I-5).

In the above-described general formula, the alkyl group having a carbon number of 1–10 to be introduced as $R^{56}$ includes, for example, methyl group, ethyl group, n-propyl group, n-butyl group, tert-butyl group, n-pentyl group, neopentyl group, n-hexyl group, n-heptyl group, and n-octyl group, the alkoxy group having a carbon number of 1–10 includes, for example, methoxy group, ethoxy group, n-propoxy group, n-butoxy group, tert-butoxy group, n-pentyloxy group, neopentyloxy group, n-hexyloxy group, n-heptyloxy group, and n-octyloxy group, the aryl group includes, for example, phenyl group and naphthyl group, and the aryloxy includes, for example, phenoxy group and naphthyloxy group, respectively. It is to be noted that the groups may have a substituted group such as a halogen atom, nitro group, cyano group, and methoxy group.

As a more specific example of the above-described organosilicon compound having α-ketosilyl group, there can be enumerated compounds represented by the following formulae.

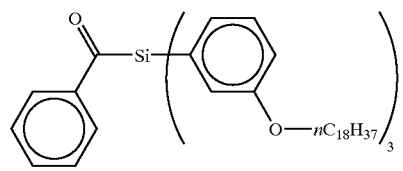

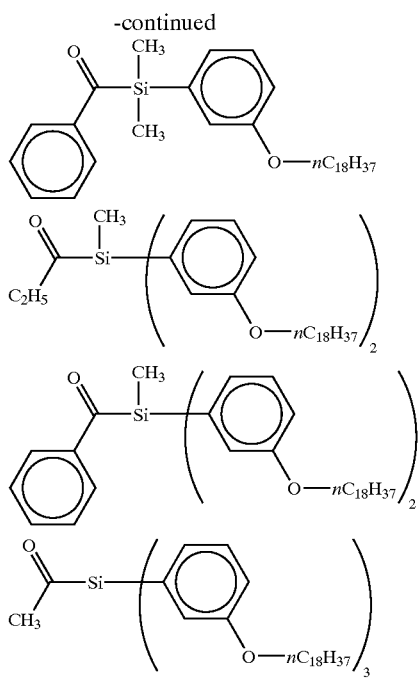

The above-described organosilicon compound which produces silanol group by photo-irradiation is employed solely or in mixing of two or more kinds in a composition, and formulation amount is 0.001%–20% by weight, and preferably 0.1%–10% by weight based on the epoxy compound and the acrylic resin in the composition. In the case that the formulation amount is less than 0.001% by weight, it is afraid that curing becomes insufficient. Further, although it is possible to employ exceeding 20% by weight, it is not preferred because of problems of high costs and decomposed products of the catalyst components.

3.1.1.3. Phenol-Based Catalyst

As the compound represented by the above-described general formula (I-5), for example, there are enumerated bis(4-hydroxyphenyl)sulphone monooctadecylether, bis(4-hydroxy-3-octadecyloxyphenyl)sulphone, bis(4-hydroxyphenyl)sulphide monooctadecylether, (4-hydroxyphenyl)octadecylsulphone, 4,4'-dihydroxydiphenylether monooctadecylether, and bis(2-(6-hydroxyphenyl))sulphone monooctadecylether, etc.

The above-described compounds are employed solely or in mixing of two or more kinds in a composition, and formulation amount is 0.01%–20% by weight, and preferably 0.5%–10% by weight based on the compound (i-1) and the resin (i-2) in the composition.

In the case that the formulation amount is less than 0.01% by weight, it is afraid that curing becomes insufficient. Further, although it is possible to employ exceeding 20% by weight, it is not preferred because of problems of high costs and adverse affection of the catalyst components to physical properties.

Of the above-described cationic polymerization catalyst component, the organosilicon compound represented by the general formula (I-4) and the compound represented by the general formula (I-5) are employed in combination with metal compounds represented by the general formulae (II-1), (II-2), and (II-3) and, in the case, at least one component of the components is dissolved in a heating step and crystallized in a cooling step and, those are reversibly repeated, and other components are not always limited.

Accordingly, in the case, the compounds represented by the general formulae (I-4) and (I-5) and the metal compounds (3") represented by the general formulae (II-1), (II-2), and (II-3) do not always need to have at least one of the substituted or nonsubstituted hydrocarbon group of a carbon number of not less than 10 or the aromatic group or heteroaromatic group having the substituted or nonsubstituted hydrocarbon group of a carbon number of not less than 10.

Specifically, as the organosilicon compound represented by the general formula (I-4), there are enumerated diphenyl silanediol and triphenyl silanol, etc.

As the compound represented by the general formula (I-5), there are enumerated bis(4-hydroxyphenyl)sulphone, cyanophenol, nitrophenol, 2,2-dihydroxyphenyl propane, catechol, p,p'-biphenol, and resorcinol, etc.

Further, as the iron aromatic compound represented by the general formula (I-3), there are enumerated compounds supplementarily illustrated after Examples.

Still further, the sulphonium salt represented by the general formula (I-1) and the iodonium salt represented by the general formula (I-2) can be also employed in combination with the metal compounds (3") represented by the above-described general formulae (II-1), (II-2), and (II-3).

In the case, as described hereinabove, the metal compounds do not always need to have at least one of the substituted or nonsubstituted hydrocarbon group of a carbon number of not less than 10 or the aromatic group or heteroaromatic group having the substituted or nonsubstituted hydrocarbon group of a carbon number of not less than 10.

The above-described sulphonium salt represented by the general formula (I-1), iodonium salt represented by the general formula (I-2), and iron aromatic compound represented by the general formula (I-3) are not only thermally activated, but also activated by radiation rays such as light and an electron beam.

That is, the sulphonium salt, iodonium salt, and iron aromatic compound which are activated by heating or radiation rays are a catalyst for curing which allows to proceed a polymerization of ionic polymerizable substances in relation to the present invention, and the resin composition of the present invention (i) is prepared by formulating the catalysts with the ionic polymerizable substances.

3.1.1.4. Polymerization Reaction of a Vinyl Compound by a Cationic Polymerization Catalyst (3')

In the case that the cationic polymerizable substances are a vinyl compound such as vinylether in the present invention, a solution polymerization method is applied in which there is usually employed a solvent which is inert to the catalyst and monomers and, according to circumstances, a bulk polymerization method is also conducted.

As the solvent, for example, there are employed aromatic hydrocarbons such as toluene, benzene, and xylene, aliphatic hydrocarbons such as n-hexane and n-heptane, cycloaliphatic hydrocarbons such as cyclohexane, hydrocarbon mixtures such as a petroleum ether and ligroin, and halogenated hydrocarbons such as chlorobenzene and dichloroethane, etc. Polymerization reaction of a vinyl compound is conducted under an ordinary pressure or compressed pressure, and at a reaction temperature of not less than 20° C., and preferably 60–150° C. at which heating can be industrially and readily conducted.

3.1.1.5. Mixing of the Cationic Polymerization Catalyst (3') with a Curable Resin Component Further, since the sulphonium salt, iodonium salt, and iron aromatic compound employed in the present invention as a catalyst for the polymerization do not initiate the cationic polymerization at room temperatures, the catalyst can be optionally mixed in advance with resin composition (also called a curable resin component) as a single liquid which can be stored.

In the present invention, the sulphonium salt, iodonium salt, and iron aromatic compound are employed in 0.01–20 parts by weight, and preferably 0.1–5 parts by weight based on 100 parts by weight of the epoxy compound. In the case of being less than 0.01 part by weight, a sufficient polymer cannot be obtained. On the other hand, in the case of exceeding 20 parts by weight, it is incapable of obtaining a polymer having preferred physical properties after polymerization, and it is not also preferred from a viewpoint of costs.

3.1.2. Metal Compounds (3")

Hereinafter, the metal compounds (3") is illustrated which is other components in the catalyst for curing in the present invention No. 1. As a typical example of the metal compounds (3") to be formulated, there are enumerated compounds represented by general formulae (II-1), (II-2), and (II-3).

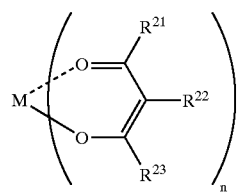

(II-1)

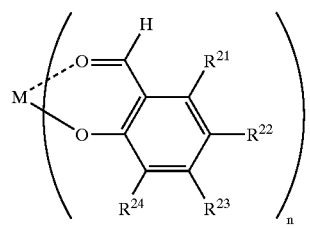

(II-2)

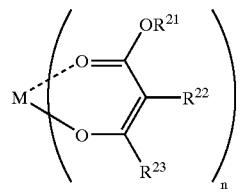

(II-3)

(in the formulae $R^{21}$, $R^{22}$, $R^{23}$ and $R^{24}$ may be identical to or different from each other, and which are a hydrogen atom, a substituted or nonsubstituted hydrocarbon group of a carbon number of 1–30, provided that one ligand includes at least one compound having a carbon number of not less than 10 in the $R^{21}$, $R^{22}$, $R^{23}$ and $R^{24}$, and M is selected from the group consisting of Al, Ti, Cr, Mn, Fe, Co, Ni, Cu, Zr, Zn, Ba, Ca, Ce, Pb, Mg, Sn, and V, and "n" is an integer of 2–4.)

As the compounds represented by general formulae (II-1), (II-2), and (II-3), for example, there are enumerated tris (octadecylacetoacetate)aluminum, tris(hexadecylaceto-acetate)aluminum, tris(tetradecylacetoacetate)aluminum, tris(dodecylacetoacetate)aluminum, tris(octylsalicyl-aldehyde)aluminum, tris(3-octadecylacettylacetate) aluminum, and compounds represented by chemical formulae described below.

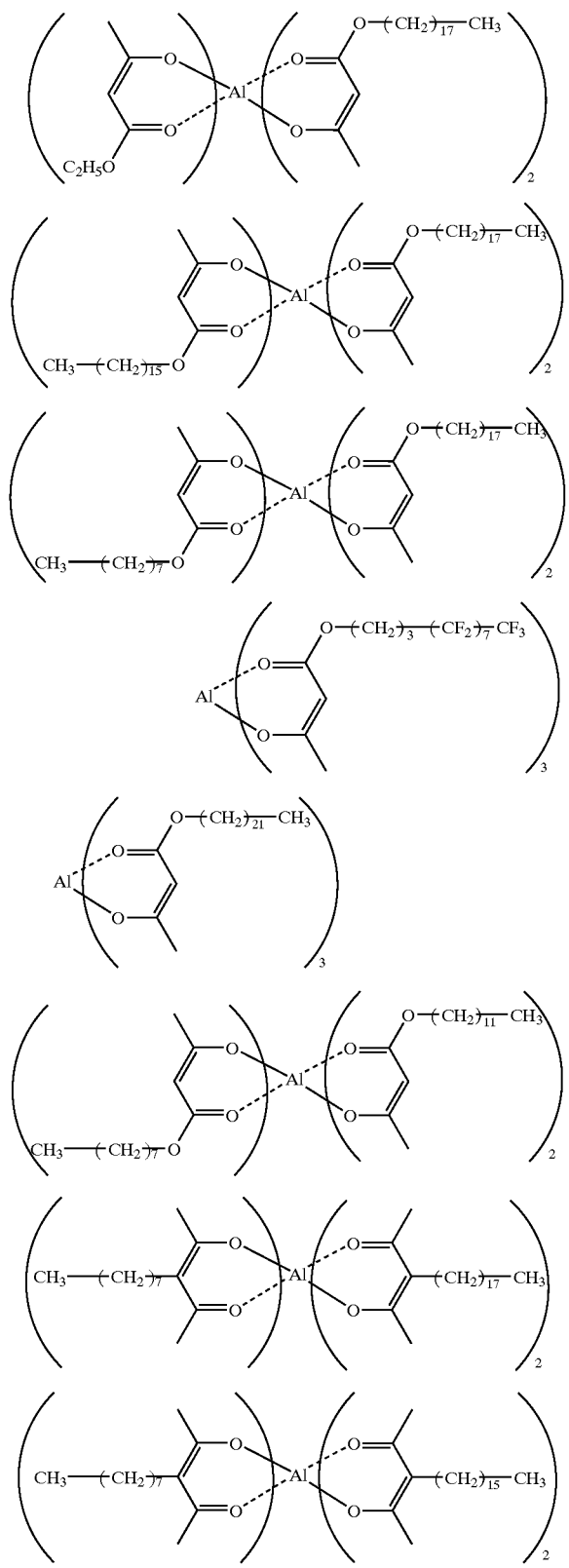

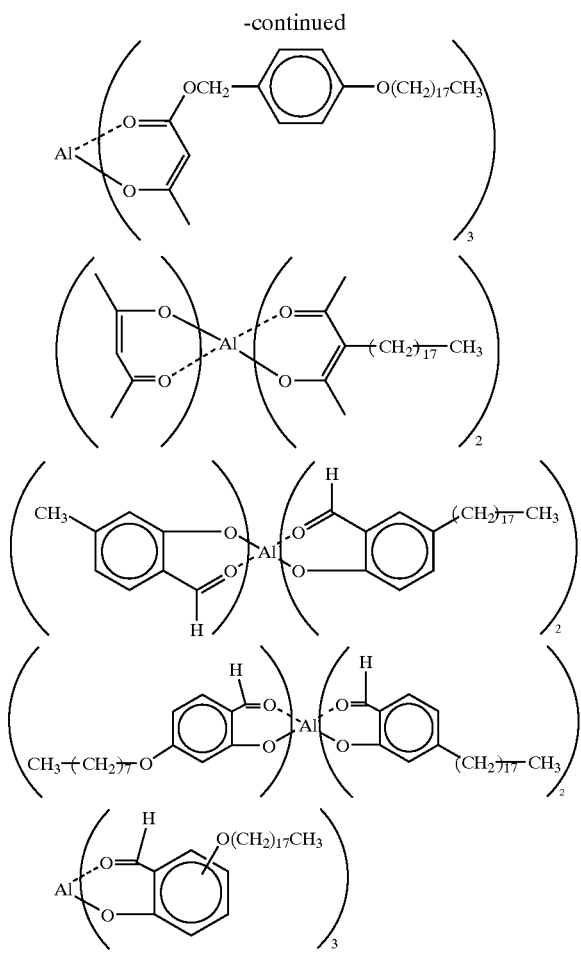

Further, there can be also employed a chelate compound in which aluminum in the above-described chemical formulae is changed to Ti, Cr, Zr, Mn, Fe, LCo, Ni, Cu, Zr, or Zr atom as a component of the metal compound (3") which is a catalyst for curing in No. 1 of the present invention (i).

It is to be noted that in the compounds represented by general formulae (II-1), (II-2), and II-3), all of bonding arms in the metal atom (M) are not need to be connected to ligands, and those may even connect to one piece of alkoxy group, phenoxy group, and acyloxy group instead of the ligand. Further, all of the bonding arms may even connect to the groups.

The metal compound (3") is employed solely or in combination of two or more kinds in the composition, and addition amount is 0.01–20% by weight, and preferably 0.5–10% by weight based on a resin such as the epoxy compound in the composition. In the case of being less than 0.01% by weight, it is afraid that curing becomes insufficient. Further, although being capable of employing exceeding 20% by weight, it is not also preferred from a viewpoint of an adverse affection to physical properties and costs. In the case that the metal compound (3") is employed, ionic substances are not almost remained in a resin after curing.

3.1.3 Compound to be Employed in Combination with the Metal Compound (3")

The catalyst for curing in No. 1 of the present invention contains at least one kind of the above-described cationic polymerization catalyst components and the metal compound (3"), and any one component of those is not occasionally contained.

For example, the catalyst for curing in No. 1 of the present invention can be constructed in combination of other components with the metal compound (3"). As compounds to be employed in combination with the metal compound (3"), there are enumerated at least one kind of compounds selected from the group consisting of an organosilane having hydroxyl group directly connecting to silicon atom, an organosiloxane having hydroxyl group directly connecting to silicon atom, and a phenol compound.

It is to be noted that the catalyst for curing in No. 1 can be obtained in combination of an organosilicon compound having hydrolyzable group directly connecting to silicon atom or a silicon compound organosilicon compound which can produce a silanol by photo-irradiation with the metal compound (3").

Herein, the "hydrolyzable group" is a residual group directly connecting to silicon which is already illustrated as the groups to be introduced into the general formula (I-4), and the same groups are enumerated as previously-mentioned.

3.1.3.1. Organosilane Having Hydroxyl Group and Organosiloxane Having Hydroxyl Group The organosilane to be employed can be represented by general formula (S-1) described below.

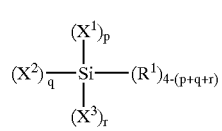

(S-1)

(in the formula, $R^1$ means a hydroxyl group or the hydrolyzable group, and $X^1$, $X^2$, and $X^3$ may be identical to or different from each other, which are an alkyl group having a carbon number of 1–12; an aryl group such as phenyl group, tolyl group, paramethoxyphenyl group, parachlorophenyl group, and paranitrophenyl group; an aralkyl group such as benzyl group, phenetyl group, paramethylbenzyl group, and paramethoxybenzyl group; an alkenyl group such as vinyl group, allyl group, propenyl group, and butenyl group; an acyl group such as acetyl group, benzoyl group, and trifluoroacetyl group, "p, q and r" are an integer of 0–3, and "p+q+r" is not more than 3.)

Of the organosilanes, as a more preferred specific example in the catalyst for curing in No. 1, there can be enumerated silanols such as diphenyl silanediol triphenyl silanol, diphenyl(methyl) silanol, phenyl(vinly)silanediol, tri(paramethoxyphenyl)silanol, triacetyl silanol, diphenyl (ethyl)silanol, diphenyl(propyl) silanol, tri(paranitrophenyl) silanol, phenyldivinyl silanol, 2-butenyldiphenyl silanol, di(2-pentenyl)phenyl silanol, phenyldipropyl silanediol, paramethylbenzyldimethyl silanol, triethyl silanol, trimethyl silanol, tripropyl silanol, tributyl silanol, and triisobutyl silanol. Further, as a specific example of the organosilane having the hydrolyzable group, there can be enumerated triphenyl(methoxy)silane, diphenyldimethoxy silane, triphenyl(ethoxy)silane, diphenyl(methyl)methoxy silane, phenyl(vinyl)(methyl)(methoxy)silane, diphenyldiethoxy silane, tri(parametoxyphenyl)methoxy silane, triacetyl (methoxy)silane, diphenyl(ethyl) (ethoxy)silane, diphenyl (propyl) (ethoxy)silane, diphenyl(methyl)(acetoxy)silane, diphenyldipropyloxy silane, diphenyl(methyl) (triphenylacetoxy)silane, tri(paranitrophenol)(methoxy) silane, triacetyl(methoxy)silane, phenyldivinyl(propoxy) silane, 2-butenyldiphenyl(methoxy)silane, di(2-pentenyl) (phenyl)(ethoxy)silane, phenyldipropyl(methoxy)silane, tri (parametoxyphenyl)(ethoxy)silane, paramethylbenzyl trimethoxy silane, trifluoroacetyl trimethoxysilane, di(parachlorophenyl)diethoxy silane, triethyl(methoxy)silane, trimethyl(methoxy)silane, tripropyl(methoxy)silane, tributyl (ethoxy)silane, triisobutyl(acetoxy)silane, and compounds represented by chemical formula described below.

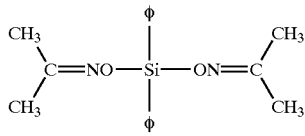

(φ = phenyl)

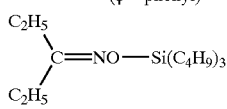

Still further, in addition to the above-described examples, needless to say, there can be employed an organosilane having both of hydroxyl group and the hydrolyzable group.

The organosilane having hydroxyl group or hydrolyzable group directly connected to silicon atom as described hereinabove is employed solely or in mixing of two or more kinds in the composition.

Formulation amount is usually 0.001%–20% by weight, and preferably 0.01%–10% by weight based on the epoxy compound (i-1) and the acrylic resin (i-2) in the composition. In the case that the formulation amount is less than 0.001% by weight, it is afraid that curing becomes insufficient. Further, although it is possible to employ exceeding 20% by weight, it is not preferred because of problems of high costs and decomposed products from the catalyst components.

The organosiloxane to be preferably employed as the catalyst for curing in No. 1 of the present invention (i) is a linear chain or cyclic siloxane occasionally having a branched chain, which is composed of a bifunctional unit represented by formula (S-2) described below and/or a trifunctional unit represented by formula (S-3) described below and, it may even contain a tetrafunctional unit represented by formula (S-4) described below according to circumstances. Further, in the case that a siloxane chain has a terminal, the organosiloxane is terminated by a monofunctional unit represented by formula (S-5) described below and, particularly, at least one of constructing units contain at least one of hydroxyl group or a hydrolyzable group.

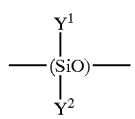 (S-2)

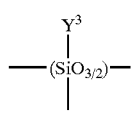 (S-3)

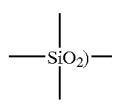 (S-4)

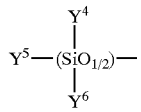 (S-5)

(in the formula, $Y^1$, $Y^2$, $Y^3$, $Y^4$, $Y^5$, and $Y^6$ may be identical to or different from each other, and those represent hydroxyl group or a hydrolyzable group; an alkyl group having a carbon number of 1–12; an aryl group such as phenyl group, tolyl group, paramethoxyphenyl group, parachlorophenyl group, and paracyanophenyl group; an aralkyl group such as benzyl group, phenetyl group, paramethoxybenzyl group, and paramethylbenzyl group; an alkenyl group such as vinyl group, allyl group, propenyl group, and butenyl group; and an acyl group such as acetyl group, benzoyl group, and trifluoroacetyl group, etc.)

Of the organosiloxane, there is preferred a compound having a polymerization degree of not more than 50, a hydroxyl group and/or hydrolyzable group equivalent of not more than 1,000, and more preferably the equivalent of 50–500.

As such a preferred specific example of the organosiloxane having hydroxyl group, there can be enumerated 1,3-dihydroxy-1,3-dimethyl-1,3-diphenyl disiloxane, 1,5-dihydroxy-1,3,5-trimethyl-1,3,5-triphenyl trisiloxane, 1,7-dihydroxy-1,3,5,7-tetramethyl-1,3,5,7-tetraphenyl tetrasiloxane, 1,3-dihydroxytetraphenyl disiloxane, 1,5-dihydroxyhexaphenyl trisiloxane, 1,7-dihydroxyoctaphenyl tetrasiloxane, 1,5-dihydroxy-3,3-dimethyl-1,1,5,5-tetraphenyl trisiloxane, 1,3-dihydroxytetra (dimethylphenyl) disiloxane, 1,5-dihydroxyhexaethyl trisiloxane, 1,7-dihydroxyoctapropyl tetrasiloxane, 1,3,5-trihydroxy-3-ethyl-1,1,5,5-tetramethyl trisiloxane, 1,5-dihydroxy-1,1,5,5-tetraphenyl-3,3-di-p-tolyl trisiloxane, and compounds represented by chemical formula described below.

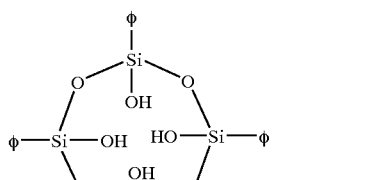

(φ: phenyl)

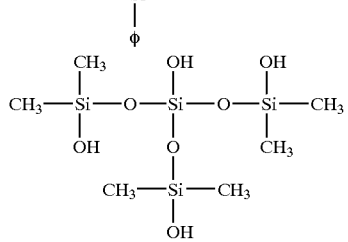

Further, there can be also employed a organosilicon resin which can be obtained as a trade name such as SH6018 (a methylphenyl polysiloxane having a hydroxyl group equivalent of 400 and a molecular weight of 1,600 manufactured by Toray Silicone, Ltd).

In general, there can be also employed a polysiloxane represented by general formula described below.

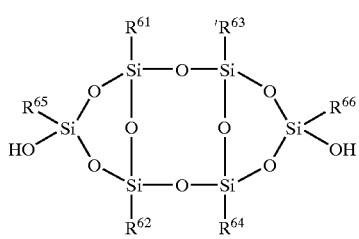

(in the general formula, $R^{61}$, $R^{62}$, $R^{63}$, $R^{64}$, $R^{65}$, and $R^{66}$ may be identical to or different from each other, and those represent hydroxyl group or a hydrolyzable group; an alkyl group having a carbon number of 1–12; an aryl group such as phenyl group, tolyl group, paramethoxyphenyl group, parachlorophenyl group, and paracyanophenyl group; an aralkyl group such as benzyl group, phenetyl group, paramethoxybenzyl group, and paramethylbenzyl group; an alkenyl group such as vinyl group, allyl group, propenyl group, and butenyl group; and an acyl group such as acetyl group, benzoyl group, and trifluoroacetyl group, etc.)

The organosilane having hydroxyl group directly connected to silicon atom as described hereinabove is employed solely or in mixing of two or more kinds in the composition.

Formulation amount is usually 0.001%–20% by weight, and preferably 0.01%–10% by weight based on the epoxy compound (i-1) and the acrylic resin (i-2). In the case that the formulation amount is less than 0.001% by weight, it is afraid that curing becomes insufficient.

Further, although it is possible to employ exceeding 20% by weight, it is not preferred because of problems of high costs and decomposed products of the catalyst components.

3.1.3.2. Silicone Compound which can Produce a Silanol by Photo-Irradiation

As the silicone compound which can produce a silanol by photo-irradiation, there is preferred a silicone compound having any one of a peroxysilano group, o-nitrobenzyloxy group, and α-ketosilyl group.

The silicone compound having a peroxysilano group is the compound represented by the general formula (SI-PO) which is already illustrated in the general formula (I-4). However, in the case, as groups to be introduced as $R^{41}$, $R^{42}$, and $R^{44}$ in the above-described general formula, there are introduced hydrogen atom, halogen atom, an alkyl group having a carbon number of 1–5, and an alkoxy group having a carbon number of 1–5, an aryl group, or an aralkyl group. Those may be identical to or different from each other.

The halogen atom and an alkyl group having a carbon number of 1–5, etc. include groups enumerated as the groups to be introduced into $R^{44}$.

As a specific example of the silicone compound having peroxysilano group, compounds represented by general formula described below are enumerated.

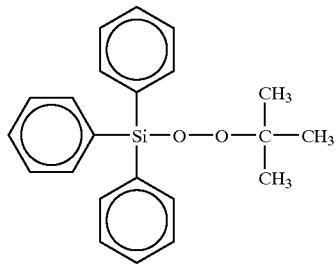

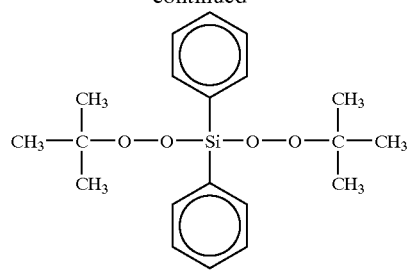

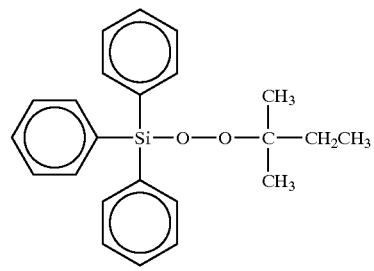

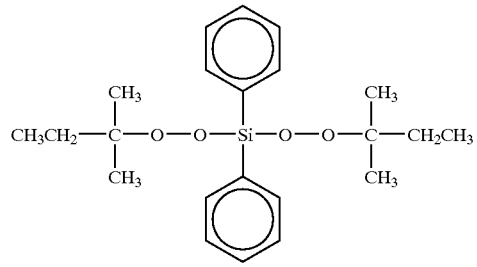

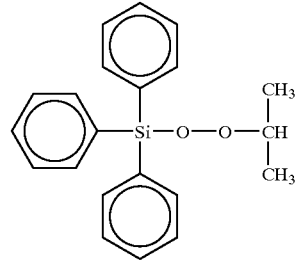

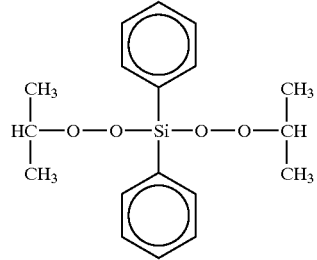

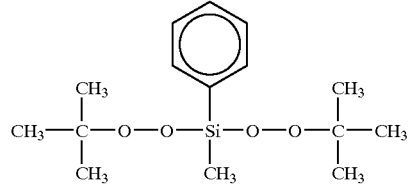

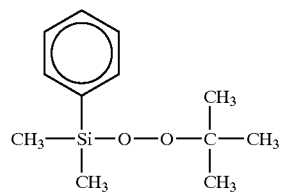

-continued

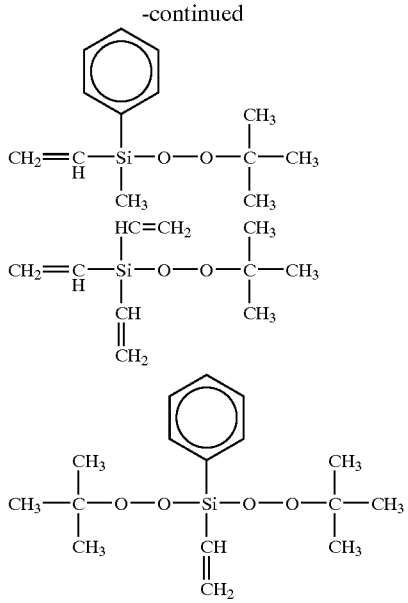

The organosilicon compound having o-nitrobenzyloxy group is the compound represented by the general formula (SI-NB) which is already illustrated in the general formula (I-4), provided that in the case, as groups to be introduced as $R^{45}$, $R^{46}$, and $R^{47}$, there are introduced hydrogen atom, halogen atom, vinyl group, allyl group, a substituted or nonsubstituted alkyl group having a carbon number of 1–10, and an alkoxy group having a carbon number of 1–10, a substituted or nonsubstituted aryl group, an aryloxy group, or a siloxy group. Those may be identical to or different from each other.

The halogen atom includes, for example, chlorine and bromine atoms, the alkyl group having a carbon number of 1–10 includes, for example, methyl group, ethyl group, n-propyl group, n-butyl group, tert-butyl group, n-pentyl group, chloromethyl group, chloroethyl group, fluoromethyl group, and cyanomethyl group, the alkoxy group having a carbon number of 1–10 includes, for example, methoxy group, ethoxy group, n-propoxy group, and n-butoxy group. The substituted or nonsubstituted aryl group includes, for example, phenyl group, paramethoxyphenyl group, parachlorophenyl group, and p-trifluoromethylphenyl group, and the aryloxy group includes, for example, phenoxy group.

Further, the organosilicon compound having o-nitrobenzyloxy group may be even a compound having the o-nitrobenzyloxy group at a terminal and, in which a main chain is composed of a group represented by the following formula.

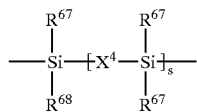

(in the formula, "s" represents an integer of not less than 1, $R^{67}$ and $R^{68}$ may be identical to or different from each other, and those represent hydrogen atom, a halogen atom, vinyl group, allyl group, a nonsubstituted or substituted alkyl group having a carbon number of 1–10, and an alkoxy group having a carbon number of 1–10, a nonsubstituted or substituted aryl group, aryloxy group, or siloxy group, and $X^4$ represents oxygen atom, an alkylene group, and an aryldiyl group.)

As a specific example of the organosilicon compound having o-nitrobenzyloxy group, there can be enumerated trimethyl(o-nitrobenzyloxy)silane, dimethylphenyl(o-nitrobenzyloxy)silane, diphenylmethyl(o-nitrobenzyloxy) silane, triphenyl(o-nitrobenzyloxy)silane, vinylmethylphenyl(o-nitrobenzyloxy)silane, t-butylmethylphenyl(o-nitrobenzyloxy)silane, triethyl(o-nitrobenzyloxy)silane, tri(2-chloro ethyl)o-nitrobenzyloxy silane, tri(p-trifluoromethylphenyl-o-nitrobenzyloxy)silane, trimethyl[α-(o-nitrophenyl)-o-nitrobenzyloxy]silane, dimethylphenyl[α-(o-nitrophenyl)-o-nitrobenzyloxy]silane, methylphenyldi[α-(o-nitrophenyl)-o-nitrobenzyloxy]silane, triphenyl(α☐ethyl-o-nitrobenzyloxy)silane, trimethyl(3-methyl-2-nitrobenzyloxy)silane, dimethylphenyl(3,4,5-trimethoxy-2-nitrobenzyloxy)silane, triphenyl(4,5,6-trimethoxy-2-nitrobenzyloxy)silane, diphenylmethyl(5-methyl-4-methoxy-2-nitrobenzyloxy)silane, triphenyl(4,5-dimethyl-2-nitrobenzyloxy)silane, vinylmethylphenyl(4,5-dichloro-2-nitrobenzyloxy)silane, triphenyl(2,6-dinitrobenzyloxy)silane, diphenylmethyl(2,4-dinitrobenzyloxy)silane, triphenyl(3-methoxy-2-nitrobenzyloxy)silane, vinylmethylphenyl(3,4-dimethoxy-2-nitrobenzyloxy)silane, dimethyldi(o-nitrobenzyloxy) silane, methylphenyldi(o-nitrobenzyloxy)silane, vinylphenyldi(o-nitrobenzyloxy)silane, t-butylphenyldi(o-nitrobenzyloxy)silane, diethyldi(o-nitrobenzyloxy)silane, 2-chloroethylphenyldi(o-nitrobenzyloxy)silane, diphenyldi (o-nitrobenzyloxy)silane, diphenyldi(3-methoxy-2-nitrobenzyloxy)silane, diphenyldi(3,4-dimethoxy-2-nitrobenzyloxy)silane, diphenyldi(2,6-dinitrobenzyloxy) silane, diphenyldi(2,4-dinitrobenzyloxy)silane, methyltri(o-nitrobenzyloxy)silane, phenyltri(o-nitrobenzyloxy)silane, p-bis(o-nitrobenzyloxydimethylsilyl) benzene, 1,1,3,3-tetraphenyl-1,3-di(o-nitrobenzyloxy)disiloxane, and 1,1,3,3, 5,5-hexaphenyl-1,5-di(o-nitrobenzyloxy)trisiloxane, and a organosilicon compound produced by a reaction of an SiCl-contained silicone resin with o-nitrobenzyl alcohol.

The organosilicon compound having an α-ketosilyl group is the compound represented by the general formula (SI-KS) which is already illustrated in the general formula (I-4). However, in the case, as groups to be introduced as $R^{53}$, $R^{54}$, and $R^{55}$ in the above-described general formula, there is introduced hydrogen atom, vinyl group, allyl group, an alkyl group having a carbon number of 1–10, and an alkoxy group having a carbon number of 1–10, an aryl group, or an allyloxy group. Those may be identical to or different from each other.

As the alkyl group having a carbon number of 1–10 and alkoxy group having a carbon number of 1–10 to be introduced as $R^{53}$, $R^{54}$, and $R^{55}$, there are enumerated groups enumerated as the groups to be introduced as $R^{56}$.

As specific examples of the organosilicon compound having an α-ketosilyl group, there are enumerated compounds represented by chemical formula described below.

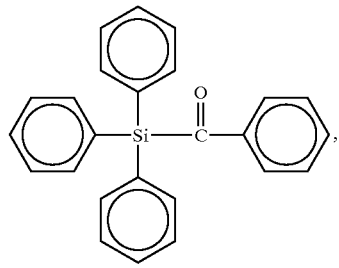

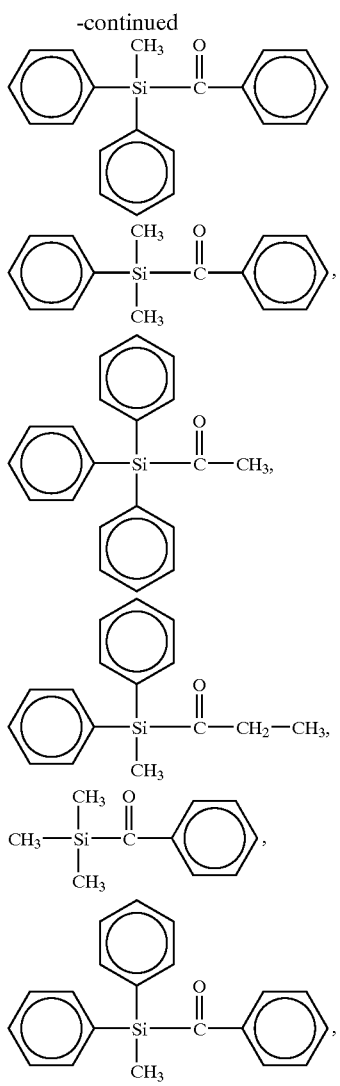

As described hereinabove, the organosilicon compound which produces a silanol group by photo-irradiation is employed solely or in mixing of two or more kinds, and formulation amount is usually 0.001%–20% by weight, and preferably 0.01%–10% by weight based on the epoxy compound and the acrylic resin in the composition. In the case that the formulation amount is less than 0.001% by weight, it is afraid that curing becomes insufficient. Further, although it is possible to be employed exceeding 20% by weight, it is not preferred because of problems of high costs and decomposed products of the catalyst components.

3.1.3.3. Phenol Compound

As the phenol compound to be employed, there are enumerated compounds represented by general formula (Ph-1) described below.

$$Ar^2—(OH)_n \quad (Ph-1)$$

(in the general formula (Ph-1), $Ar^2$ represents a substituted or nonsubstituted aromatic group or heteroaromatic group, and "n" is an integer of 1–10.)

As the substituted or nonsubstituted aromatic group or heteroaromatic group represented by $Ar^2$ in the general formula (Ph-1), there are enumerated groups enumerated as the groups to be introduced into $R^{11}$–$R^{18}$ in the above-described general formulae (I-1)–(I-5). As substituted groups in the substituted aromatic group or heteroaromatic group, there are enumerated organic groups having a carbon number of not less than 1, and in the case that those exist in plurality of pieces, those may be identical to or different from each other. As specific examples of such the substituted groups, there are enumerated organic groups described below.

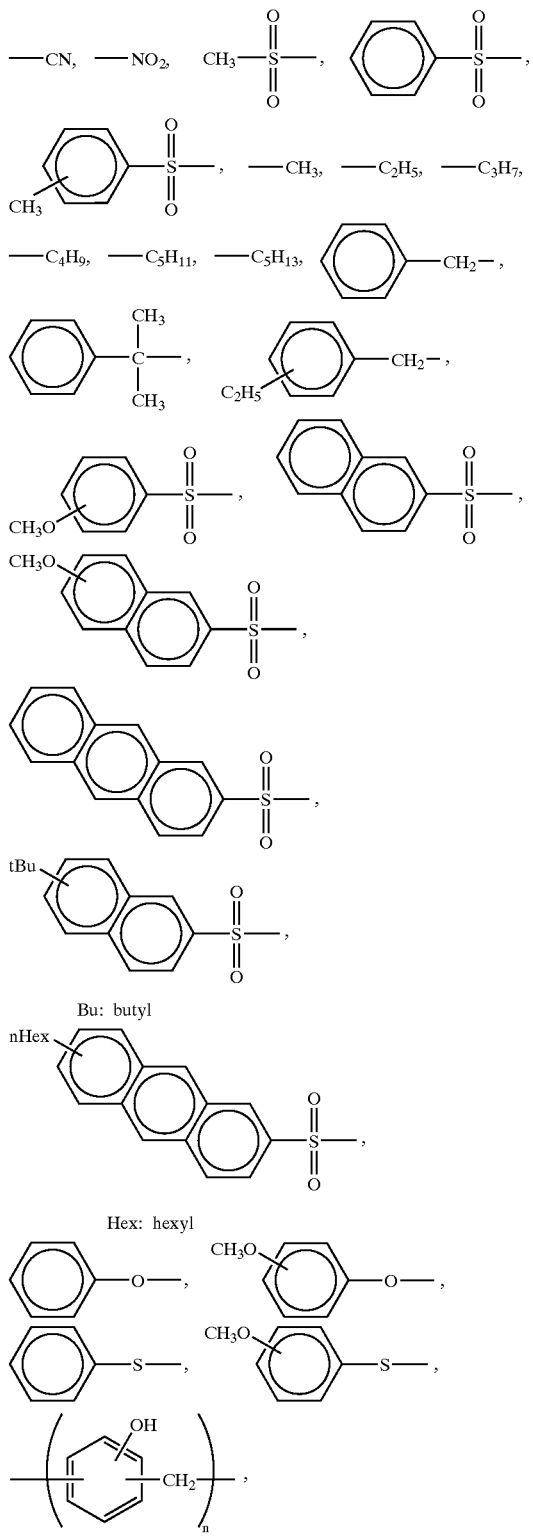

Bu: butyl

Hex: hexyl

-continued

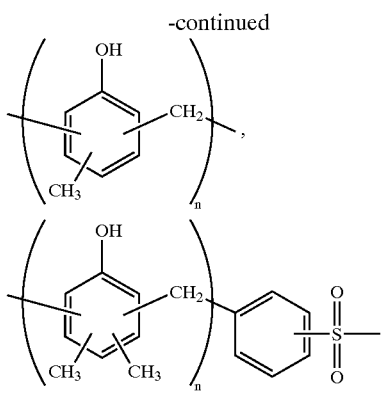

As more specific examples of the compound represented by the general formula (Ph-1), compounds shown below can be enumerated.

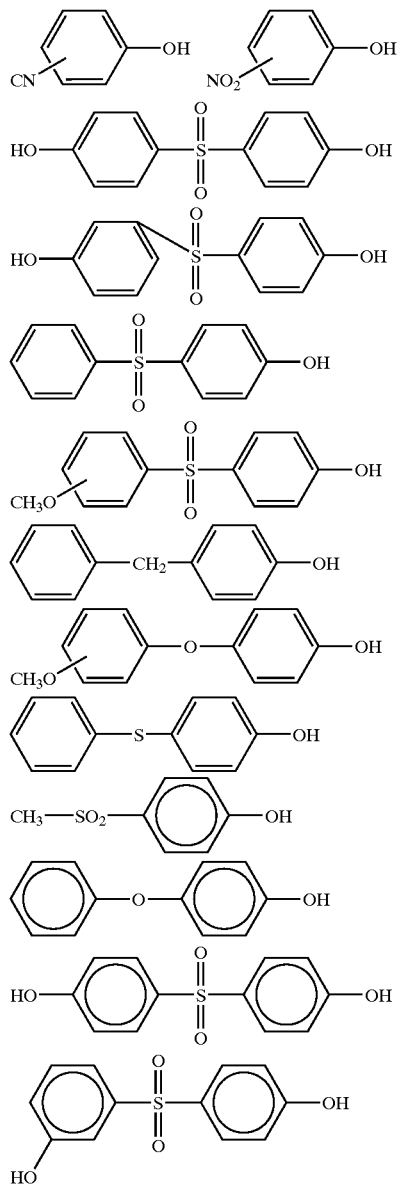

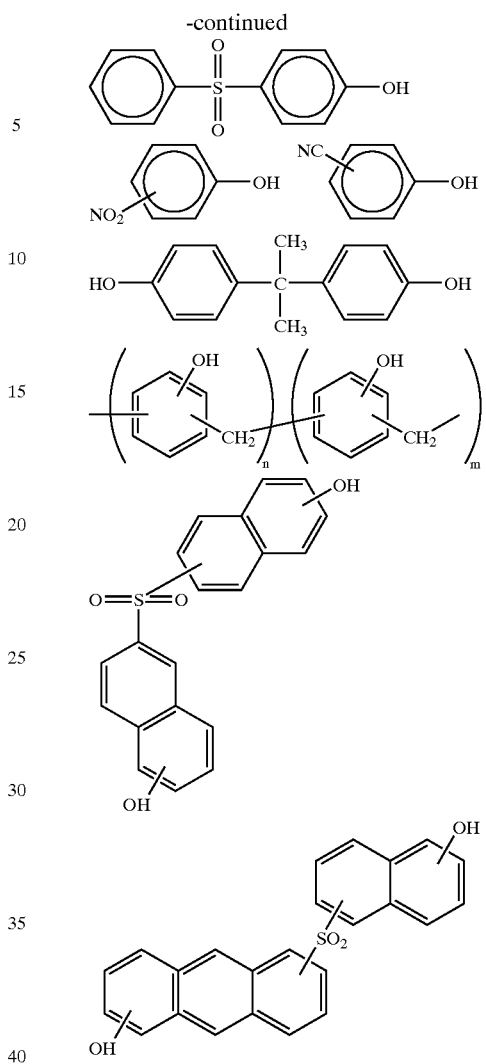

The phenol compounds can be employed solely or in combination of two or more kinds.

In the case of formulation of the above-described phenol compounds in the catalyst for curing in relation to No. 1 of the present invention (i), formulation amount is preferably 0.1%–50% by weight based on the epoxy compound (i-1) and the acrylic resin (i-2). In the case that the formulation amount is less than 0.1% by weight, it is afraid that curing becomes insufficient. Further, although it is possible to employ exceeding 50% by weight, it tends to cause problems of high costs and decline of mechanical strength in a cured article.

3.1.3.4. Organosilicon Compound Having a Hydrolyzable Group

As the organosilicon compound having a hydrolyzable group which directly connects to silicon atom, there can be enumerated organosilicon compounds having an alkoxyl group having a carbon number of 1–5; an aryloxy group such as phenoxy group, tolyloxy group, paramethoxyphenoxy group, paranitophenoxy group, benzyloxy group, and parachlorophenoxy group; an acyloxy group such as acetoxy group, propionyoxy group, butanoyloxy group, benzoyloxy group, phenylacetoxy group, and formyloxy group; an alkenyloxy group having a carbon number of 2–12 such as vinyloxy group and allyloxy group; an aralkyloxy group such as benzyloxy group and phenetyloxy group; and groups represented by the following formula, etc.

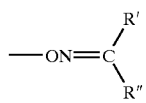

(in the formula, R' and R" may be identical to or different from each other, and represent an alkyl group having a carbon number of 1–5.)

The above-described organosilicon compound having a hydrolyzable group which directly connects to silicon atom is employed solely or in mixing of two or more kinds in the composition. Formulation amount is 0.001%–20% by weight, and preferably 0.01%–10% by weight based on the epoxy compound and the acrylic resin in the composition. In the case that the formulation amount is less than 0.001% by weight, it is afraid that curing becomes insufficient. Further, although it is possible to employ exceeding 20 parts by weight, it is not preferred because of problems of high costs and decomposed products of the catalyst components.

3.2. No. 2 Catalyst for Curing

Hereinafter, there is illustrated the No. 2 catalyst for curing in relation to the present invention (i).

The No. 2 catalyst for curing in relation to the present invention (i) contains at least one kind of compounds selected from the group consisting of the compounds represented by the above-described general formulae (III-1') and (III-2).

In the above-described general formula (III-1'), as a hydrocarbon group to be introduced as $R^1$, $R^2$, and $R^3$, there can be enumerated the groups enumerated as groups to be introduced as $R^{11}$–$R^{18}$ in the above-described general formulae (I-1)–(I-5). It is to be noted that all the $R^1$, $R^2$, and $R^3$ are more preferably an aromatic or heteroaromatic group having a substituted or nonsubstituted hydrocarbon group of a carbon number of not less than 10.

Specifically, as the compound represented by the above-described general formula (III-1'), there are enumerated bis(p-octadecyloxyphenyl)butylphosphine, bis(m-octadecyloxyphenyl) butylphosphine, bis(p-octadecyloxyphenyl)decylphosphine, p-octadecyloxyphenyl dibutylphosphine, and p-octadecyloxyphenyl octadecylphosphine, etc.

Further, as the compound represented by the above-described general formula (III-1'), there is employed the compound represented by the above-described general formula (III-1).

As a hydrocarbon group to be introduced as $R^{31}$ in the above-described general formula (III-1) and a hydrocarbon group to be introduced as $R^{32}$, $R^{33}$, $R^{34}$, and $R^{35}$ in the above-described general formula (III-2), there can be enumerated the groups enumerated as groups to be introduced as $R^{11}$–$R^{18}$ in the above-described general formulae (I-1)–(I-5). Further, such the hydrocarbon group may contain a hetero atom such as F, Si, O, N, and S.

As the compounds represented by the above-described general formulae (III-1) and (III-2), there are enumerated the above-described compounds.

As an anion-based catalyst to be employed as well as the compounds represented by the general formula (III-1) or (III-2), there can be enumerated the following compounds.

As a specific anion-based compound, there can be employed derivatives of a linear chain tertiary amine, piperazine, pyridine, picoline, 1,8-diazabicyclo[5.4.0]undecene-1, benzylamine, 2-(aminomethyl)phenol, or 2,4,6-tris(aminomethyl)phenol, etc. The derivatives contain a halogen atom, nitro group, cyano group, hydrogen atom, a substituted or nonsubstituted hydrocarbon group having a carbon number of 1–30, an aromatic group or heteroaromatic group having a substituted or nonsubstituted hydrocarbon group, and further contain at least one of a substituted or nonsubstituted hydrocarbon group having a carbon number of not less than 10 or an aromatic group or heteroaromatic group having a substituted or nonsubstituted hydrocarbon group having a carbon number of not less than 10.

As described hereinabove, a resin composition is preferably prepared by formulating the No. 2 catalyst for curing in relation to the present invention (i) in a proportion of 0.01–20% by weight based on the components (i-1) and (i-2). In the case of less than 0.01% by weight, it is difficult to sufficiently allow to proceed a curing reaction and, on the other hand, in the case of exceeding 20% by weight, there is apt to be caused a problem of a high cost and mechanical strength tends to lower in a cured article.

3.3. Other Characteristics in the Thermally-Activating Catalyst

The No. 1 catalyst for curing in relation to the present invention (i) contains at least one kind of the cationic polymerization catalyst (3') and the metal compound (3"), and the catalyst has a characteristics that it can be reversibly dissolved and crystallized by heating and cooling in the epoxy compound (i-1) and/or the acrylic resin (i-2).

The No. 2 catalyst for curing contains at least one kind of atoms selected from the group consisting of P atom and N atom, and the catalyst has a characteristics that it can be uniformly dissolved by heating and crystallized through a cooling step in the epoxy compound (i-1) and/or the acrylic resin (i-2).

Crystallization in the above descriptions means that the catalyst for curing forms a shape such as a colloid, a micelle, and a crystal in the epoxy compound (i-1) and/or the acrylic resin (i-2). For example, N atom and P atom portion which are an active portion form the shape, whereby, there is shown a state that these are covered from an active portion such as an epoxy group, an ester group, and phenolic hydroxyl group. In order to make the state, for example, it is effective to use a compound having a substituted or nonsubstituted hydrocarbon group having a large carbon number. It is to be noted that the hydrocarbon group having a large carbon number specifically includes hexadecyl group, octadecyl group, and dococyl group, etc.

4. Other Additives

In the curable resin composition in relation to the present invention (i), there may be optionally even added usual additives for coating such as a curing agent for an epoxy resin (acid anhydride or phenolic resin), an accelerator for the curing agent, a functional silane coupling agent for improving adhesion, an extender pigment, a pigment for rust prevention, pigments such as a coloring pigment, a reactive diluent, an organic solvent, an agent for sedimentation prevention, an agent for preventing sagging, a wetting agent, a reaction accelerator (a curing accelerator) having oxetane group and hydroxyl group for an epoxide, an adhesion accelerator, a dehydrating agent, a defoaming agent, a levelling agent, a stabilizer such as an oxidant and an ultraviolet ray absorbent, and a flexibility agent.

As the functional silane coupling agent, there can be enumerated a silane coupling agent having double bond such as vinyl group, (meth)acryloyl group; a reactive substituted group such as an isocyanate group and an epoxy group; a functional group such as hydroxyl group, carboxylic group, and amino group, specifically, there can be enumerated vinyltrimethoxysilane, vinyltriethoxy silane, γ-((meth)acryloxypropyl)trimethoxysilane, γ-isocyanatepropyl triethoxysilane, β-(3,4-epoxycyclohexyl)ethyltrimethoxysilane, γ-glycidyloxypropyl trimethoxysilane, γ-glycidoxypropyl trimethoxysilane, γ-aminopropyl trimethoxysilane, etc. Particularly, a silane coupling agent having an epoxy group is preferred because of an excellent adhesive ability and chemical resistance, etc. The functional silane coupling agent may be employed solely or in combination of two or more kinds.

5. Coating

The curable resin composition of the present invention (i) is employed as a coating, and it is coated on surface of a metal substrate such as aluminum, iron, a zinc-treated steel plate, and a metal plate coated by a resin such as PET, PBT, a polycarbonate, a nylon, and a vinylchloride.

Further, it can be employed as an overcoating for a coating layer made from a melamine-cured coating, a urethane-cured coating, an oxidation-polymerization type coating such as an alkyd.

As a coating method for the above coating, there can be applied a roll coating, a gravure coating, a gravure off-set coating, a spinner coating, a curtain flow coating, a slot coating, a reverse coating, a screen printing, an off-set printing, an airless spraying, an air-spraying, a roll coating method, a rolling coating method, a brush coating, and dipping coating, etc. which are a conventionally publicly known method.

The above coating can be coated in dry coating thickness of 5–200 μm.

6. Curing Method

The curable resin composition in relation to the present invention (i) can be cured by photo-irradiation or heating, or simultaneous use thereof.

As a light source for photo-curing, there can be employed a high pressure mercury lamp, an ultra high pressure mercury lamp, a metal halide lamp, a halogen lamp, a gallium lamp, a xenon lamp, and a carbon arc lamp, etc. Further, there can be also employed radiation rays such as an electron beam and γ-ray.

As a heating source for curing, there can be employed an infrared radiation, a far infrared radiation, heated air, and high frequency heating, etc. The light source can be also employed together with the heating source.

7. Uses

The curable resin composition in relation to the present invention (i) can be employed for a slipping property-required metal and a surface coating of a resin, and it is particularly preferred for coating an outside of a can.

[ii] Mode for Carrying out the Present Invention (ii)

The solvent-based coating composition in relation to the present invention (ii) is comprised (ii-1) an epoxy compound having at least two cycloaliphatic epoxy groups in the molecule and a number average molecular weight of not more than 2,000, (ii-2) an acrylic resin having epoxy groups, a number average molecular weight of 2,000–50,000, a hydroxyl group value of 10–250 mgKOH/g, and an epoxy equivalent of not more than 300, and (3) a thermally-activating ionic polymerization catalyst which can be dissolved by heating and crystallized by cooling.

In the acrylic resin having epoxy groups (ii-2), the epoxy groups are a cycloaliphatic epoxy group or an epoxy group derived from glycidyl(meth)acrylate.

As the curing catalyst (3), there can be quite equally employed the thermally-activating ionic polymerization catalyst (3) described in the above-described invention (i).

1. Epoxy Compound (ii-1)

The epoxy compound (ii-1) to be employed in the present invention (ii) is a compound having at least one, preferably 2–3 pieces of a cycloaliphatic epoxy in the molecule, a number average molecular weight of not more than 2,000 and, preferably approximately 100–1,500, an epoxy equivalent of 30–1000 and, particularly, preferably 80–400 in consideration of an ionic polymerizability and viscosity, etc.

As the epoxy compound (ii-1), specifically, there can be likewise employed the epoxy compound (i-1) enumerated in the previously-mentioned present invention (i), and the illustration is omitted.

2. Acrylic Resin (ii-2) Having Epoxy Groups and Hydroxyl Groups

As the acrylic resin (ii-2) having epoxy groups and hydroxyl groups, there is preferred an acrylic resin having epoxy groups which has a number average molecular weight of 2,000–50,000, a hydroxyl group value of 10–250 mgKOH/g, and an epoxy equivalent of not more than 300.

The acrylic resin (ii-2) is constructed by components including monomers having an epoxy group, monomers having hydroxyl group, and/or monomers having an epoxy group and hydroxyl group, and other monomers copolymerizable therewith. As the monomers, there can be employed the monomers which are constructing components in the acrylic resin (i-2) enumerated in the present invention (i), and the illustration thereof is omitted.

3. Thermally-Activating Ionic Polymerization Catalyst (3)

The thermally-activating ionic polymerization catalyst (3) to be employed in the present invention (ii) can be likewise employed as in the thermally-activating ionic polymerization catalyst (3) described in the above-described invention (i), and there is omitted the illustration of the thermally-activating ionic polymerization catalyst (3).

4. Other Additives

The resin composition of the present invention (ii) may even optionally contain the other additives enumerated in the above-described invention (i) as well as in the invention (i).

5. Preparation of a Solvent-Based Coating Composition

A clear coating employed in the present invention (ii) is comprised the epoxy compound (ii-1), the acrylic resin (ii-2), and the thermally-activating ionic polymerization catalyst (3), and the thermally-activating ionic polymerization catalyst (3) can be prepared by dissolving or dispersing into the epoxy compound (ii-1) and/or the acrylic resin (ii-2) optionally using organic solvents.

For example, the solvent-based coating composition can be prepared by thermally dissolving the thermally-activating ionic polymerization catalyst (3) into the mixture of the epoxy compound (ii-1) with the acrylic resin (ii-2), and by crystallizing and dispersing the catalyst by cooling.

Further, a resin composition is obtained by mixing the epoxy compound (ii-1) with the acrylic resin (ii-2), and then, it is divided into two portions, and one kind of the thermally-activating ionic polymerization catalyst (3) is thermally dissolved into one portion and the catalyst is crystallized and dispersed while cooling, and other kind of the thermally-activating ionic polymerization catalyst (3) is thermally dissolved into another portion, and the catalyst is crystallized and dispersed while cooling, and the solvent-based coating composition can be prepared by mixing the two portions.

Otherwise, one kind of the thermally-activating ionic polymerization catalyst (3) is thermally dissolved into the epoxy compound (ii-1) and the catalyst is crystallized and dispersed while cooling, and other kind of the thermally-activating ionic polymerization catalyst (3) is thermally dissolved into the acrylic resin (ii-2), and the catalyst is crystallized and dispersed while cooling, and the solvent-based coating composition can be prepared by mixing two parts.

As the organic solvents, for example, there are enumerated toluene, xylene, ethyl acetate, butyl acetate, methylethyl ketone, methylisobutyl ketone, cyclohexane, isophorone, methoxypropyleneglycol acetate, carbinol acetate, methoxybutyl acetate, cellosolve, cellosolve acetate, and butanol, etc., and which are not limited thereto, and the solvents are also employed in polymerization of the acrylic resin (ii-2).

6. Coating

The solvent-based coating composition in relation to the present invention (ii) can be likewise coated by the method for coating described in the present invention (i).

As a coating method for vehicles, etc., a method for formation of a multi-layered overcoating layer using an opaque coloring coating, a transparent coloring coating, and a clear coating may be even conducted by any one of a 3-coating/1-baking method (3C1B) in which three coating layers are simultaneously baked by one heating step after completely coating three kinds of coatings, a 3-coating/2-baking method (3C2B) in which two heating steps are conducted, and a 3-coating/3-baking method (3C3B) in which each coating layer is baked.

7. Curing Method

The resin composition in relation to the present invention (ii) can be likewise cured by the curing method described in the invention (ii).

8. Uses

The solvent-based coating composition in relation to the present invention (ii) is employed as a coating for vehicles such as cars, motor bicycles, trains, a coating for home electric appliances, a coating for constructing materials, preferably an overcoating. Particularly, it is effective for a clear coating which is coated on an opaque coloring coating and a transparent coloring coating as an overcoating for cars, and it is excellent in heat resistance, staining resistance, and scratch resistance, etc.

Further, the solvent-based coating composition in relation to the present invention (ii) can be employed as surface coatings for metals and resins in which a slipping property is required, for example, it can be also employed as an outside coating for cans.

The present invention (ii) also discloses a coating method in which multiple coating layers are formed by coating an opaque coloring coating, a transparent coloring coating, and a clear coating onto body surface of vehicles which run on a road such as cars and motor bicycles.

Herein, the opaque coloring coating includes a solid color coating, a metallic coating, and a coating having photo-interference fringes, etc., and it is a thermosetting coating having a composition composed of a resin component, a coloring pigment, and solvents, etc., and it is firstly coated on a car body.

The transparent coloring coating is composed of a resin component, coloring pigments, and solvents, and it is coated on a cured or uncured surface of the opaque coloring coating and, it forms a colored coating layer colored in extent as being capable of seeing through a coating layer.

The clear coating is coated on a cured or uncured surface of the transparent coloring coating and, it is usually a coating for forming a transparent coating layer, and the solvent-based coating composition of the present invention (ii) is preferably employed.

[iii]. Mode for Carrying Out the Invention (iii)

The resin composition for insulating a laminated printed circuit board in relation to the present invention (iii) is comprised (iii-1) a monomer having at least one functional group having ionic polymerizability, (iii-2) a polymeric compound having at least one functional group having ionic polymerizability, and (3) a thermally-activating ionic polymerization catalyst which can dissolve by heating and crystallize by cooling.

Hereinafter, the resin composition for insulating a laminated printed circuit board is also called a curable resin composition.

Further, the thermally-activating ionic polymerization catalyst (3) which can dissolve by heating and crystallize by cooling is also called a curable catalyst (3).

The curable catalyst (3) can be quite likewise employed as the thermally-activating ionic polymerization catalyst (3) described in the above-described invention (i).

1. Monomer (iii-1)

The monomer (iii-1) to be employed in the present invention (iii) has ionic polymerizability, and since it is an epoxy compound having a viscosity of not more than 1,000 cP at 25° C., it is also called an epoxy compound (iii-1). As the epoxy compound (iii-1), there can be quite likewise employed the epoxy compound (i-1) described in the above-described invention (i), and illustration is omitted.

In the case of formulating a vinylether and oxetane, those are desirably employed likewise as in the above-described invention (i) in not more than 30% by weight based on 100% by weight of total of the epoxy compound (iii-1), the acrylic resin (iii-2), and the vinylether and oxetane.

Proportion of compounds having an epoxy group in a resin composition composed of the epoxy compound (iii-1) and the acrylic resin (iii-2) is 20–90% by weight, and preferably 40–80% by weight as well as in the above-described invention (i).

2. Polymeric Compound (iii-2)

The polymeric compound (iii-2) to be employed in the present invention (iii) is, for example, an acrylic resin having a functional group which reacts with an ionic specie, and the functional group which reacts with an ionic specie is an epoxy group and hydroxyl group. Accordingly, the polymeric compound (iii-2) is occasionally called the acrylic resin (iii-2).

As a monomer which is a constructing component of the acrylic resin (iii-2), there can be employed a (meth)acrylate having glycidyl ether group or a similar terminal epoxy group as an epoxy group and a (meth)acrylate having a cycloaliphatic epoxy group.

As the above monomer, there can be employed the monomers which are a constructing component in the acrylic resin (i-2) enumerated in the above-described invention (i), and illustration is omitted.

An oxirane concentration of the resin composition composed of the epoxy compound (iii-1) and the acrylic resin (iii-2) is 5–11% by weight, and preferably 7–10% by weight in the resin composition composed of the epoxy compound (iii-1) and the acrylic resin (iii-2) as well as in the above-described invention (i).

A content of the (meth)acrylate having an epoxy group in the acrylic resin is 1–80% by weight, and preferably 15–60% by weight as the content of glycidyl(meth)acrylate as well as in the above-described invention (i).

A content of hydroxyl groups in components composed of the epoxy compound (iii-1) and the acrylic resin (iii-2) is 1–300 mgKOH/g, and preferably 1.5–250 mgKOH/g as a hydroxyl group value as well as in the above-described invention (i).

As constructing components of the acrylic resin (iii-2), there can be employed usual alkylacrylate monomers, etc. as copolymerizable components as well as in the above-described invention (i).

As the alkylacrylate monomers, for example, there are enumerated alkylacrylate monomers having a carbon number of 2–10 pieces, and preferably 1–5 pieces in an alkyl portion such as methyl(meth)acrylate and n-butyl(meth)acrylate as well as in the above-described invention (i).

As constructing components of the acrylic resin (iii-2), there can be also simultaneously employed styrene, α-methylstyrene, and vinyltoluene, etc. as other copolymerizable components as well as in the above-described invention (i).

In the case of polymerizing the constructing components of the acrylic resin (iii-2), there can be employed an initiator as well as in the above-described invention (i). As the initiator, there can be likewise employed the initiator enumerated in the above-described invention (i).

Use amount of the initiator is 1–10 parts by weight, and preferably 3–6 parts by weight based on 100 parts by weight of the constructing components of the acrylic resin (iii-2) as well as in the above-described invention (i).

The initiator may be partially fed in advance as well as in the above-described invention (i), and it may be even added dropwise after mixing with monomers, or may be separately added dropwise without mixing with monomers. Further, the initiator may be even additionally fed after having fed monomers.

Polymerization temperature for synthesizing the acrylic resin (iii-2) is 50–150° C., preferably 90–130° C., and more preferably 100–120° C. as well as in the above-described invention (i). In the case that the polymerization temperature is higher than the above range, the polymerization becomes unstable and a large amount of high molecular weight compounds are produced and, in the case of being less than the above range, reaction time of period becomes undesirably too long.

As solvents to be employed when polymerizing the acrylic resin (iii-2), the epoxy compound (iii-1) is employed as well as in the above-described invention (i).

Further, as well as in the above-described invention (i), an acrylic resin is polymerized using usual solvents not having ionic polymerizability, and the solvents are removed, and diluted by the epoxy compound (iii-1) to prepare a resin composition. As the solvents not having ionic polymerizability, there can be likewise employed the solvents enumerated in the above-described invention (i).

3. Thermally-Activating Ionic Polymerization Catalyst (3)

The thermally-activating ionic polymerization catalyst (3) to be employed in the present invention can be quite likewise employed as well as the thermally-activating ionic polymerization catalyst (3) described in the above-described invention (i), and there is omitted illustration of the thermally-activating ionic polymerization catalyst (3).

4. Other Additives

In the curable resin composition of the present invention (iii), the additives enumerated in the above-described invention (i) may be optionally contained as well as in the above-described invention (i).

5. Method for the Preparation of a Laminated Printed Circuit Board

Hereinafter, there will be illustrated a method for the preparation of the laminated printed circuit board in relation to the present invention (iii).

First of all, an insulating layer is formed on a substrate on which a conductor circuit is formed using the curable resin composition. As the substrate on which the curable resin composition is coated, for example, there can be employed plastics substrates, ceramics substrates, metal substrates, and film substrates, etc. and, specifically, there can be employed a glass-reinforced epoxy substrate, a bismaleimide-triazine compound substrate, a polyimide substrate, an aluminum substrate, and an iron substrate, etc.

As a method for the formation of the above-described resinous insulating layer on the substrate on which a conductor circuit is formed, there can be also applied a method in which a solution of the curable resin composition is coated by, for example, the coating method illustrated in the above-described invention (i), or a method in which the curable resin composition is molded into a resinous film and the resinous film is stuck.

Thickness of the above-described resinous insulating layer is usually 20–100 μm or so and, in the case that a particularly high insulating property is required, it can be also more thickened.

6. Curing Method and Processing

The curable resin composition in relation to the present invention (iii) can be cured by light or heating, or simultaneous use thereof by the same method as in the above-described present invention (i).

In order to prepare the laminated printed circuit board, for example, there can be applied a method in which the resinous insulating layer coated is thermally cured at 100° C., and fine via holes are formed using a carbon dioxide laser, and then, surface of the resinous insulating layer is roughened using an acid or an oxidant, after that, electroless deposition and electric deposition is conducted, and an etching is conducted after thermosetting at 150° C. to form a circuit, or a method in which a circuit is directly formed during conducting the electroless deposition.

As described hereinabove, there can become obtained a laminated printed circuit board having a high fidelity which is more excellent in storage stability and an insulation property compared to a conventional one by the use of the insulating resin composition for a laminated printed circuit board in the present invention (iii).

[iv]. Mode for Carrying Out the Invention (iv)

The curable resin composition of the present invention (iv) has an ionic polymerizability, and it is comprised an epoxy resin (iv-1) and the thermally-activating ionic polymerization catalyst (3) which can be dissolved by heating and crystallized by cooling.

As the catalyst (3) for curing, there can be quite likewise employed the thermally-activating ionic polymerization catalyst (3) described in the above-described invention (i).

1. Epoxy Resin (iv-1)

The epoxy resin (iv-1) to be employed in the present invention (iv), if it has an ionic polymerizability, is not particularly limited, and it may even have an epoxy group and hydroxyl group.

As a kind of a compound having an epoxy group, there are a compound having a terminal epoxy group such as glycidiyl ether and glycidiyl ester, a compound having an inner epoxy group, and a compound having a cyclooaliphatic epoxy group, etc.

The epoxy resin (iv-1) is specifically exemplified below, and it can be employed in mixing from a viewpoint of heat resistance, adhesive ability, and surface hardness.

As the epoxy resin (iv-1), there can be likewise employed the bisphenol type, novolak type, and brominated type epoxy resins enumerated in the invention (i).

Further, as the epoxy resin (iv-1), there can be employed the cycloaliphatic type epoxy resins which are enumerated as specific example of the constructing monomers for the acrylic resins (i-2) in the invention (i), and there can be employed an epoxy resin obtained by polymerization of the (meth)acrylate,etc. having an epoxy group or copolymerization of it with other polymerizable monomers.

As the polymerizable monomers to be employed in the copolymerization, for example, there are an unsaturated fatty acid ester such as an alkyl(meth)acrylate, an alkyl (meth)acrylate having hydroxyl group, a cycloaliphatic (meth)acrylate, an aromatic acrylate, and a cycloaliphatic methacrylate having a carbon number of 7–20 and containing tertiary carbon in the ring; an aromatic vinyl compound such as styrene, α-methylstyrene, α-ethylstyrene, chlorostyrene, vinyltoluene, and t-butylstyrene; a cyano vinyl compound such as acrylonitrile and methacrylonitrile; and an N-substituted maleimide such as N-alkyl group-substituted, N-cycloalkyl group-substituted maleimide, and N-phenyl maleimide, etc.

In the case that the (meth)acrylates having an epoxy group, etc. are polymerized solely or copolymerized with other copolymerizable monomers, an initiator can be employed. As the initiator, there can be likewise employed the same initiator as enumerated in the above-described invention (i).

Polymerization temperature is 50–150° C., preferably 90–130° C., and more preferably 100–120° C. as well as in the above-described invention (i). In the case that the polymerization temperature is higher than 150° C., polymerization becomes unstable and high molecular weight compounds are largely produced and, in the case that it is lower than 50° C., reaction time of period becomes undesirably long.

As solvents to be employed in the polymerization, other epoxy resin (iv-1) can be also employed. Further, a resin composition can be prepared by removing solvent and diluting using the epoxy resin (i-1) after having prepared a polymer using a usual solvent not having an ionic polymerizability. As the solvent not having an ionic polymerizability, there can be likewise employed the solvents enumerated in the above-described invention (i).

In the epoxy resin, there can be added CEL-2021P, CEL-2021A, CEL-2000, CEL-3000, DENACOL EX-421, 201, 211, 911, and 701, etc. which are specifically exemplified as an epoxy resin compound (i-1) in the above-described invention (i).

Further, the epoxy resin (iv-1), as well as in the above-described invention (i), can be employed together with vinylether and oxetane, etc. which are a compound having an ionic polymerizability.

In the case that the vinylether and oxetane, etc. are formulated, as well as in the above-described invention (i), those are preferably employed in not more than 30% by weight based on 100% by weight of total of the epoxy resin (iv-1), the vinylether, and the oxetane.

Proportion of the compound having an epoxy group in a resin composition composed of the epoxy resin (iv-1) is 20–90% by weight, and preferably 40–80% by weight as well as in the above-described invention (i).

3. Thermally-Activating Ionic Polymerization Catalyst (3)

The thermally-activating ionic polymerization catalyst (3) to be employed in the present invention (iv) can be quite likewise employed as in the thermally-activating ionic polymerization catalyst (3) illustrated in the above-described invention (i), and there is omitted the illustration of the thermally-activating ionic polymerization catalyst (3).

4. Other Additives

In the curable resin composition of the present invention (iv), the other additives illustrated in the above-described invention (i) may be optionally added as well as in the above-described invention (i).

5. Formation of a Coating Layer, Processing, and a Protection Layer for a Color Filter Protection layer can be usually formed by preparing a curable resin composition solution through dissolving the curable resin composition into a solvent, and it is coated on a substrate, followed by thermally curing.

The solvent to be employed is not particularly limited, if it dissolves the curable resin composition of the present invention (iv) and, moreover it does not react with components in the composition. Specifically, there can be employed the solvents exemplified as a solvent in the case of allowing to polymerize the above-described epoxy compound having a double bond in the epoxy resin (iv-1) in relation to the present invention (iv). Of the solvents, an ester-based solvent and ketone-based solvent are preferred, and those can be employed solely or in mixing two or more kinds.

A method for the preparation of the curable resin composition solution is not particularly limited, and respective components may be even simultaneously dissolved into solvents to prepare the curable resin composition solution and, two or more solutions may be even mixed when being used after having mixed any one of the respective components.

Use amount of the solvents is 40–90% by weight in the curable resin composition solution. Within the range, flatness (also called leveling), transparency, and solvent resistance are preferred in a coating layer.

A method for coating the curable resin composition or the solution thereof is not particularly limited and, for example, it can be coated onto a substrate by the coating method enumerated in the above-described invention (i).

Conditions for thermally curing the curable resin composition of the present invention (iv) can be appropriately selected according to specific kinds of respective components and formulating proportion, etc., and temperature is usually 50–250° C. for 1–10 minutes, and preferably 150–200° C. for 1–5 hours or so and, in the case that a plastics which is limited in heat resistance is employed as a substrate, curing can be sufficiently conducted at a temperature of not more than 180° C.

The curable resin composition of the present invention (iv) can be cured by light and heating or simultaneous use thereof as described in the above-described invention (i).

In general, the protection layer for a color filter formed as described hereinabove shows an excellent adhesion to a various materials such as a glass, metal, and plastics, and since it is flat and tough, and since it is excellent in light resistance, heat resistance, water resistance, chemical resistance, transparency, and scratch resistance, it is also useful as a coating layer for various articles.

6. Color Filter Having a Protection Layer

Various color filters (obtained by dying a binder resin such as a gelatine, a glue, a polyvinyl alcohol, and an acrylic resin, with dyes, or coloring with dispersing pigments) having a protection layer are obtained by coating the curable resin composition or the solution thereof on surface of various color filters having a protection layer using a spin coating method and a printing method, etc., and by thermally curing.

The protection layer functions as a protection layer in order to protect pixels and black matrix from scratching and staining caused in a preparation step of a liquid crystal display device.

Thickness of the protection layer after curing is preferably 0.005–30 μm, and more preferably 0.1–10 μm or so.

7. Liquid Crystal Display Device

The color filter having a protection layer is employed as a liquid crystal display device, and it is widely employed for a display device for a computer, information equipments such as telephones and GPS, and home electric appliances, etc.

Color liquid crystal display device is composed of a substrate on which the color filter is set up and an opposite substrate on which a conductive layer is formed over a transparent substrate. In the color filter, there are formed picture elements including black matrix and three primary colors composed of red, green, and blue on the transparent substrate, and the protecting layer is set up thereon, a protecting layer for a color filter is formed by thermally curing. After having formed the protecting layer for a color filter, there is formed a conductive layer which is necessary for driving a liquid crystal in an electrical field.

In the case, the protecting layer for a color filter functions as planarization of step-faults in the picture elements and flatness of surface in addition to the surface protection and protection from staining, and it suppresses a disorder of orientation in a liquid crystal molecule and produces an improvement in a contrast ratio when being displayed and, it is effective for preventing diffusion of impurities from the picture elements to a liquid crystal after having injected the liquid crystal into a cell. Particularly, in a liquid crystal display device in which there are required a low electric power consumption and shortening of cell gaps accompanied by a high speed responsibility and a liquid crystal display device in which there is required a highly accurate control of cell gaps, planarization of the protection layer is required because the liquid crystal display device is driven by an electrical field which is parallel to the substrate, and there can be preferably employed the color filter having a protection layer of the present invention (iv).

[v]. Mode for Carrying Out the Present Invention (v)

Curable resin composition in relation to the present invention (v) is comprised an epoxy compound (v-1) having an ionic polymerizability and viscosity of not more than 1000 cP at 25° C., a compound (v-4) having 1–6 pieces of oxetane rings, and the thermally-activating ionic polymerization catalyst (3) which can be dissolved by heating and crystallized by cooling.

Further, curable resin composition in relation to the present invention (v) is comprised an epoxy compound (v-1) having an ionic polymerizability and viscosity of not more than 1000 cP at 25° C., an acrylic resin (v-2) having an ionic polymerizable functional group, a compound (v-4) having 1–6 pieces of oxetane rings, and the thermally-activating ionic polymerization catalyst (3) which can be dissolved by heating and crystallized by cooling.

The acrylic resin (v-2) having an ionic polymerizable functional group has hydroxyl group, and glycidyl group and/or a cycloaliphatic epoxy group.

As catalyst for curing (3), there can be quite likewise employed the thermally-activating ionic polymerization catalyst (3) described in the invention (i) as well as in the invention (i).

1. Epoxy Compound (v-1)

The epoxy compound (v-1) to be employed in the present invention (v) is an epoxy compound having an ionic polymerizability and viscosity of not more than 1,000 cP at 25° C.

As the epoxy compound (v-1), there are a compound having a terminal epoxy group such as glycidiyl ether and glycidiyl ester, a compound having an inner epoxy group, and a compound having a cyclooaliphatic epoxy group, etc.

Of those, in comparison of the ionic polymerizability and viscosity, there is preferred a compound having 1–4 pieces of cycloaliphatic epoxy groups in the molecule. For example, there are enumerated CEL-2021P, CEL-2021A, CEL-2000, and CEL-3000, etc. which are enumerated in the above-described invention (i).

Further, in addition to the cycloaliphatic compound, an aliphatic compound described below can be also simultaneously employed. For example, there are enumerated DENACOL EX-421, 201, 211, 911, and 701, etc.

Still further, in the epoxy compound (v-1), there can be added a bisphenol type epoxy compound, a novolak type epoxy compound, and a brominated type epoxy compound thereof, etc. and, specifically, there can be employed the epoxy compound (i-1) enumerated in the above-described invention (i) depending upon purposes.

The epoxy resins can be added in a range of 0–70% by weight based on 100% by weight of the epoxy compound (v-1) as well as in the above-described invention (i).

Furthermore, in the epoxy compound (v-1), there can be simultaneously employed vinylethers, etc. which are a compound having an ionic polymerizability. In the case that the vinylether, etc. are formulated, those are preferably employed in not more than 30% by weight based on 100% by weight of total of the epoxy resin (v-1), oxetane compound (v-4), the acrylic resin (v-2), and the vinylether which is optionally added.

Proportion of the compound having an epoxy group is 20–90% by weight, and preferably 40–80% by weight in a resin composition which is composed of the epoxy resin (v-1), oxetane compound (v-4), the acrylic resin (v-2), and the vinylether which is optionally added.

2. Oxetane Compound (v-4)

As the oxetane compound (v-4) having 1–6 pieces of oxetane rings in the molecule, there are enumerated compounds of formulae [1]–[24] described in the end of the specification, and specific compounds OXE-1, OXE-2, and OXE-3, etc. employed in Examples.

By copolymerization of the oxetane compound (v-4) with the epoxy resin (v-1) under the presence of the thermally-activating ionic polymerization catalyst (3), reactivity is improved in a curable resin.

Proportion of the oxetane compound (v-4) is 1–50 parts by weight, and preferably 5–40 parts by weight with respect to 100 parts by weight of the epoxy resin (v-1).

2. Acrylic Resin (v-2)

The acrylic resin (v-2) to be employed in the present invention (v) is an acrylic resin having an ionic polymerizable functional group, and the ionic polymerizable functional group includes an epoxy group and hydroxyl group and, particularly, there is preferred an acrylic resin having an epoxy group and hydroxyl group.

As monomers having an epoxy group which are a constructing component in the acrylic resin (v-2), there can be employed the (meth)acrylates having glycidylether group or a similar terminal epoxy group enumerated in the above-described invention (i), and (meth)acrylates having a cycloaliphatic epoxy group, etc.

Oxirane oxygen concentration derived from epoxy groups is 5–11% by weight, and preferably 7–10% by weight in the resin composition composed of the epoxy resin (v-1), the oxetane compound (v-4), and the acrylic resin (v-2) which is further added, as well as in the above-described invention (i).

Content of the (meth)acrylate having an epoxy group in the acrylic resin is 1–80% by weight, and preferably 15–60% by weight as glycidylmethacrylate as well as in the above-described invention (i).

As copolymerizable monomers having hydroxyl group which are a constructing component in the acrylic resin (v-2), there can be employed the copolymerizable monomers having hydroxyl group in the above-described invention (i).

Amount of hydroxyl group in the resin composition is 1–200 mgKOH/g, and preferably 1.5–180 mgKOH/g, which is composed of the epoxy resin (v-1), the oxetane compound (v-4), and the acrylic resin (v-2) which is further added.

Formulating amount of the copolymerizable monomers having hydroxyl group is 0.1–40 parts by weight, preferably 1–35 parts by weight in the acrylic resin (v-2).

As constructing components in the acrylic resin (v-2), there can be further employed a usual alkylacrylate monomer, etc. as a copolymerizable component.

For example, there are enumerated alkyl(meth)acrylate monomers having a carbon number in an alkyl portion of 2–10 pieces, preferably 1–5 pieces such as methyl(meth)acrylate and n-butyl(meth)acrylate.

As the constructing components in the acrylic resin (v-2), there can be further simultaneously employed styrene, -methylstyrene, and vinyltoluene, etc. as a copolymerizable component.

In the case that the constructing components in the acrylic resin (v-2) are polymerized, there can be likewise employed the initiator enumerated in the above-described invention (i).

Use amount of the initiator is 1–10 parts by weight, preferably 3–10 parts by weight based on 100 parts by weight of the constructing components in the acrylic resin (v-2) as well as in the above-described invention (i).

Polymerization temperature for synthesizing the acrylic resin (v-2) is 90–130° C., and preferably 100–120° C. as well as in the above-described invention (i). In the case that the polymerization temperature is higher than 130° C., the polymerization becomes unstable and high molecular weight compounds are largely produced and, in the case of being less than 90° C., reaction time of period is undesirably too long.

As solvents to be employed for polymerizing the acrylic resin (v-2), the epoxy resin (v-1) and/or oxetane compound (v-4) are employed.

Further, an acrylic resin is polymerized using usual solvents not having ionic polymerizability, and the solvents are removed, and diluted by the epoxy compound (iii-1) to prepare a resin composition. As the solvents not having ionic polymerizability, there can be likewise employed the solvents not having ionic polymerizability enumerated in the above-described invention 1.

3. Thermally-Activating Ionic Polymerization Catalyst (3)

The thermally-activating ionic polymerization catalyst (3) to be employed in the present invention (v) can be quite likewise employed as well as the thermally-activating ionic polymerization catalyst (3) described in the above-described invention (i), and there is omitted the illustration of the thermally-activating ionic polymerization catalyst (3).

4. Other Additives

In the curable resin composition of the present invention (v), the additives enumerated in the above-described invention (i) may optionally contain as well as in the above-described invention (i). ps 5. Preparation of a Curable Resin Composition The curable resin composition in relation to the present invention (v) is composed of the epoxy resin (v-1), the oxetane compound (v-4), and the thermally-activating catalyst (3), or further the acrylic resin (v-2), and the thermally-activating catalyst (3) can be prepared by dissolving or dispersing the catalyst using the epoxy resin (v-1), the oxetane compound (v-4), and/or the acrylic resin (v-2), and using optionally an organic solvent.

For example, a solvent-based coating composition can be prepared by the same method as in the preparation of the solvent-based coating composition of the above-described invention (ii).

As the organic solvent, for example, including a solvent in the polymerization of the acrylic resin (v-2), there can be employed the organic solvents enumerated in the preparation of the solvent-based coating composition of the above-described invention (ii), and it is not limited thereto.

6. Coating

The solvent-based coating composition in relation to the present invention (v) can be likewise coated by the coating method described in the invention (i).

7. Method for Curing

The curable resin composition in relation to the present invention (v) can be likewise cured by the same method for curing described in the invention (i).

8. Uses

The curable resin composition of the present invention (v) can be employed for surface coating of a metal or a resin which requires a slipping property, and it is particularly preferred for coating an outside of cans.

EXAMPLES

Hereinafter, although the present inventions (i)–(v) are specifically illustrated by Examples, the present inventions are not limited thereto.

It is to be noted that "part" and "%" are shown by "part by weight" and "% by weight", respectively.

[i]. Examples for the Invention (i)

Synthesis Example i-1

Into a flask equipped with an agitator, a reflux condenser, a dropping funnel, and a thermometer, a fixed amount of CEL-2021 was fed, a temperature was elevated to 105–110° C. by heating while blowing air. Subsequently, there were added dropwise monomers and initiator shown in Table i-1 over 3 hours.

After the completion of the dropwise addition, a reaction was continued for 1 hour and terminated to prepare a resin composition.

Synthesis Example i-5

Into a flask equipped with an agitator, a reflux condenser, a dropping funnel, and a thermometer, 400 parts by weight of toluene was fed, a temperature was elevated to 105–110° C. by heating while blowing air. Subsequently, there were added dropwise monomers and initiator shown in Table i-1 over 3 hours. After the completion of the dropwise addition, a reaction was continued for 1 hour and terminated. After having terminated the reaction, toluene was removed at 80° C./20 torr, and diluted by a fixed amount of CEL-2021 shown in Table i-1.

Synthesis Examples i-2 to i-4, and i-6

A resin composition was likewise synthesized as in the Synthesis Example i-1 using monomers composition shown in Table i-1. It is to be noted that the Synthesis Example i-6 is an example in which an acrylic resin does not contain a functional group (an epoxy group) which reacts to a cationic specie.

TABLE i-1

|  | Synthesis Examples | | | | | |
|---|---|---|---|---|---|---|
|  | i-1 | i-2 | i-3 | i-4 | i-5 | i-6 |
| CEL-2021 | 233 | 233 | 233 | 180 | 100 | 300 |
| MMA | 55 | 65 | 67 | 45 | 45 | 70 |
| n-BMA | 15 | 10 | 2 |  | 20 | 10 |
| BA |  |  |  | 10 |  |  |
| HEMA | 20 | 15 | 1 |  |  |  |
| HEA |  |  |  |  | 10 |  |
| PCL-FM1 |  |  |  |  |  | 20 |
| PCL-FM3 |  |  |  | 5 |  |  |
| CYMM-100 | 10 |  |  | 30 |  |  |
| GMA |  | 10 | 30 |  | 25 |  |
| M-GMA |  |  |  |  | 10 |  |
| AIBN | 3 | 3 | 4 | 3 | 2 | 3.5 |
| MEHQ | 0.3 | 0.3 | 0.3 | 0.3 | 0.2 | 0.4 |
| Hydroxyl group value | 23.6 | 18.3 | 1.7 | 2.2 | 11.7 | 21.6 |
| Oxirane oxygen concentration | 8.0 | 8.5 | 9.1 | 9.6 | 9.0 | 7.1 |

In the Tables i-1 to v-5, unit in raw materials is parts by weight, and other units and abbreviations are as follows.

n-BMA: n-butylmethacrylate

BA: n-butylacrylate

HEMA: 2-hydroxyethylmethacrylate

HEA: 2-hydroxyethylacrylate

PCL-FM1: ε-caprolactone-modified hydroxyethyl-methacrylate
  (a molecular weight of 214)

PCL-FM3: ε-caprolactone-modified hydroxyethyl-methacrylate
  (a molecular weight of 472)

PCL-FM5: ε-caprolactone-modified hydroxyethyl-methacrylate
  (a number average molecular weight of 700)

CYM M-100: 3,4-epoxycyclohexylmethylmethacrylate

GMA: glycidylmethacrylate

M-GMA: 2-methylglycidylmethacrylate

AIBN: azobisisobutyronitrile

MEHQ: paramethoxyphenol

CD-1012: an iodonium salt-based cationic catalyst (manufactured by Sartomer, Co.)

UVI-6974: a sulphonium salt-based cationic catalyst (manufactured by UCC, Corp.)

SI-100L: a sulphonium salt-based cationic catalyst (manufactured by Sanshin Kagaku, Co.)

Hydroxyl group value: KOH mg/g

Oxirane oxygen concentration: % by weight

Examples i-1 to i-9

The resin compositions obtained in the Synthesis Examples i-1 to i-6 were divided into two parts by weight, respectively, and respective one part was formulated with curing catalysts A-1 to A-3 and another respective part was formulated with curing catalysts B-1 to B-3 in a weight ratio shown in Table i-2, and those were dissolved at 80° C., respectively. Catalyst for curing was crystallized and dispersed by agitating while cooling respective solutions at room temperatures, followed by mixing two parts and sufficiently agitating to prepare a curable resin composition.

Comparative Examples i-1 to i-2

A conventional onium-based salt catalyst for curing was added to the resin composition obtained in the Synthesis Example i-5 by the same method as in the Examples i-1 in weight ratio shown in Table i-2 to obtain a curable resin composition.

Comparative Examples i-3 to i-4

Inherent catalysts for curing A-1 to A-3 and/or catalysts for curing B-1 to B-4 were added to the resin composition obtained in the Synthesis Example i-6 by the same method as in the Examples i-1 in weight ratio shown in Table i-2 to obtain a curable resin composition.

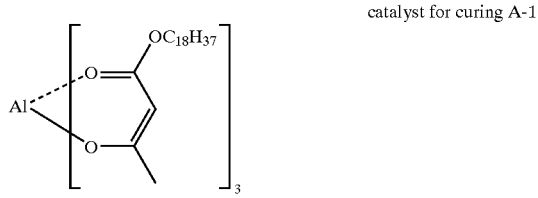

catalyst for curing A-1 catalyst for curing A-2 catalyst for curing A-3 catalyst for curing B-1 catalyst for curing B-2 catalyst for curing B-3 catalyst for curing B-4

TABLE i-2

|  | Examples | | | | | |
|---|---|---|---|---|---|---|
|  | i-1 | i-2 | 1-3 | i-4 | i-5 | i-6 |
| Synthesis Example i-1 | 100 |  |  |  |  |  |
| Synthesis Example i-2 |  | 100 | 100 |  |  |  |
| Synthesis Example i-3 |  |  |  | 100 |  |  |
| Synthesis Example i-4 |  |  |  |  | 100 | 100 |
| Catalyst for curing A-1 | 1 | 0.5 | 0.5 | 0.5 | 2 | 1 |
| Catalyst for curing B-1 |  |  | 3 |  |  |  |
| Catalyst for curing B-2 | 2 |  |  |  |  | 5 |

TABLE i-2-continued

| Catalyst for curing B-3 | | 4 | | 3 | | | |
|---|---|---|---|---|---|---|---|
| Catalyst for curing B-4 | | | | | 5 | | |
| CD-1012 | | 1 | | | | | |

| | Examples | | | Comparative Examples | | | |
|---|---|---|---|---|---|---|---|
| | i-7 | i-8 | i-9 | i-1 | i-2 | i-3 | i-4 |
| Synthesis Example i-5 | 100 | 100 | 100 | 100 | 100 | | |
| Synthesis Example i-6 | | | | | | 100 | 100 |
| Catalyst for curing A-1 | 1 | 2 | 3 | | | 2 | 1 |
| Catalyst for curing A-2 | | | | | | | |
| Catalyst for curing A-3 | | | | | | | |
| Catalyst for curing B-3 | | 5 | 7 | | | 3 | 4 |
| Catalyst for curing B-4 | 4 | | | | | | |
| UVI-6974 | | | | 5 | | | |
| SI-100L | | | | | 3 | | |

CD-1012: an iodonium salt-based cationic catalyst (manufactured by Sartomer, Co.)
UVI-6974: a sulphonium salt-based cationic catalyst (manufactured by UCC, Corp.)
SI-100L: a sulphonium salt-based cationic catalyst (manufactured by Sanshin Kagaku, Co.)

Curable resin composition obtained was coated on a PET film (Examples i-1 to i-5, and Comparative Examples i-1 to i-4) or an aluminum plate (Examples i-6 to i-9) using a barcoater #8 in the thickness of approximately 20 μm, and cured by the following conditions. Evaluation results are shown in Table i-3.

Curing Conditions

In the Examples i-1 to i-5 and Comparative Examples i-1 to i-4, it was cured at 120° C./10 minutes.

In the Examples i-6 to i-9, it was cured at 200° C./1 minute.

TABLE i-3

| | Examples | | | | | |
|---|---|---|---|---|---|---|
| | i-1 | i-2 | i-3 | i-4 | i-5 | i-6 |
| Storage stability of composition | ◯ | ◯ | ◯ | ◯ | ◯ | ◯ |
| Pencil hardness | H | 2H | H | H | 2H | H |
| Solvent resistance | ◯ | Δ | Δ | Δ | ◯ | ◯ |
| Adhesion | 100 | 100 | 100 | 100 | 100 | 100 |

| | Examples | | | Comparative Examples | | | |
|---|---|---|---|---|---|---|---|
| | i-7 | i-8 | i-9 | i-1 | i-2 | i-3 | i-4 |
| Storage stability of composition | ◯ | ◯ | ◯ | X | X | X | X |
| Pencil hardness | 2H | H | 2H | H | H | F | F |
| Solvent resistance | ◯ | Δ | ◯ | Δ | ◯ | Δ | ◯ |
| Adhesion | 80 | 100 | 100 | 100 | 100 | 100 | 100 |

Evaluation Method

Storage stability: Composition was stored at 40° C. for 14 days and, in comparison with an initial value, in the case of not more than 2 times, it is ◯, in the case of more than 2 times, it is Δ, and in the case of gelation, it is X.

Pencil hardness: Pencil hardness was measured according to JIS K5400.

Adhesion: A cross-hatched tape peeling test was conducted according to JIS K5400.

Solvent resistance: A rubbing test in relation to a coating layer was conducted 10 times using methylethyl ketone. In the coating layer, in the case that scratches are not observed, it is evaluated as ◯, in the case that scratches are observed in surface, it is evaluated as Δ, and in the case of the absence of surface, it is evaluated as X.

It is to be noted that there are supplementarily shown below specific examples of the thermally-activating catalyst in detailed illustration of the invention (i).

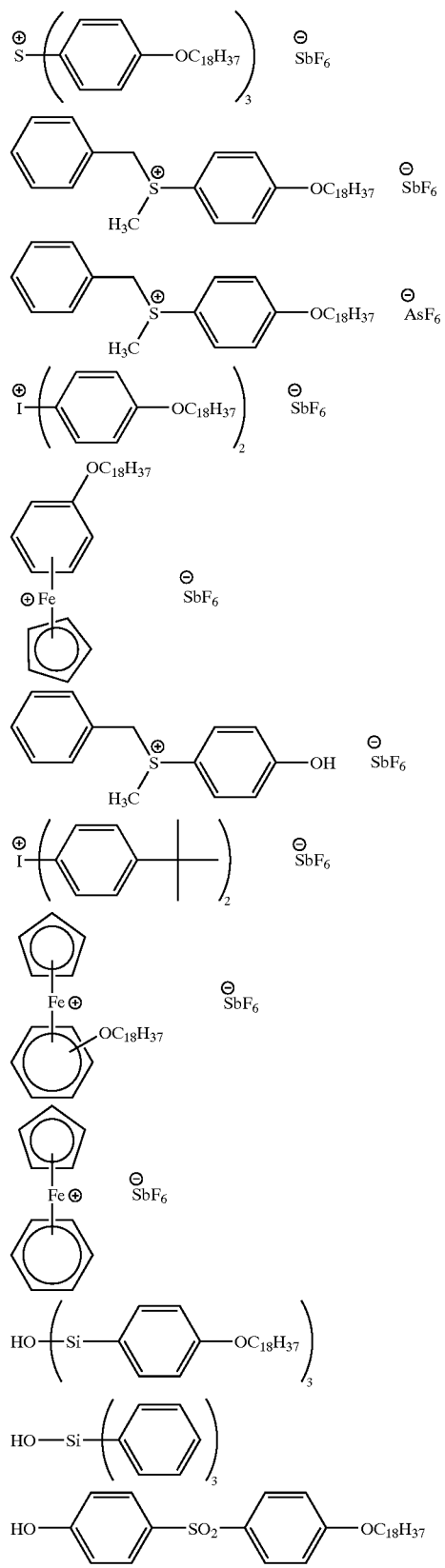

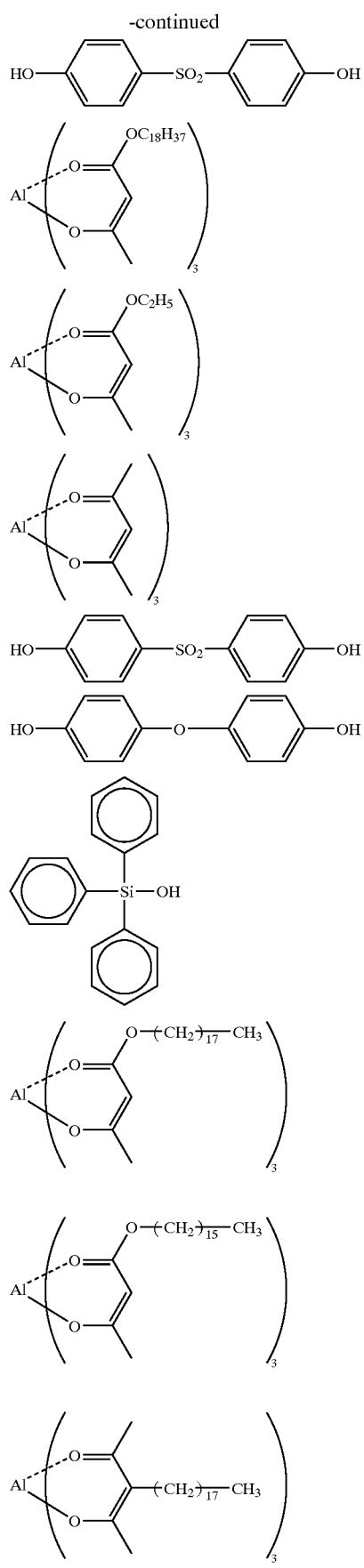
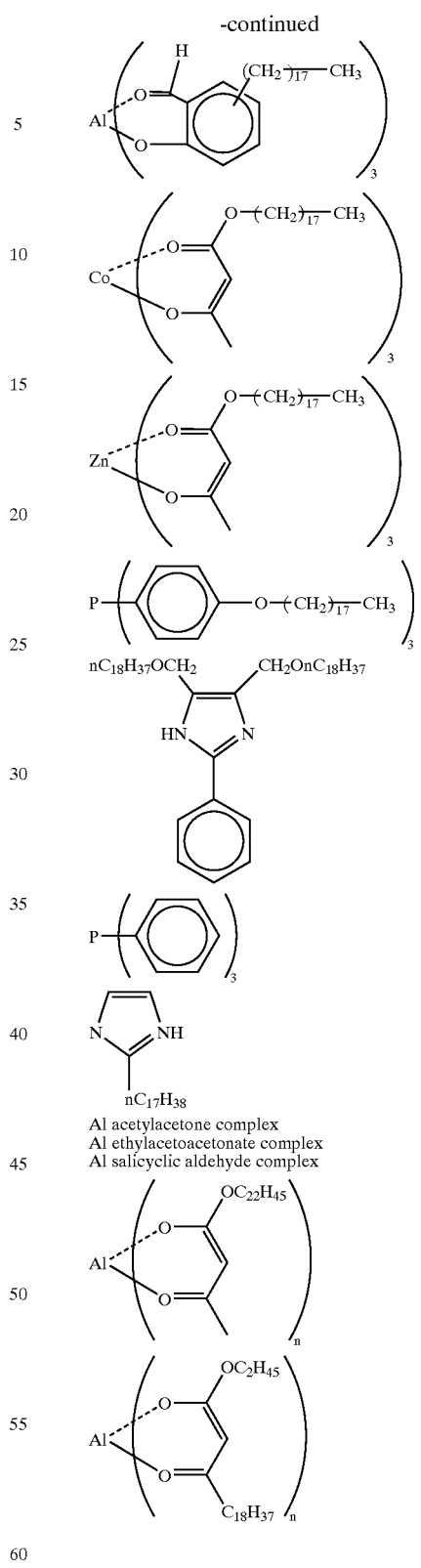

Al acetylacetone complex
Al ethylacetoacetonate complex
Al salicyclic aldehyde complex By the present invention (i), a curable resin composition can be cured by a quick reaction at a higher temperature than room temperature and, since the reaction does not proceed so much at a room temperature level, there can be obtained a curable resin composition for coating which is excellent in storage stability.

[ii]. Examples for the Invention (ii)

The following materials were employed as raw materials for the solvent-based coating resin composition.

Component 1-1: CEL-2021P (manufactured by Daicel Chemical Industries, Ltd.) having an epoxy equivalent of 152.

Component 1-2: Epolead GT-302 (manufactured by Daicel Chemical Industries, Ltd.) having an epoxy equivalent of 235.

Component 1-3: Epikote 806 (hereinafter, described as EP-806 manufactured by Yuka Shell, Ltd.) having an epoxy equivalent of 177.

Acrylic Resin (2-2) Having an Epoxy Group:

Synthesis Example ii-1 (Synthesis of Component 2-1): 650 parts of glycidylmethacrylate, 116 parts of hydroxyethylacrylate, 100 parts of N-butylacrylate, and 134 parts of N-butylmethacrylate were allowed to solution-polymerize by a common method in 1,000 parts of toluene to obtain an acrylic resin solution, followed by distilling off toluene. Acrylic resin obtained showed an epoxy equivalent of 218, a hydroxyl group value of 56 mgKOH/g, a number average molecular weight of 15,000, and oxirane oxygen concentration of 7.33%.

Synthesis Example ii-2 (Synthesis of Component 2-2): 850 parts of 3,4-epoxycyclohexylmethylacrylate, 65 parts of hydroxyethyl methacrylate, and 85 parts of N-butylacrylate were likewise allowed to solution-polymerize by a common method in toluene as in the Component 2-1 to obtain an acrylic resin solution, followed by distilling off toluene. Acrylic resin obtained showed an epoxy equivalent of 216, a hydroxyl group value of 28 mgKOH/g, a number average molecular weight of 5,000, and oxirane oxygen concentration of 7.41%.

Examples ii-1 to ii-9

There were mixed the components 1—1 to 1-3 as the above-described epoxy compound, and optionally EP-806, and the components 2-1 to 2-2 as the acrylic resin having an epoxy group in the ratio shown in Table ii-1. Solution of a resin composition obtained was divided into two parts and, A-1 to A-3 which are a thermally-activating catalyst were formulated into one part thereof, and B-1 to B-4 which are a catalyst for curing were formulated into another one part thereof in the weight ratio shown in the Table ii-1. Those were separately dissolved at 80° C., respectively. Respective solutions were agitated while cooling to room temperatures to crystallize and disperse a catalyst for curing, and two solutions were mixed and sufficiently agitated to prepare a solvent-based coating composition.

The catalysts for curing A-1 to A-3 and B-1 to B-4 which are a thermally-activating ionic polymerization catalyst to be employed in the invention (ii) are identical to the thermally-activating ionic polymerization catalyst illustrated in the above-described invention (i).

Further, in the Example ii-7 to ii-9, Yuban 20SE-60 (a butyletherized melamine resin (solid content of 60% by weight) manufactured by Mitsui Kagaku, Ltd.) was employed as a curing agent in the ratio shown in Table ii-1.

Results are shown in the Table ii-1. It is to be noted that in the Table ii-1, formulating amount of the respective components are based on the weight of solids.

Comparative Examples ii-1 to ii-2

The same procedures were followed as in the Example ii-1 except that a conventional onium salt-based catalyst for curing or the above-described Yuban 20SE-60 were added in the weight ratio shown in the Table ii-1 to obtain a solvent-based coating composition.

As the conventional onium salt-based catalyst for curing, UVI-6974 (manufactured by Union Carbide, Co.) was employed.

TABLE ii-1

|  | Examples | | | | | |
|---|---|---|---|---|---|---|
|  | ii-1 | ii-2 | ii-3 | ii-4 | ii-5 | ii-6 |
| CEL-2021P | 100 | 50 | 70 | 100 |  | 80 |
| Gt-302 |  | 50 |  |  | 30 |  |
| EP-806 |  |  | 30 |  | 70 | 20 |
| Synthesis Example ii-1 | 100 | 100 | 100 |  |  |  |
| Synthesis Example ii-2 |  |  |  | 100 | 100 | 100 |
| Catalyst for curing A-1 | 2 | 1 | 1 | 1 | 4 | 2 |
| Catalyst for curing B-1 |  |  | 4 |  |  |  |
| Catalyst for curing B-2 | 4 |  |  |  |  | 5 |
| Catalyst for curing B-3 |  | 8 |  | 6 |  |  |
| Catalyst for curing B-4 |  |  |  |  | 9 |  |

|  | Examples | | | Comparative Examples | |
|---|---|---|---|---|---|
|  | ii-7 | ii-8 | ii-9 | ii-1 | ii-2 |
| CEL-2021P | 100 | 70 | 100 | 100 | 100 |
| EP-806 |  | 30 |  |  |  |
| Synthesis Example ii-1 | 100 | 100 |  | 100 |  |
| Synthesis Example ii-2 |  |  | 100 |  | 100 |
| Catalyst for curing A-1 | 1 | 2 | 3 |  |  |
| Catalyst for curing A-2 |  |  |  |  |  |
| Catalyst for curing A-3 |  |  |  |  |  |
| Catalyst for curing B-3 |  | 5 | 7 |  |  |
| Catalyst for curing B-4 | 4 |  |  |  |  |
| Yuban 20SE-60 |  | 20 |  |  | 80 |
| UVI-6974 |  |  |  | 3 |  |

(Test for a Coating Layer)

The solvent-based coating resin compositions obtained in the Examples ii-1 to ii-9 and Comparative Examples ii-1 to ii-2 were coated on a cationic electro-deposition coated plate (manufactured by Nihon Test Panel, Ltd.) in which an intermediate coating is thermally cured to obtain a cured article. Coating was conducted by a barcoater #8, and curing was conducted at 140° C./15 minutes so that thickness becomes 25 μm in a cured layer.

TABLE ii-2

|  | Examples | | | | | |
|---|---|---|---|---|---|---|
|  | ii-1 | ii-2 | ii-3 | ii-4 | ii-5 | ii-6 |
| Outer appearance in finishing | ○ | ○ | ○ | ○ | ○ | ○ |
| Pencil hardness | H | HB | H | H | HB | H |
| Acid resistance | ○ | ○ | ○ | ○ | ○ | ○ |
| Pollen resistance | ○ | ○ | ○ | ○ | ○ | ○ |
| Removability of staining | ○ | ○ | ○ | ○ | ○ | ○ |

|  | Examples | | | Comparative Examples | |
|---|---|---|---|---|---|
|  | ii-7 | ii-8 | ii-9 | ii-1 | ii-2 |
| Outer appearance in finishing | ○ | ○ | ○ | ○ | Δ |
| Pencil hardness | H | H | H | H | 2B |
| Acid resistance | ○ | ○ | ○ | Δ | X |
| Pollen resistance | ○ | ○ | ○ | Δ | Δ |
| Removability of staining | ○ | ○ | ○ | X | X |

Evaluation rules are as follows.
(i) Outer appearance in finishing: It is a result by visual evaluation.
○: Gloss and smoothness are excellent. Δ: Gloss and smoothness are relatively poor. X: Gloss and smoothness are remarkably poor.

(ii) Hardness: It was conducted according to a pencil hardness test in JIS K-5400.

(iii) Acid resistance: 0.4 ml of 40% sulfuric acid aqueous solution was dropped on coating surface, and heated at 60° C. for 15 minutes by a hot air-circulating dryer and, washed by water. It is a result by visual evaluation.

○: Abnormal portion is not observed at all. Δ: Trace of spot remains. X: Blot, whitening, or blisters are remarkable.

(iv) Pollen resistance: There was prepared 0.5 weight % solution of cryptomeria pollen which was gathered in the outdoors using a deionized water. 0.4 ml of the solution was dropped on coating surface, and heated at 65° C. for 30 minutes by an oven and, washed by water. It is a result by visual evaluation of washed surface.

○: Staining is not observed at all. Δ: Blot and shrinkage are observed. X: Blot, shrinkage, and blisters are remarkably observed.

(v) Removability of staining: A test solution adjusted to pH of 3.0 was prepared by adding sulfuric acid to a mixture composed of 0.25 part of carbon black (12 kinds of dusts for a test, manufactured by Association of Japan Powder Industry Technology) and 99.75 parts of a deionized water, and it was sprayed over a test plate. It was placed for 17 hours under an atmosphere of temperature of 20° C. and humidity of 70%, and heated at 80° C. for 6 minutes by a hot air-circulating dryer. After having repeated 4 cycles, surface of the test plate was washed by water using a sponge. Conditions of the coated surface were visually evaluated.

○: Staining is not observed at all. Δ: Staining is slightly observed. X: Staining is remarkably observed.

<Supplement of Chemical Formulae in Relation to Catalysts>

It is to be noted that specific examples of the thermally-activating catalyst in the detailed description of the invention (ii) are identical to the specific examples of the thermally-activating catalyst in the detailed description of the invention (i), and illustration is omitted.

According to the present invention (ii), there can be obtained a resin composition for a coating having an excellent storage stability, and there can be obtained a coated article, particularly, an overcoating layer for a body in cars which is excellent in heat resistance, staining resistance, removability of staining, and scratch resistance, etc.

[iii]. Examples for the Invention (iii)

Synthesis Examples iii-1 to iii-6

A glass-made flask equipped with an agitator, a reflux condenser, a dropping funnel, and a temperature was charged with a fixed amount of CEL-2021, and temperature was elevated by heating to 105–110° C. while bubbling nitrogen, followed by dropping fixed monomers and initiators over 3 hours. After the completion of dropwise addition, aging was conducted for 3 hours to obtain a resin solution. Raw materials and feeding ratio are shown in Table iii-1.

TABLE iii-1

| | Synthesis Examples | | | | | |
|---|---|---|---|---|---|---|
| | iii-1 | iii-2 | iii-3 | iii-4 | iii-5 | iii-6 |
| CEL-2021 | 200 | 200 | 200 | 200 | 200 | 300 |
| MMA | 50 | 40 | 40 | 35 | | 70 |
| BA | 20 | 20 | 15 | 5 | 20 | 10 |
| HEMA | | 5 | | | | |

TABLE iii-1-continued

| | Synthesis Examples | | | | | |
|---|---|---|---|---|---|---|
| | iii-1 | iii-2 | iii-3 | iii-4 | iii-5 | iii-6 |
| HEA | | | 10 | | 10 | |
| PCL-FM1 | | | | 15 | 10 | |
| PCL-FM5 | | 5 | 5 | 5 | | 20 |
| CYM M-200 | 10 | | | | | |
| CYM M-100 | | 10 | 10 | 30 | 40 | |
| GMA | | 10 | 10 | | | |
| M-GMA | 10 | | | | 10 | |
| AIBN | 3 | 3 | 4 | 3 | 2 | 3.5 |
| Hydroxyl group value | 0.00 | 8.73 | 17.82 | 13.14 | 24.44 | 3.97 |
| Oxirane oxygen concentration (%) | 9.41 | 9.43 | 9.43 | 9.60 | 10.24 | 9.52 |

In the Table iii-1, unit of raw materials composition is based on the weight, and other units and abbreviations, etc. are the same as in the above-described Table i-1.

Examples iii-1 to iii-9

The resin compositions obtained in the Synthesis Examples iii-1 to iii-6 were divided into two parts in weight ratio, respectively, and respective one part was formulated with curing catalysts A-1 to A-3 and another respective part was formulated with curing catalysts B-1 to B-3 in the weight ratio shown in Table iii-2, and those were dissolved at 80° C., respectively. Catalyst for curing was crystallized and dispersed by agitating while cooling respective solutions at room temperatures, followed by mixing two parts and sufficiently agitating to prepare a curable resin composition.

It is to be noted that equivalent amount of acetylacetone to the catalyst for curing A-3 was added in the Example iii-9.

The catalysts for curing A-1 to A-3 and the catalysts for curing B-1 to B-4 which are the thermally-activating ionic polymerization catalyst to be employed in the invention (iii) are identical to the thermally-activating ionic polymerization catalyst described in the invention (i).

Comparative Examples iii-1 to iii-2

A conventional onium-based salt catalyst for curing was added to the resin composition obtained in the Synthesis Example iii-5 by the same method as in the Examples iii-1 in the weight ratio shown in Table iii-2 to obtain a curable resin composition.

TABLE iii-2

| | Examples | | | | | |
|---|---|---|---|---|---|---|
| | iii-1 | iii-2 | iii-3 | iii-4 | iii-5 | iii-6 |
| Synthesis Example iii-1 | 100 | | | | | |
| Synthesis Example iii-2 | | 100 | 100 | | | |
| Synthesis Example iii-3 | | | | 100 | | |
| Synthesis Example iii-4 | | | | | 100 | 100 |
| Catalyst for curing A-1 | 1 | 0.5 | 0.5 | 0.5 | 2 | 1 |
| Catalyst for curing B-1 | | | 3 | | | |
| Catalyst for curing B-2 | 2 | | | | | 5 |
| Catalyst for curing B-3 | | 4 | | 3 | | |
| Catalyst for curing B-4 | | | | | 5 | |
| CD-1012 | | 1 | | | | |

TABLE iii-2-continued

|  | Examples | | | Comparative Examples | |
| --- | --- | --- | --- | --- | --- |
|  | iii-7 | iii-8 | iii-9 | iii-1 | iii-2 |
| Synthesis Example iii-5 | 100 | 100 |  | 100 | 100 |
| Synthesis Example iii-6 |  |  | 100 |  |  |
| Catalyst for curing A-1 | 1 |  |  |  |  |
| Catalyst for curing A-2 |  | 2 |  |  |  |
| Catalyst for curing A-3 |  |  | 2 |  |  |
| Catalyst for curing B-3 |  | 5 | 5 |  |  |
| Catalyst for curing B-4 | 4 |  |  |  |  |
| UVI-6974 |  |  |  | 5 |  |
| SI-100L |  |  |  |  | 3 |

CD-1012: an iodonium salt-based cationic catalyst (manufactured by Sartomer, Co.)
UVI-6974: a sulphonium salt-based cationic catalyst (manufactured by UCC, Corp.)
SI-100L: a sulphonium salt-based cationic catalyst (manufactured by Sanshin Kagaku, Co.)

There was coated a solution of a resin composition for a multi-layered printed circuit board onto a glass-reinforced epoxy resin substrate in which a conductive circuit is formed in thickness of 20 μm by a screen printing method, followed by curing by the following conditions.

Curing conditions: In both of Examples and Comparative Examples, curing was conducted at 150° C./10 minutes.

Evaluation results are shown in Table iii-3.

TABLE iii-3

|  | Examples | | | | | |
| --- | --- | --- | --- | --- | --- | --- |
|  | iii-1 | iii-2 | iii-3 | iii-4 | iii-5 | iii-6 |
| Storage stability of composition | ○ | ○ | Δ | ○ | ○ | ○ |
| Volume resistivity |  |  |  |  |  |  |
| 25° C. | $0.9*10^{16}$ | $1.0*10^{16}$ | $0.9*10^{16}$ | $1.0*10^{16}$ | $1.1*10^{16}$ | $1.2*10^{16}$ |
| 100° C. | $0.9*10^{16}$ | $0.9*10^{16}$ | $0.9*10^{16}$ | $0.9*10^{16}$ | $1.0*10^{16}$ | $1.0*10^{16}$ |
| Solvent resistance | ○ | ○ | ○ | ○ | ○ | ○ |
| Adhesion | 100 | 100 | 100 | 100 | 100 | 100 |

|  | Examples | | | Comparative Examples | |
| --- | --- | --- | --- | --- | --- |
|  | iii-7 | iii-8 | iii-9 | iii-1 | iii-2 |
| Storage stability of composition | ○ | Δ | ○ | X | X |
| Volume resistivity |  |  |  |  |  |
| 25° C. | $1.1*10^{16}$ | $0.9*10^{16}$ | $1.0*10^{16}$ | $0.9*10^{16}$ | $0.8*10^{16}$ |
| 100° C. | $1.0*10^{16}$ | $0.9*10^{16}$ | $0.9*10^{16}$ | $1.0*10^{16}$ | $0.9*10^{16}$ |
| Solvent resistance | ○ | ○ | ○ | Δ | ○ |
| Adhesion | 80 | 100 | 100 | 100 | 100 |

Evaluation Method

Storage stability: Composition was stored at 40° C. for 14 days and, in comparison with an initial value, in the case of not more than 2 times, it is ○, in the case of more than 2 times, it is Δ, and in the case of gelation, it is X.

Volume resistivity (Ωcm): Volume resistivity was measured by applying an applied voltage of 500V.

Adhesion: A cross-hatched tape peeling test was conducted according to JIS K5400.

Solvent resistance: A rubbing test in relation to a coating layer was conducted 10 times using methylethyl ketone. In the coating layer, in the case that scratches are not observed, it is evaluated as ○, in the case that scratches are observed in surface, it is evaluated as Δ, and in the case of the absence of surface, it is evaluated as X.

It is to be noted that specific examples of the thermally-activating catalyst in the detailed description of the invention (iii) are identical to the specific examples described as a supplement of the thermally-activating ionic polymerization catalyst in the invention (i), and illustration is omitted.

By the present invention (iii), the curable resin composition for a multi-layered printed circuit board can be quickly cured at a higher temperature than room temperatures and, since a reaction does not proceed so much at a room temperature level, there can be obtained a curable resin composition for coating which is excellent in storage stability.

[iv]. Examples for the Invention (iv)

Preparation Example iv-1

250 g of Epikote 827 (a bisphenol A type epoxy resin manufactured by Yuka Shell Epoxy, Ltd.) was dissolved in 750.0 g of γ-butyrolactone at room temperatures to obtain an epoxy resin solution having concentration of 25% by weight.

Preparation Example iv-2

25 g of CEL 2021P (3,4-epoxycyclohexylmethyl-3',4'-epoxycyclohexanecarboxylate which is a multifunctional epoxy resin having an epoxy equivalent of 128–140 and viscosity of 200–350 cP/25° C., and which is manufactured by Daicel Chemical Industries, Ltd.) and 75 g of propyleneglycol methyletheracetate were added to 100 g of the epoxy resin solution obtained in the Preparation Example iv-1, and heated at 80° C. for 2 hours while agitating, followed by cooling to obtain an epoxy resin solution having concentration of 25% by weight.

Preparation Example iv-3

A flask equipped with an agitator, a reflux condenser, dropping funnel, and a thermometer was charged with 750 g of CEL-2021 (3,4-epoxycyclohexylmethyl-3',4'-epoxycyclohexane carboxylate having an epoxy equivalent of 128–140 and viscosity of 200–400 cP/25° C.). After having elevated a temperature by heating to 105–110° C. while blowing air, there were added dropwise 125 g of methylmethacrylate, 27.8 g of butane acid, 13.9 g of PCL-FM3 (manufactured by Daicel Chemical Industries, Ltd.), 83.3 g of CYM-A200 (manufactured by Daicel Chemical Industries, Ltd.), 8.32 g of azobisisobutyronitrile (AIBN), and 0.832 g of paramethoxyphenol (MEHQ) over 3 hours. After the completion of dropwise addition, a reaction was continued for 1 hour and terminated.

Examples iv-1 to iv-4

The epoxy resin solutions obtained in the Synthesis Examples iv-1, iv-2 and iv-3 were divided into two parts in weight ratio, respectively, and respective one part was formulated with curing catalyst A and another respective part was formulated with curing catalyst B in a weight ratio shown in Table iv-1, and those were dissolved at 80° C., respectively. Catalyst for curing was crystallized and dispersed by agitating while cooling respective solutions at room temperatures, followed by mixing two parts and sufficiently agitating to prepare a solution of a curable resin composition.

(4-3) Component (Thermally-activating Ionic Polymerization Catalyst):

The catalyst for curing A is identical to the catalyst for curing (A-1) in the present invention (i), and the catalyst for curing B is identical to the catalyst for curing (B-3) in the present invention (i).

Comparative Examples iv-1 to iv-2

A solution of a curable resin composition was prepared using a conventional catalyst for curing in formulation shown in Table iv-1 by the same method as in the Examples iv-1.

Catalyst for curing:
CD-1012: an iodonium salt-based cationic catalyst (manufactured by Sartomer, Co.)
SI-100L: a sulphonium salt-based cationic catalyst (manufactured by Sanshin Kagaku, Co.)

TABLE iv-1

|  | Examples | | | | Comparative Examples | |
| --- | --- | --- | --- | --- | --- | --- |
|  | iv-1 | iv-2 | iv-3 | iv-4 | iv-1 | iv-2 |
| Preparation Example iv-1 | 100 | | | | | |
| Preparation Example iv-2 | | 100 | 100 | | 100 | 100 |
| Preparation Example iv-3 | | | | 100 | | |
| Catalyst for curing A | 0.5 | 1 | 0.5 | 0.5 | | |
| Catalyst for curing B | 3 | 3 | 3 | 3 | | |
| CD-1012 | | | | | 5 | |
| SI-100L | | | | | | 2 |

(Evaluation Results)

Storage stability in the solution of a curable resin composition was measured by the following method. Results are shown in Table iv-2.

Storage stability: Composition solution was stored at 40° C. for 14 days and, in comparison with an initial value, in the case of not more than 2 times, it is ○, in the case of more than 2 times, it is Δ, and in the case of gelation, it is X.

[Heating Treatment]

The solution of a curable resin composition obtained in the Examples iv-1 to iv-4 and Comparative Examples iv-1 to iv-2 was coated on a glass-made substrate using a spin-coater, so that thickness becomes 1 μm after curing.

The glass-made substrate having a coating layer was semi-cured at 80° C. for 1 hour in a hot air-circulating oven, and thermally-treated at 150° C. for 1 hour or at 250° C. for 1 hour to cure the coating layer.

In relation to cured coating layer obtained, the following tests were conducted.

Light transmittance: Absorption spectra at 400–800 nm in the coating layer was compared using the glass substrate alone as a reference.

Volume resistivity (Ωcm): Volume resistivity was measured by applying an applied voltage of 500V. Volume resistivity is shown by a ratio of the volume resistivity in cured coating layer after having cured at 150° C. for 1 hour or 250° C. for 1 hour versus the volume resistivity in the coating layer after having semi-cured.

Results are shown in Table iv-2.

TABLE iv-2

|  | Examples | | | | Comparative Examples | |
| --- | --- | --- | --- | --- | --- | --- |
|  | iv-1 | iv-2 | iv-3 | iv-4 | iv-1 | iv-2 |
| Storage stability of composition | ○ | ○ | ○ | ○ | X | X |
| Light transmittance immediately after curing | ≧95% | ≧95% | ≧95% | ≧95% | ≧95% | ≧95% |
| Light transmittance after treatment at 250° C. | ≧95% | ≧95% | ≧95% | ≧95% | ≦50% | 80% |
| Volume resistivity after treatment at 250° C. versus immediately after curing | ≧90% | ≧90% | ≧90% | ≧90% | 70% | 80% |

It is to be noted that specific examples of the thermally-activating catalyst in the detailed description of the invention (iv) are identical to the specific examples described as a supplement of the thermally-activating ionic polymerization catalyst in the invention (i), and illustration is omitted.

By the present invention (iv), the curable resin composition can be quickly cured at a higher temperature than room temperature and, since a reaction does not proceed so much at a room temperature level, there can be obtained a curable resin composition which is excellent in storage stability. The cured coating layer shows a small decline of the volume resistivity even at a high temperature region and shows an excellent electrical insulation property, and it is particularly excellent as a protecting layer for a liquid crystal displaying material.

[v]. Examples for the Invention (v)

The following substances were employed as a raw material for a curable resin composition.

Epoxy Compound:
CEL-2021P: 3,4-epoxycyclohexylmethyl-3',4'-epoxycyclohexane carboxylate having an epoxy equivalent of 152 (manufactured by Daicel Chemical Industries, Ltd.)
CEL-2021: 3,4-epoxycyclohexylmethyl-3',4'-epoxycyclohexane carboxylate having an epoxy equivalent of 128–140 (manufactured by Daicel Chemical Industries, Ltd.)
CEL-2021A: 3,4-epoxycyclohexylmethyl-3',4'-epoxycyclohexane carboxylate having an epoxy equivalent of 130–145 and a viscosity of 200–450 cP/25° C. (manufactured by Daicel Chemical Industries, Ltd.)
CEL-3000: 1,2,8,9-diepoxylimonene having an epoxy equivalent of not more than 93.5 and a viscosity of 5–20 cP/25° C. (manufactured by Daicel Chemical Industries, Ltd.)

CEL-2081: an epoxy equivalent of 200–215 and a viscosity of 340 cP/25° C. (manufactured by Daicel Chemical Industries, Ltd.)

Epikote 806: (a bisphenol F type epoxy compound having an epoxy equivalent of 177, hereinafter, referred to as EP-806) (manufactured by Yuka Shell, Ltd.)

Polyol:

PCL-308: a polycaprolactone polyol having OH value 195 mgKOH/g (manufactured by Daicel Chemical Industries, Ltd.)

PB-3600: a liquid epoxidized polybutadiene having an epoxy equivalent of 200 (manufactured by Daicel Chemical Industries, Ltd.)

Oxetane Compound:
 OXE-1
 OXE-2
 OXE-3

It is to be noted that chemical formulae of the above are shown hereinafter. Catalyst for curing: The catalysts for curing A-1 to A-2 and B-1 to B-4 are the same as in the catalyst for curing employed in the present invention (i), and illustration is omitted.

Examples v-1 to v-7

As an epoxy compound, the above-described cycloaliphatic epoxy compounds were employed and, optionally, EP-806 was simultaneously employed and, as an oxetane compound, the above-described compounds were employed and, optionally, the above-described polyols were employed, and those were uniformly mixed in the ratio shown in Table v-1.

The resin compositions obtained were divided into two parts in weight ratio, respectively, and respective one part was formulated with curing catalysts A-1 to A-2 and another respective part was formulated with curing catalysts B-1 to B-4 in ratio shown in Table v-1, and those were dissolved at 80° C., respectively.

Catalyst for during was crystallized and dispersed by agitating while cooling respective solutions at room temperatures, followed by mixing two parts and sufficiently agitating to prepare a solvent-based coating resin composition.

Comparative Example v-1

A solvent-based coating resin composition was obtained except that a conventional onium salt-based catalyst for curing was added in the weight ratio shown in Table v-1 by the same method as in the Examples v-1.

As the conventional onium salt-based catalyst for curing, UVI-6974 (manufactured by Union Carbide, Co.) was employed.

TABLE v-1

|  | Examples | | | | | | | Comparative Examples |
|---|---|---|---|---|---|---|---|---|
|  | v-1 | v-2 | v-3 | v-4 | v-5 | v-6 | v-7 | v-1 |
| CEL-2021P | 100 | 70 |  |  | 85 | 75 |  |  |
| Cel-2021A |  |  | 80 | 70 |  |  | 100 | 100 |
| CEL-3000 |  | 20 |  |  |  |  |  |  |
| CEL-2081 |  |  |  | 25 |  |  | 20 |  |
| PCL-308 |  |  |  |  | 15 |  |  |  |
| PB-3600 |  |  |  |  |  | 25 |  | 15 |
| EP-806 | 15 |  |  |  |  |  |  |  |
| OXE-1 | 20 |  |  |  | 10 | 20 |  |  |
| OXE-2 |  | 18 |  | 25 |  |  |  | 20 |
| OXE-3 |  |  | 15 |  |  |  | 15 |  |
| Catalyst for curing |  |  |  |  |  |  |  |  |
| A-1 | 1 | 0.5 |  | 1.5 | 1 |  | 2 |  |
| A-2 |  |  | 0.5 |  |  | 1 |  |  |
| B-1 | 4 |  |  |  | 3 |  |  |  |
| B-2 |  | 3 |  |  |  | 3 |  |  |
| B-3 |  |  | 3 |  |  |  | 5 |  |
| B-4 |  |  |  | 5 |  |  |  |  |
| UVI-6974 |  |  |  |  |  |  |  | 3 |

(Test for a Coating Layer)

The curable resin compositions obtained in the Examples v-1 to v-7 and Comparative Example v-1 were coated on an aluminum plate (Examples v-1 to v-4 and Comparative Example v-1) or a PET film (Examples v-6 to v-7) using a barcoater #8 so that thickness becomes approximately 20 μm, and curing was conducted at conditions of 110° C./20 minutes. Evaluation results are shown in Table v-2.

TABLE v-2

|  | Examples | | | | | | | Comparative Examples |
|---|---|---|---|---|---|---|---|---|
|  | v-1 | v-2 | v-3 | v-4 | v-5 | v-6 | v-7 | v-1 |
| Pencil hardness | 2H | H | 2H | H | HB | 2H | 2H | B |
| Solvent resistance | ○ | ○ | ○ | ○ | ○ | ○ | ○ | Δ |
| Adhesion | 100 | 100 | 100 | 80 | 100 | 100 | 100 | 80 |
| Storage stability | ○ | ○ | ○ | ○ | ○ | ○ | ○ | X |

Evaluation Method

Storage stability: Composition was stored at 40° C. for 14 days and, in comparison with an initial value, in the case of not more than 2 times, it is ○, in the case of more than 2 times, it is Δ, and in the case of gelation, it is X.

Pencil hardness: Pencil hardness was measured according to JIS K5400.

Adhesion: A cross-hatched tape peeling test was conducted according to JIS K5400.

Solvent resistance: A rubbing test in relation to a coating layer was conducted 10 times using methylethyl ketone. In the coating layer, in the case that scratches are not observed, it is evaluated as ○, in the case that scratches are observed in surface, it is evaluated as Δ, and in the case of the absence of surface, it is evaluated as X.

Synthesis Examples v-1 to v-2 and v-4

A flask equipped with an agitator, a reflux condenser, a dropping funnel, and a thermometer was charged with a fixed amount of CEL-2021 as shown in Table 5-3, and temperature was elevated by heating to 105–110° C. while bubbling air, followed by dropping fixed monomers and initiators as shown in Table v-3 over 3 hours. After the completion of dropwise addition, reaction was continued for 1 hour and terminated to obtain an acrylic resin containing an epoxy compound.

Synthesis Example v-3

A flask equipped with an agitator, a reflux condenser, a dropping funnel, and a thermometer was charged with a fixed amount 400 parts by weight of toluene, and temperature was elevated by heating to 105–110° C. while bubbling air, followed by dropping fixed monomers and initiators shown in Table v-3 over 3 hours. After the completion of dropwise addition, reaction was continued for 1 hour and terminated. After the completion of the reaction, toluene was removed at 80° C./20 torr, followed by diluting with a fixed amount of CEL-2021 as shown in Table v-3 to obtain an acrylic resin containing an epoxy compound.

TABLE v-3

| | Synthesis Examples | | | |
|---|---|---|---|---|
| | v-1 | v-2 | v-3 | v-4 |
| CEL-2021 | 233 | 233 | 233 | 180 |
| MMA | 55 | 65 | 67 | 45 |
| n-BMA | 15 | 10 | 2 | |
| BA | | | | 10 |
| HEMA | 20 | | | |
| HEA | | 15 | | |
| PCL-FM1 | | | 3 | |
| PCL-FM3 | | | | 5 |
| CYM M-100 | 10 | | | 30 |
| GMA | | 10 | 30 | |
| AIBN | 3 | 3 | 4 | 3 |
| MEHQ | 0.3 | 0.3 | 0.3 | 0.3 |
| Hydroxyl group value | 23.6 | 18.3 | 1.7 | 2.2 |
| Oxirane oxygen concentration | 8.0 | 8.5 | 9.1 | 9.6 |

Hydroxyl group value: KOH mg/g
Oxirane oxygen concentration: % by weight
AIMN: azobisisobutyronitrile
MEHQ: paramethoxyphenol In the Table v-3, unit in raw materials is part by weight, and other units and abbreviations are the same as in the above-described Table i-1.

Examples v-8 to v-15

The resin compositions obtained in the Synthesis Examples v-1 to v-4 were divided into two parts in weight ratio, respectively, and respective one part was formulated with curing catalysts A-1 to A-3 and another respective part was formulated with curing catalysts B-1 to B-4 in weight ratio as shown in Table 5-3, and those were dissolved at 80° C., respectively. Catalyst for curing was crystallized and dispersed by agitating while cooling respective solutions at room temperatures, followed by mixing two parts and sufficiently agitating to prepare a curable resin composition.

Comparative Examples v-2 to v-3

A conventional onium salt-based catalyst for curing was added to the resin composition obtained in the Synthesis Example v-1 or v-4 by the same method as in the Example v-1 in weight ratio as shown in Table v-3 to prepare a curable resin composition.

As the conventional onium salt-based catalyst, the following substances were employed.

CD-1012: an iodonium salt-based cationic catalyst (manufactured by Sartomer, Co.)

UVI-6974: a sulphonium salt-based cationic catalyst (manufactured by UCC, Co.)

TABLE v-4

Formulation Table

| | Examples | | | | | | | |
|---|---|---|---|---|---|---|---|---|
| | v-8 | v-9 | v-10 | v-11 | v-12 | v-13 | v-14 | v-15 |
| Synthesis Example v-1 | 100 | 100 | | | | | | |
| Synthesis Example v-2 | | | 100 | 100 | | | | |
| Synthesis Example v-3 | | | | | 100 | 100 | | |
| Synthesis Example v-4 | | | | | | | 100 | 100 |
| EP-806 | | | | | | | | 20 |
| OXE-2 | 15 | 20 | 30 | | 25 | 10 | 40 | 40 |
| OXE-3 | | | | 35 | | | | |
| Catalyst for curing A-1 | 1 | 0.8 | 1.5 | 3 | | | 3 | 2 |
| Catalyst for curing A-2 | | | | | 2 | 1 | | |
| Catalyst for curing B-1 | 3.5 | | | | | | | |
| Catalyst for curing B-2 | | 4 | | | | 4 | | 5 |
| Catalyst for curing B-3 | | | 5 | | 4 | | 6 | |
| Catalyst for curing B-4 | | | | 5 | | | | |
| UVI-6974 | | | | | | | | |
| CD-10 | | | | | | | | |

| | Comparative Examples | |
|---|---|---|
| | v-2 | v-3 |
| Synthesis Example v-1 | 100 | |
| Synthesis Example v-2 | | |
| Synthesis Example v-3 | | |
| Synthesis Example v-4 | | 100 |
| EP-806 | | |
| OXE-1 | | |
| OXE-2 | | |
| OXE-3 | | |
| Catalyst for curing A-1 | | |
| Catalyst for curing A-2 | | |
| Catalyst for curing B-1 | | |
| Catalyst for curing B-2 | | |
| Catalyst for curing B-3 | | |
| Catalyst for curing B-4 | | |
| UVI-6974 | 4 | |
| CD-10 | | 5 |

(Test for a Coating Layer)

The curable resin compositions obtained in the Examples v-8 to v-15 and Comparative Examples v-2 to v-3 were coated on an aluminum plate (Examples v-10 to v-15 and Comparative Examples v-2 to v-3) or a PET film (Examples v-8 to v-9) using a barcoater #8 so that thickness becomes approximately 20 $\mu$m, and curing was conducted at conditions of 100° C. ×15 minutes+150° C.×10 minutes. Evaluation results are shown in Table v-5 (Evaluation methods are based on the above-described methods).

TABLE v-5

Evaluation results

| | Examples | | | | | | | |
|---|---|---|---|---|---|---|---|---|
| | v-8 | v-9 | v-10 | v-11 | v-12 | v-13 | v-14 | v-15 |
| Pencil hardness | 2H | 2H | H | 2H | H | H | H | H |
| Solvent resistance | ○ | ○ | ○ | ○ | ○ | ○ | ○ | ○ |
| Storage stability | ○ | ○ | ○ | ○ | ○ | ○ | ○ | ○ |
| Adhesion | 100 | 100 | 100 | 80 | 100 | 100 | 100 | 100 |

| | Comparative Examples | |
|---|---|---|
| | v-2 | v-3 |
| Pencil hardness | F | F |
| Solvent resistance | ○ | ○ |
| Storage stability | X | X |
| Adhesion | 100 | 100 |

<Supplement of Chemical Formulae in Relation to Catalysts>

It is to be noted that specific examples of the thermally-activating catalyst in the detailed description of the invention (v) are identical to the specific examples of the thermally-activating catalyst in the detailed description of the invention (i), and illustration is omitted.

<Supplement of Chemical Formulae in Relation to an Oxetane Compound>

Hereinafter, as an oxetane compound having 1–6 pieces of oxetane rings in the molecule, there are exemplified compounds shown by formula [1] to formula [24].

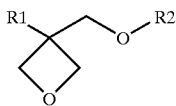
[1]

In the formula [1], R1 is a hydrogen atom, an alkyl group having a carbon number of 1–6 such as methyl group, ethyl group, propyl group, or butyl group, a fluoroalkyl group having a carbon number of 1–6, allyl group, aryl group, furyl group, or thienyl group.

R2 is an alkyl group having a carbon number of 1–6 such as methyl group, ethyl group, propyl group, or butyl group, an alkenyl group having a carbon number of 2–6 such as 1-propenyl group, 2-propenyl group, 2-methyl-1-propenyl group, 2-methyl-2-propenyl group, 1-butenyl group, 2-butenyl group, or 3-butenyl group, a group having an aromatic ring such as phenyl group, benzyl group, fluorobenzyl group, methoxybenzyl group, or phenoxyethyl group, an alkylcarbonyl group having a carbon number of 2–6 such as ethylcarbonyl group, propylcarbonyl group, or butylcarbonyl group, an alkoxycarbonyl group having a carbon number of 2–6 such as ethoxycarbonyl group, propoxycarbonyl group, or buthoxycarbonyl group, an N-alkylcarbamoyl group having a carbon number of 2–6 such as ethylcarbamoyl group, propylcarbamoyl group, butylcarbamoyl group, and pentylcarbamoyl group, etc.

Subsequently, as an oxetane compound having 2 pieces of oxetane rings in the molecule, there are exemplified compounds shown by formula [2] described below.

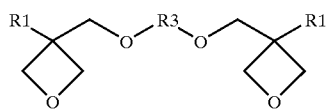
[2]

In the formula [2], R1 is the same groups as in the general formula [1].

R3 is a linear alkylene group or branched alkylene group such as ethylene group, propylene group, and butylene group, a linear or branched poly(alkyleneoxy) group such as poly(ethyleneoxy) group and poly(propyleneoxy) group, a linear or branched unsaturated hydrocarbon group such as propenylene group, methylpropenylene group, or a butenylene group, carbonyl group, an alkylene group having carbonyl group, or an alkylene group having carboxyl group, etc.

Further, R3 also includes a polyfunctional group selected from groups shown by formulae [3], [4], and [5] described below.

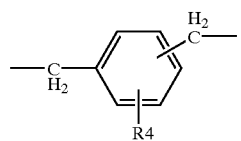
[3]

In the formula [3], R4 is a hydrogen atom, an alkyl group having a carbon number of 1–4 such as methyl group, ethyl group, propyl group, or butyl group, an alkoxy group having a carbon number of 1–4 such as methoxy group, ethoxy group, propoxy group, or buthoxy group, a halogen atom such as chlorine or bromine atom, nitro group, cyano group, mercapto group, a lower alkylcarboxyl group, carboxyl group, or carbamoyl group.

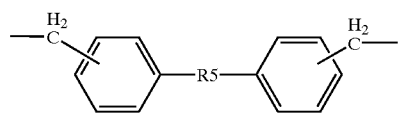
[4]

In the formula [4], R5 is an oxygen atom, sulphur atom, methylene group, NH, SO, $SO_2$, $C(CF_3)_2$, or $C(CH_3)_2$.

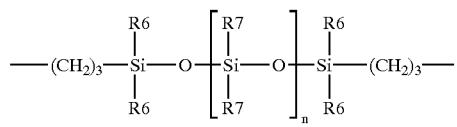
[5]

In the formula [5], R6 is an alkyl group having a carbon number of 1–4 such as methyl group, ethyl group, propyl group, or butyl group, or an aryl group. "n" is an integer of 0–2000. R7 is an alkyl group having a carbon number of 1–4 such as methyl group, ethyl group, propyl group, or butyl group, or an aryl group. R7 also includes a group selected from groups shown by formula [6].

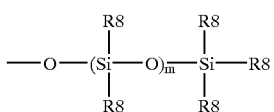 [6]

In the formula [6], R8 is an alkyl group having a carbon number of 1–4 such as methyl group, ethyl group, propyl group, or butyl group, or an aryl group. "m" is an integer of 0–100.

As specific examples of the compound having 2 pieces of oxetane rings, there are exemplified compounds shown by formulae [7] and [8] described below.

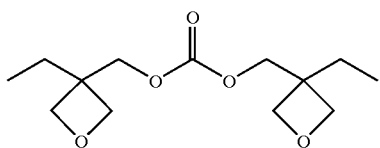 [7]

The compound shown by the formula [7] described above is a compound in which R1 is ethyl group and R3 is carboxyl group in the formula [2].

The compound shown by the formula [8] described above is a compound in which R1 is formula [2] and R3 is the formula [5], R6, and R7 are methyl group, and "n" is 1.

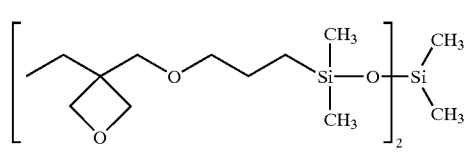 [8]

In the compound having 2 pieces of oxetane rings, as a preferred example other than the above-described compounds, there is a compound shown by formula [9] described below.

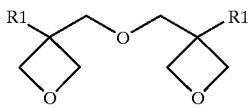 [9]

As oxetane compound having 3–4 pieces of oxetane rings, there is a compound shown by formula [10] described below.

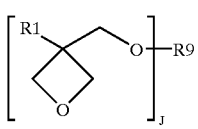 [10]

In the above formula [10], R1 is the same group as in the above-described formula [1]. R9 is, for example, a branched alkylene group having a carbon number of 1–12 such as groups shown by formulae [11]–[13], a branched poly(alkylene)group such as groups shown by formula [14] described below or a branched polysiloxane group such as groups shown by formula [15] described below. "j" is 3 or 4.

 [11]

In the Formula [11], R10 is a lower alkyl group such as methyl group, ethyl group, or propyl group.

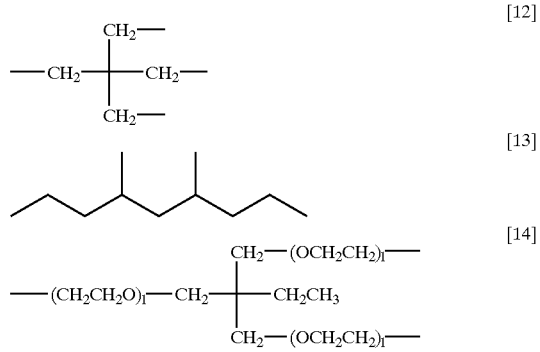

[12]

[13]

[14]

In the formula [14], "1" is an integer of 1–10.

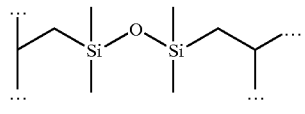 [15]

As specific examples of the oxetane compound having 3–4 pieces of oxetane rings, there are exemplified compounds shown by formulae [16] and [17] described below.

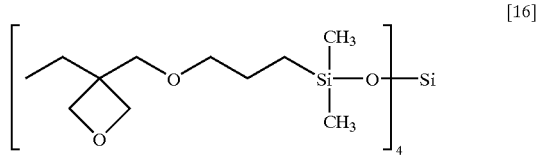 [16]

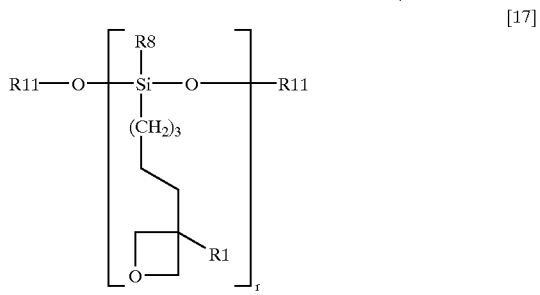 [17]

In the formula [17], R8 is the same group as in the formula [6]. R1 is an alkyl group having a carbon number of 1–4 such as methyl group, ethyl group, propyl group, or butyl group, or a trialkylsilyl group, and "r" is 1–4.

As a preferred specific examples of the oxetane compounds to be employed in the present invention, there are compounds [18]–[21] described below.

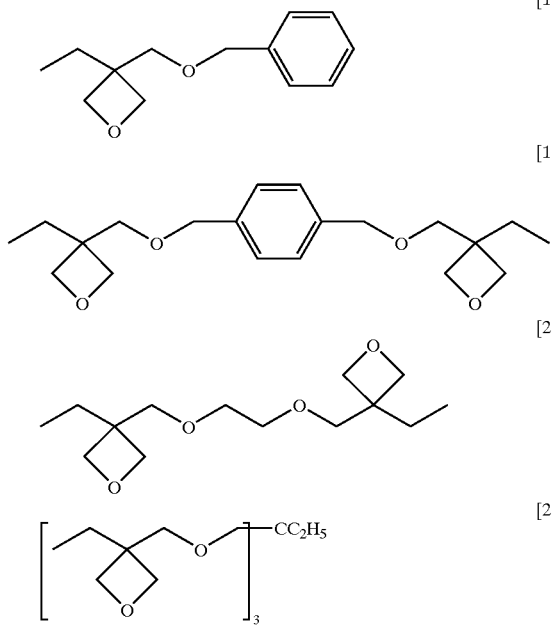

In addition to those, there are also enumerated compounds having a high molecular weight of 1,000–5,000 or so and 1–4 pieces of oxetane rings. As examples of the compounds, the following compounds are enumerated.

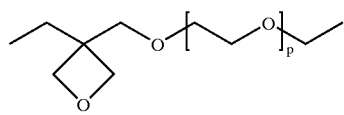

In the above formula [22], "p" is 20–200.

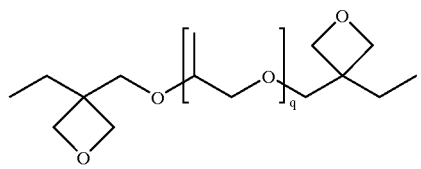

In the above formula [23], "q" is 15–100.

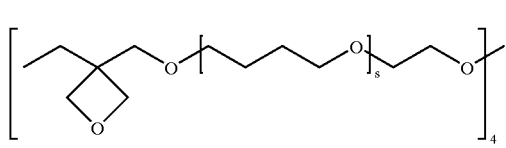

In the above formula [24], "s" is 20–200.

It is to be noted that chemical formulae of the oxetane compounds in the Examples are shown below.

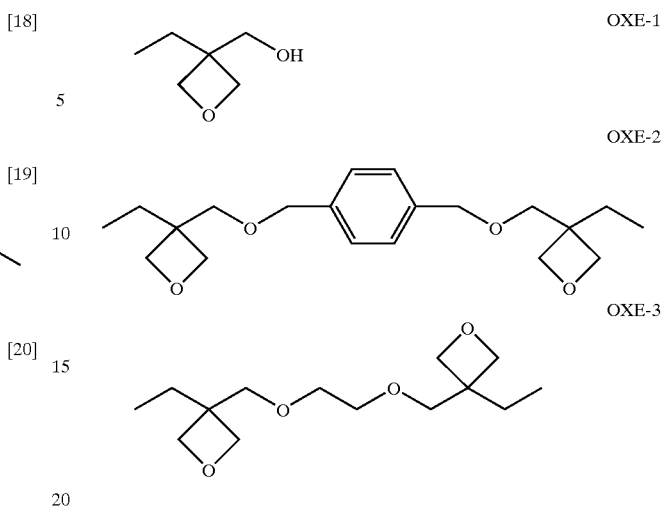

By the present invention (v), a curable resin composition can be quickly cured at a higher temperature than room temperatures and, since a reaction does not proceed so much at a room temperature level, there can be obtained a curable resin composition for coating which is excellent in storage stability, and there can be obtained a coating layer which is excellent in hardness and adhesion even in curing conditions of low temperatures and short time of period.

Possibility of Utilization in Industry

By the present invention (i), there can be obtained a curable resin composition for a coating which is excellent in storage stability.

By the present invention (ii), there can be obtained a coated article, particularly, an overcoating layer for a body in cars which is excellent in heat resistance, staining resistance, removability of staining, and scratch resistance, etc.

By the present invention (iii), there can be obtained an insulating resin composition for a laminated printed circuit board which is excellent in storage stability, and which can be quickly cured at a higher temperature than room temperatures.

By the present invention (iv), there can be obtained a cured coating layer which shows a small decline of volume resistivity even at a high temperature region and it shows an excellent electrical insulation property, and which is particularly excellent as a protecting layer for a liquid crystal displaying material.

By the present invention (v), there can be obtained a curable resin composition which is excellent in storage stability, and which can provide a coating layer which is excellent in hardness and adhesion even in curing conditions of low temperatures and a short time of period.

What is claimed is:

1. A solvent-based coating composition which comprises (ii-1) an epoxy compound having at least two cycloaliphatic epoxy groups in the molecule and a number average molecular weight of not more than 2,000, (ii-2) an acrylic resin containing an epoxy group and having a number average molecular weight of 2,000–50,000, a hydroxyl group value of 10–250 mgKOH/g, and an epoxy equivalent of not more than 300, and (3) a thermally-activating ionic polymerization catalyst which can dissolve by heating and crystallize by cooling; wherein said epoxy compound (ii-1) is mixed with an additional epoxy selected from the group consisting of bisphenol-type epoxy compound, a novolak-type epoxy compound, and a brominated-type epoxy compound thereof.

2. A solvent-based coating composition according to claim 1, wherein oxirane oxygen concentration is 5–11% by weight in a resin composition composed of said epoxy compound (ii-1) and said acrylic resin (ii-2) containing an epoxy group.

3. A solvent-based coating composition according to claim 2, wherein said thermally-activating ionic polymerization catalyst (3) can be dissolved by heating and crystallized by cooling; said polymerization catalyst having a substituted hydrocarbon group having a carbon number of more than 10, or a nonsubstituted hydrocarbon group having a carbon number of more than 10, or a cyclic organic structure having a more than 10 carbon number hydrocarbon group, wherein said thermally-activating ionic polymerization catalyst (3) contains at least one selected from the group consisting of a cationic polymerization catalyst (3') and a metal compound (3").

4. A solvent-based coating composition according to claim 3, wherein said metal compound (3") is at least one kind selected from the group consisting of a compound represented by general formula (II-1), a compound represented by general formula (II-2), and a compound represented by general formula (II-3):

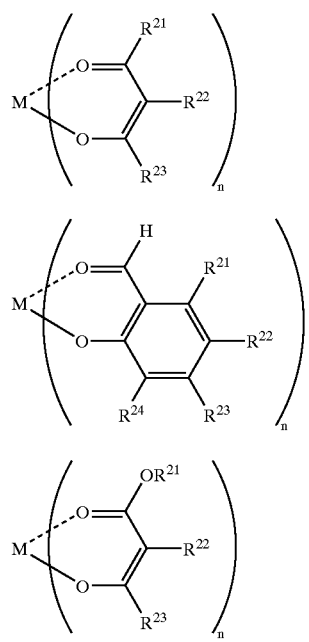

(II-1)

(II-2)

(II-3)

(in the general formula, $R^{21}$, $R^{22}$, $R^{23}$, and $R^{24}$ may be identical to or different from each other, and which are a hydrogen atom, a substituted or nonsubstituted hydrocarbon group of a carbon number of 1–30, respectively, provided that there are contained at least one of $R^{21}$, $R^{22}$, $R^{23}$, and $R^{24}$ having a carbon number of not less than 10 in one ligand; M is Al; "n" is 3), and at least one compound selected from the group consisting of organosilane having an aryl group bonded directly to a silicon atom and having a hydroxyl group or a hydrolyzable group bonded directly to a silicon atom, a phenol compound, an organosilicon compound compound having a hydrolyzable group bonded directly to a silicon atom, and a silicon compound capable of generating silanol upon irradiation of light.

5. A solvent-based coating composition according to claim 4, wherein said compound represented by the formulas (II-1), (II-2) and (II-3) is selected from the group consisting of tris(octadecylacetoacetate) aluminum, tris(hexadecylacetoacetate) aluminum, tris(tetradecylacetoacetate) aluminum, tris(dodecylacetoacetate) aluminum, tris(octylsalicylaldehyde) aluminum, tris(3-octadecylacetlyacetate) aluminum, and compounds represented by the following chemical formulas:

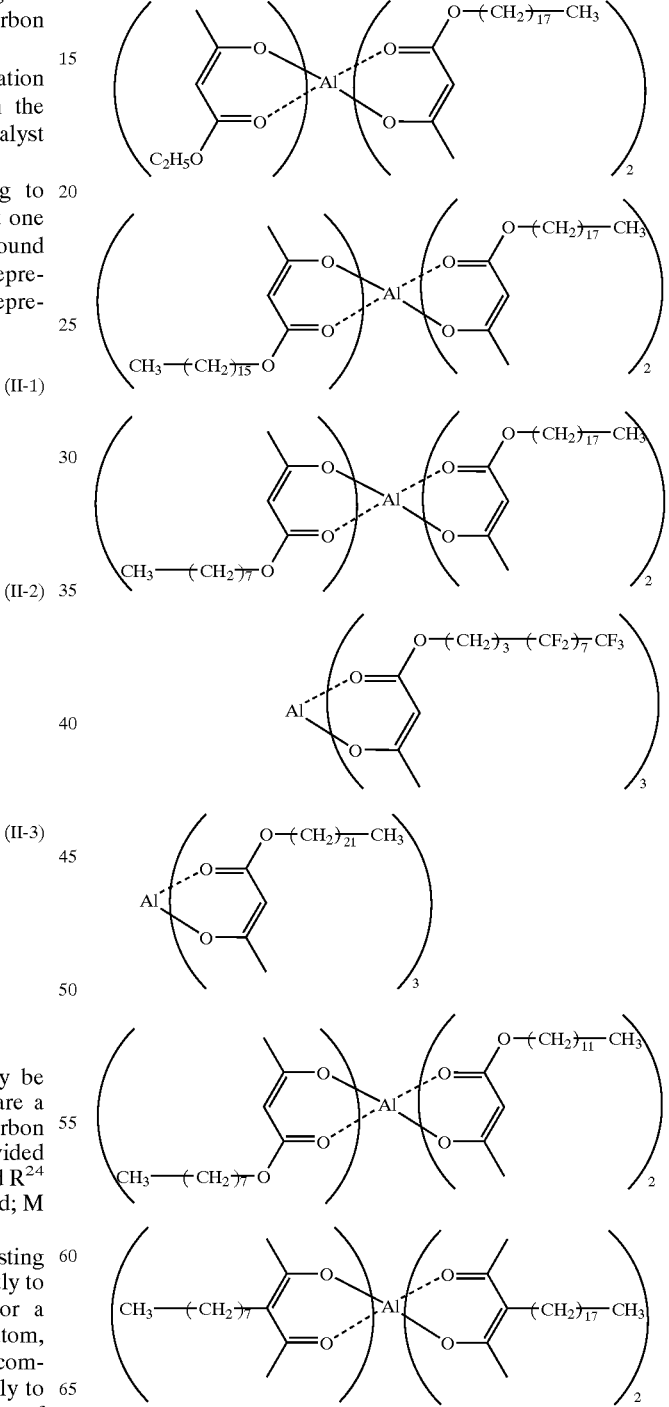

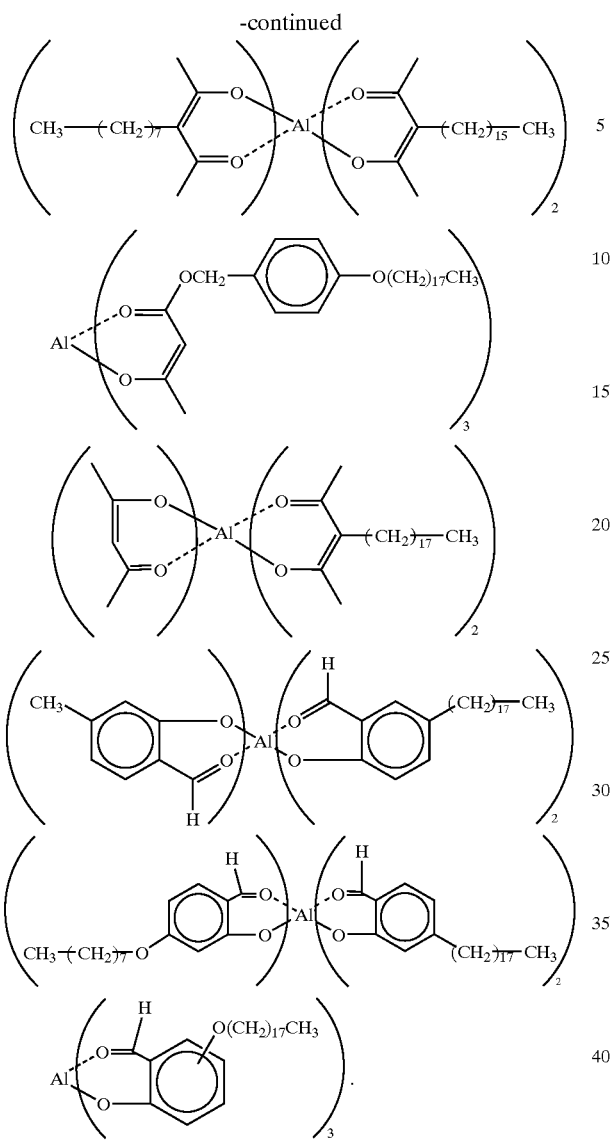

6. A coated article comprising a substrate and a coating on said substrate, wherein said coating is formed from curing the curable resin composition set forth in claim 1.

7. A coating for cars, comprising: a solvent-based coating composition comprising (ii-1) an epoxy compound having at least two cycloaliphatic epoxy groups in the molecule and a number average molecular weight of not more than 2,000, (ii-2) an acrylic resin containing an epoxy group and having a number average molecular weight of 2,000–50,000, a hydroxyl group value of 10–250 mgKOH/g, and an epoxy equivalent of not more than 300, and (3) a thermally-activating ionic polymerization catalyst which can dissolve by heating and crystallize by cooling; wherein said epoxy compound (ii-1) is mixed with an additional epoxy selected from the group consisting of bisphenol-type epoxy compound, a novolak-type epoxy compound, and a brominated-type epoxy compound thereof.

8. A curable resin composition comprising: (v-1) an epoxy compound having ionic polymerizability and a viscosity of not more than 1,000 cP at 25° C., (v-4) an oxetane compound having 1–6 oxetane rings per molecule, and (3) a thermally-activating ionic polymerization catalyst which can dissolve by heating and crystallize by cooling; said polymerization catalyst having a substituted hydrocarbon group having a carbon number of more than 10, or a nonsubstituted hydrocarbon group having a carbon number of more than 10, or a cyclic organic structure having a more than 10 carbon number hydrocarbon group, wherein said epoxy compound (v-1) is mixed with an additional epoxy selected from the group consisting of a bisphenol-type epoxy compound, a novolak-type epoxy compound, and a brominated-type epoxy compound thereof.

9. A solvent-based coating composition which comprises (ii-1) an epoxy compound having at least two cycloaliphatic epoxy groups in the molecule and a number average molecular weight of not more than 2,000, (ii-2) an acrylic resin containing an epoxy group and having a number average molecular weight of 2,000–50,000, a hydroxyl group value of 10–250 mgKOH/g, and an epoxy equivalent of not more than 300, and (3) a thermally-activating ionic polymerization catalyst which can dissolve by heating and crystallize by cooling; wherein said epoxy group in said acrylic resin (ii-2) containing an epoxy group is a cycloaliphatic epoxy group or an epoxy group derived from glycidylmethacrylate and wherein said epoxy compound (ii-1) is mixed with an additional epoxy selected from the group consisting of a bisphenol-type epoxy compound, a novolak-type epoxy compound, and a brominated-type epoxy compound thereof.

10. A method for the preparation of a curable resin composition, comprising the steps of:
preparing an acrylic resin (i-2) by constructing monomers by polymerization in the presence of a solvent, wherein said solvent includes an epoxy resin (i-1); said acrylic resin (i-2) has functional groups which are capable of reacting with ionic species in a curable resin composition that is free of a volatile solvent; and
preparing a curable resin composition by combining: (i-i) said epoxy resin, wherein said epoxy resin has an ionic polymerizability and viscosity of not more than 1,000 cP at 25° C., (i-2) an acrylic resin having an ionic polymerizable functional group, and (3) a thermally-activating ionic polymerization catalyst which can be dissolved by heating and crystallized by cooling; said polymerization catalyst having a substituted hydrocarbon group having a carbon number of more than 10, or a nonsubstituted hydrocarbon group having a carbon number of more than 10, or a cyclic organic structure having a more than 10 carbon number hydrocarbon group.

11. A color filter comprising:
a protecting layer comprising a coating formed from curing a curable resin composition which comprises (iv-1) an epoxy resin having ionic polymerizability and (3) a thermally-activating ionic polymerization catalyst which can dissolve by heating and crystallize by cooling; said polymerization catalyst having a substituted hydrocarbon group having a carbon number of more than 10, or a nonsubstituted hydrocarbon group having a carbon number of more than 10, or a cyclic organic structure having a more than 10 carbon number hydrocarbon group, wherein said protecting layer is deposited on a substrate.

12. A liquid crystal display device comprising:
a protecting layer for a color filter comprising a coating formed from curing a curable resin composition which comprises (iv-1) an epoxy resin having ionic polymerizability and (3) a thermally-activating ionic polymerization catalyst which can dissolve by heating and crystallize by cooling; said polymerization catalyst having a substituted hydrocarbon group having a carbon number of more than 10, or a nonsubstituted hydrocarbon group having a carbon number of more than 10, or a cyclic organic structure having a more than 10 carbon number hydrocarbon group, wherein said protecting layer is deposited on a substrate.

* * * * *